(12) United States Patent
Coden et al.

(10) Patent No.: US 6,263,328 B1
(45) Date of Patent: Jul. 17, 2001

(54) OBJECT ORIENTED QUERY MODEL AND PROCESS FOR COMPLEX HETEROGENEOUS DATABASE QUERIES

(75) Inventors: Anna Rosa Coden, Bronx; Robert Lawrence Mack, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,017

(22) Filed: Apr. 9, 1999

(51) Int. Cl.[7] .................................................. G06F 17/30
(52) U.S. Cl. .................. 707/3; 717/345; 707/4; 707/9; 707/10
(58) Field of Search .................. 707/1–3, 4, 9, 707/10; 717/345

(56) References Cited

U.S. PATENT DOCUMENTS 6,006,224 * 12/1999 McComb et al. .................. 707/5
6,052,693 * 4/2000 Smith et al. .................. 707/104
6,167,393 * 12/2000 Davis, III et al. .................. 707/3

* cited by examiner

Primary Examiner—Kim Vu
Assistant Examiner—Cam-Y Truong
(74) Attorney, Agent, or Firm—Louis J. Percello

(57) ABSTRACT

A computer system has an interface to one or more databases, one or more base query objects, query objects, compound queries, annotator objects and graphical user interfaces (GUI's). The base query objects have one or more base query object methods, base variables, and base objects, the base query object methods being specific to the specific database and capable of querying the specific database. Each of the query objects derived from one of the base objects, and has a query type, one or more query object methods, query object variables, and query object objects. Each query object method is capable of querying a specific database to obtain a type result having the respective type. The compound query has one or more compound query methods, compound query variables, and compound query object objects. The operator objects, are derived from one of the base query objects that are used with the specific database. (GUI) has one or more query elements with one or more operators. The query elements, operators, and conditions are user selectable. Each query element, operates on the query object with the same type as the query element to create an instance of the query object with the query element. The compound query object instance uses the instances and the operator object instances to create an a query expression for the specific database. Therefore the input in the GUI is translated into a single compound query object.

16 Claims, 33 Drawing Sheets

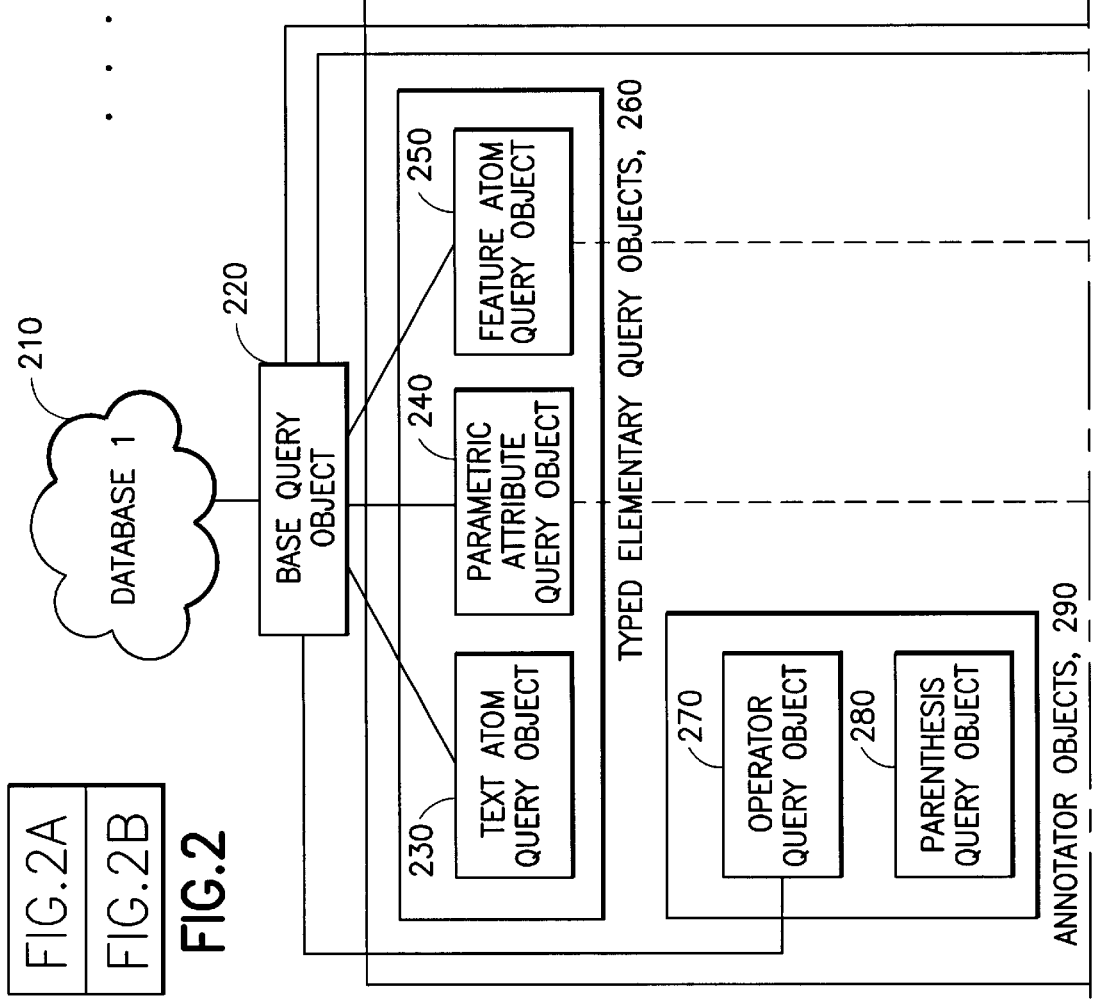

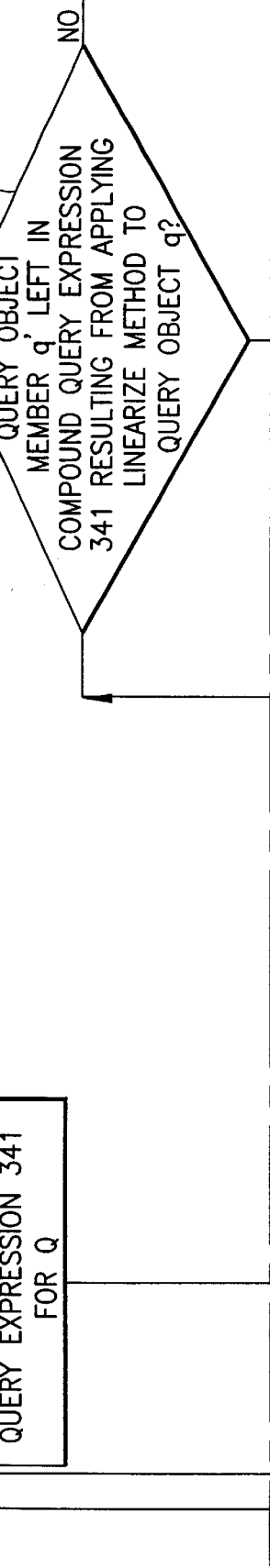

($^1$ COMPOUND BOOLEAN QUERY OBJECT, 350
( ( ( ( ("Bill Clinton" & visit & China) or ("Bill Clinton" & Bosnia) ) &
( (Video Title=ABC Nightly News) & (Air Date=Sep 9 1998) )) &
( (Motion=Zoom in) & (Faces=1) ) )

FIG.15A ($^2$ COMPOUND BOOLEAN QUERY OBJECT, 350
($^{2.1}$
($^{2.1.1}$ COMPOUND BOOLEAN TEXT QUERY OBJECT, 300 OR ($^{2.1.2}$ COMPOUND BOOLEAN TEXT QUERY OBJECT, 300
"Bill Clinton" & visit & China)       "Bill Clinton" & Bosnia)
)
& ($^{2.2}$ PARAMETRIC COMPOUND QUERY OBJECT
( $^{2.2.1}$Video Title=ABC Nightly News) & ($^{2.2.2}$ Air Date=Sep 9 1998))
) & ($^3$ COMPOUND FEATURE QUERY OBJECT
( $^{3.1.1}$Motion=Zoom in) & ( $^{3.1.2}$ Faces=1) )
)

FIG.15B

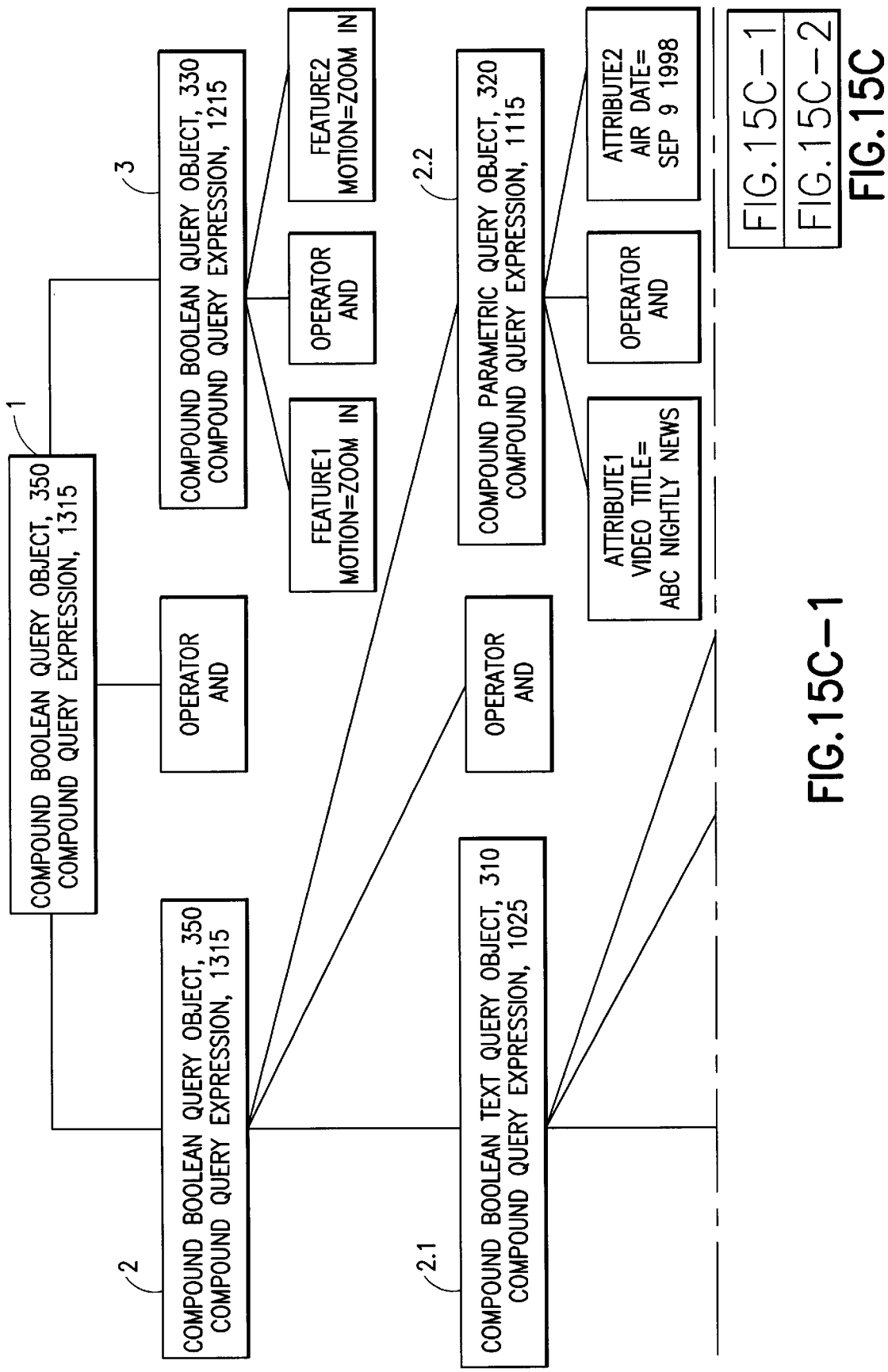

( ( ( ("Bill Clinton" & visit & China) or ("Bill Clinton" & Bosnia) ) &
( (Video Title=ABC Nightly News) & (Air Date=Sep 9 1998) ) ) &
( (Motion=Zoom in) & (Faces=1) ) )

FIG.19B

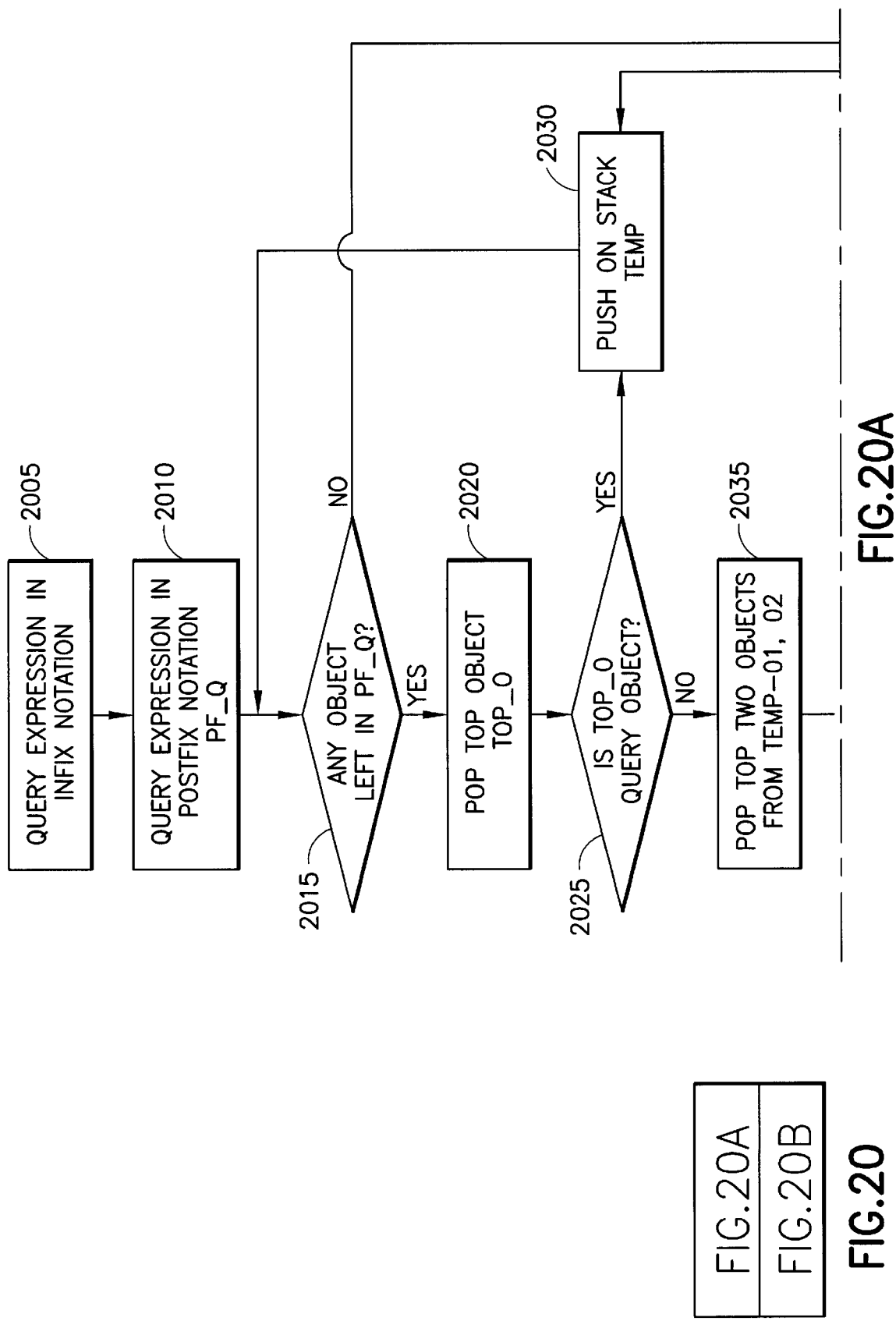

OBJECT ORIENTED QUERY MODEL AND PROCESS FOR COMPLEX HETEROGENEOUS DATABASE QUERIES

FIELD OF THE INVENTION

This invention relates to computer database searching. More specifically, this invention relates to the formulation and the efficient execution of complex database queries using a single query expression against the database.

BACKGROUND OF THE INVENTION

The amount of multimedia data available in electronic format is every increasing. The cost of loading such data into a database is quite high and it is desirable that this task does not have to be repeated when writing different applications which use such data. Furthermore it is desirable to be able to add different databases to a system without the need to rewrite the application in a major way. In general, a relational database comprises tables which contain records that have a zero-to-many relationship to records in other tables. A query is formulated against one or many tables as appropriate and upon execution returns a set of records. To get the desired user query resolved, several sub-queries may have to be formulated, and then the results of each of these sub-queries combined.

For example, assume a DB2 (IBM™) database which is populated with several tables. Each table has many records (rows) and many columns. A user can pose a query like: find all the DEALERS which have PINK CADILLACS in STOCK (referred to as parametric query). In this example, there are at least the following columns in the database: DEALERS, COLOR, MAKE, AVAILABILITY. (This is a straightforward database example). Now lets assume that with each row in the table, there is also a textual description columns. Some databases like DB2 have a special method (called DB2 TextExtenders, IBM™) to search such textual columns for the occurrence of a string or a logical expression of words (e.g. USED or NEW). A multi-search query would for instance extend the above query by adding the query condition "USED or NEW". One way to execute the query is to first execute the parametric query and store its results in an application, then execute the textual query and store its result in the application. The application then combines the results of the two sub-queries (e.g. parametric and textual) for a final result. The problem is that each of the sub-queries may return a big result set, which is expensive to transmit from the database to the application. Furthermore, combining results from the sub-queries is expensive.

OBJECTS OF THE INVENTION

An object of this invention is an improved database query system and method.

An object of this invention is novel object oriented query data model.

An object of this invention is to formulate a single valid query against a relational database which eliminates the use of intermediate result sets and uses the database for performance optimization while maintaining some flexibility to perform some other optimization.

An object of this invention is to formulate a single valid query as described above which returns in addition to rows from tables from the database also returns computed values in some of the result columns.

SUMMARY OF THE INVENTION

The present invention is a computer system method having one or more central processing units and one or more memories. The computer system has an interface to one or more databases, one or more base query objects, one or more query objects, one or more compound queries, one or more annotator objects and one of more graphical user interfaces (GUI's). The base query objects have one or more base query object methods, one or more base variables, and one or more base objects, one or more of the base query object methods being specific to the specific database and capable of querying the specific database. Each of the query objects derived from one of the base objects, and each of the query objects has a query type, one or more query object methods, one or more query object variables, and one or more query object objects. Each query object method is capable of querying a specific database to obtain a type result having the respective type. The compound query has one or more compound query methods, one or more compound query variables, and one or more compound query object objects. The operator objects, are derived from one of the base query objects that are used with the specific database. The graphical user interface (GUI) has one or more query elements with one or more operators. Each query element is one of the query types but being database independent, the query elements, operators, and conditions are user selectable. The process that, for each query element, operates on the query object with the same type as the query element to create an instance of the query object with the query element as one of the query object variables, creates one or more operator object instances from the operator objects corresponding to the operators, and operates on the compound query object to create a compound query object instance. The compound query object instance uses the instances and the operator object instances to create a query expression for the specific database. Therefore the input in the GUI is translated into a single compound query object.

There are different methods to evaluate a complex user query. In the present invention we propose a very efficient way of translating a complex user query into a single query string in a structured query language.

BRIEF DESCRIPTION OF THE DRAWINGS

FIGS. 15A, 15B and 15C show three representations of the same Boolean query expression, exemplifying the concepts "recursive nesting," "hierarchical tree", "parent" and "child Query Objects".

FIGS. 19A and 19B show examples of GUI query elements.

DETAILED DESCRIPTION OF THE INVENTION

Figure 1:
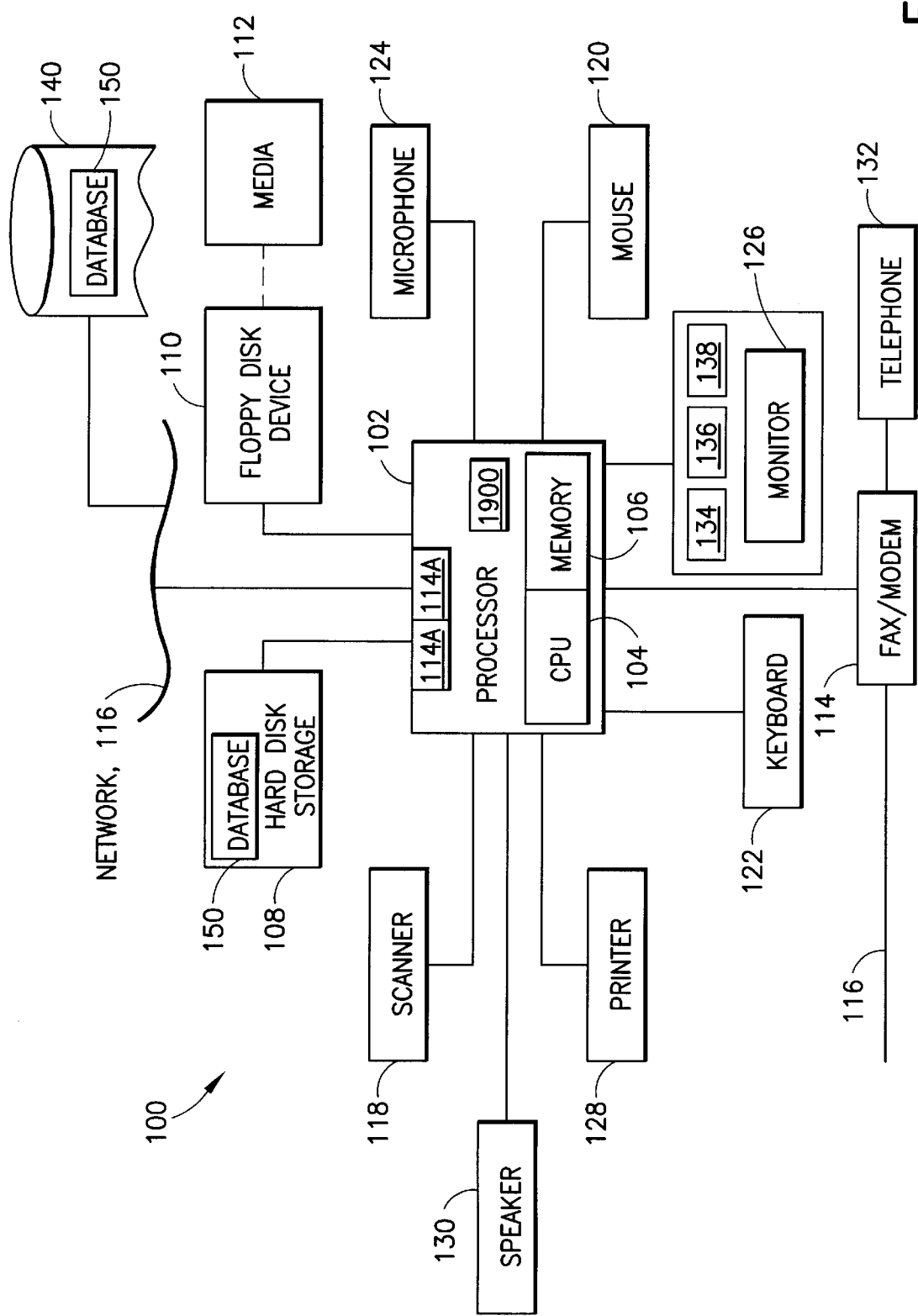
FIG. 1 is a block diagram showing one non-limiting example of a preferred embodiment of the present system.
Figure 2B:
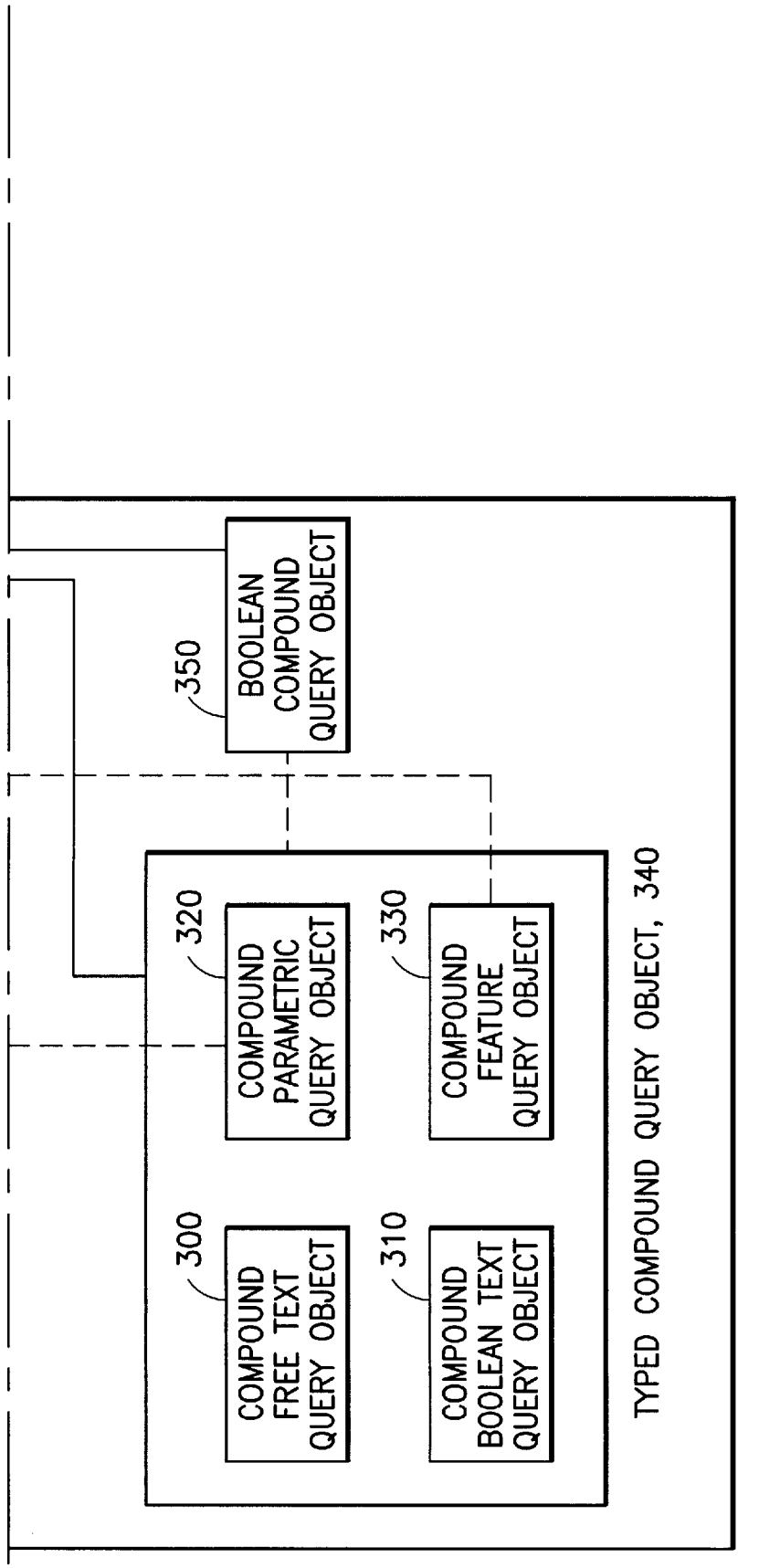
FIG. 2 is a block diagram of a novel query object architecture of the present invention.

FIG. 1 is a block diagram of one preferred system 100 used in performing the process 1000 of a preferred embodiment of the present invention. This non linting example data processing system 100 uses an IIBM PC computer (trademark of IDBM Corp.) running an operating system like the Microsoft Windows NT 4.0 operating system (trademark of Microsoft Corp.) and IBM Database 2 Single User Edition for Windows NT, version 2.1.2 or higher (trademark of IBM Corp.), or equivalent. The data processing system 100 includes a processor 102, which includes a central processing unit (CPU) 104 and memory 106. Additional memory, such as a hard disk file storage 108 and a removable media device 110 having removable media 112 may be connected to the processor 102. Additional memory like 140 can be connected via a network and contain one or more databases 150. The removable media device 110 may read from and, usually, writes to the removable media 112. Examples of the removable media 112 include: a magnetic tape, a compact disk-read only (CD-ROM), write once (CD-R) or rewritable (DC_RW) memory, and any other well known readable and writable media. Memory 106, 108, 112 may have computer program code recorded therein that implements portions of the present invention in the data processing system 100. Inputs may also be received from input devices that could include: a fax/modem 114 or network interface card 114A, which is connected to a telephone line 132 and/or a local area or wide area network 116, e.g. the Internet. The data processing system 100 also can include user interface hardware, such as a pointing device (e.g. a mouse) 120, a keyboard 122, an optical scanner 118 and a microphone 124 for allowing user input to the processor 102. The data processing system 100 may have output devices that could include: one or more visual display devices (e.g. a monochrome or color display monitor 126) and/or a monochrome or color display printer 128, for rendering visual information. For instance, the Graphical User Interface (GUI) can use 126 to display the query element 134, query operators 136 and conditions 138 which are used to specify the user query. In some alternative embodiments, the data processing system includes: an audio display device, such as a speaker 130, for rendering audio information. A Telephone 132 may also be connected to the telephone line 116.

Process 1900 is stored in one or more of the memories (e.g. 105, 108) and executed by one or more of the CPUs 104.

One problem addressed here is to be able to have any general GUI, accessing any general database with any general query. In prior art, an application had to be rewritten to accommodate a new GUI or a new database or trying to make performance improvements. We disclose an flexible and modular architecture which creates a GUI and database independent representation of a user query which enables a GUI or database to be changed independently. Performance improvements can also be made without the need of rewriting the whole application.

Figures 2, 15:
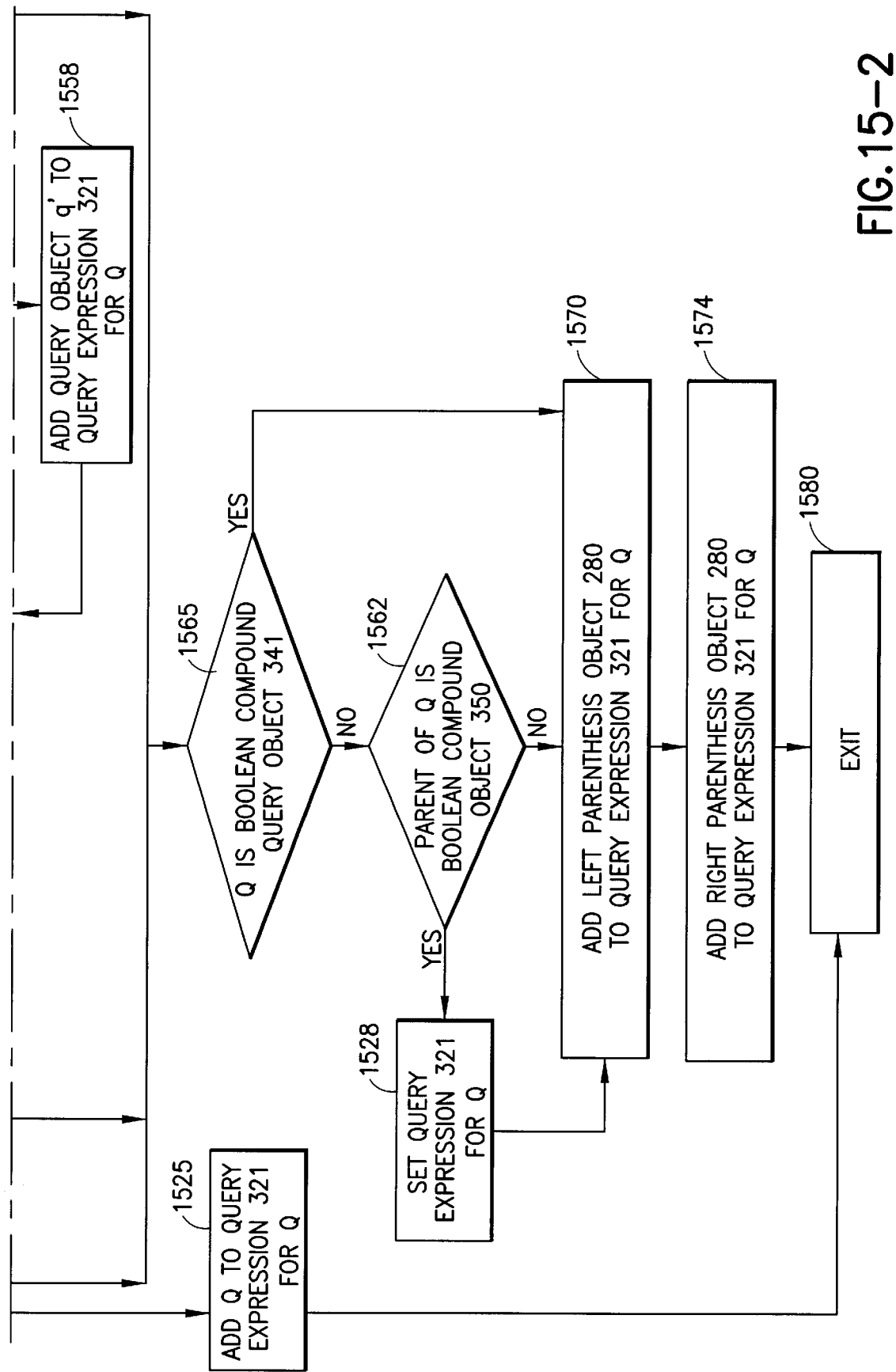
FIG. 15 is a flowchart of a typical linearize method which is a part of a Base Query Object and all Derived Query Objects.

FIG. 2 shows a hierarchy of objects—Base Query Objects 220, Annotator Objects 290, Typed Elementary Query Objects 260, Typed Compound Query Objects 340 and Boolean Compound Query Objects 350. This set of objects are the core of the architecture. All the above mentioned objects are derived from a base query object (standard Object Oriented Programming meaning). Each base query object knows how to connect to a specific database, send queries to a database and receive results. Annotator Objects 290 are a convenient representation for operators and parentheses. Typed Elementary Query Objects 260 capture the basic building blocks of a query, like a text string or a attribute, operator, value triplet (e.g., Movie Producer= Hitchcock). Typed Compound Query Objects 340 are used to express a complex query of a specific type, for instance a query of the form "SCARY SHOWER SCENE OR BIRDS FLYING" is a textual query composed of two phrases which are combined with the operator OR. Such a query would be expressed with Typed Compound Query Object 340 which would contain the query which would be expressed as the OR of two Typed Elementary Query Objects 260. A Boolean Compound Query Object 350 is used to express the complete user query which is composed of subqueries of different types. The above mentioned example could be augmented to include the parametric query "DIRECTOR= HITCHCOCK" and the AND operator could be used to express the fact that the user wants to find two particular Hitchcock movies ("Psycho" and "The Birds"). Process 1900 maps the information entered in the GUI into Derived Query Objects 360 which are described in detail in FIGS. 4–8. The Typed Elementary Query Objects 260 are derived from a Base Query Object 220 and contain one or more objects and methods which are able to set and write typed information from/to the GUI and map the information into a database dependent query language. Process 1900 then continues by using information either from the GUI or independently created to instantiate Typed Compound Query Objects 340 which express Boolean combinations of Typed Elementary Query Objects 260 by type and are described in more detail in FIGS. 9–12. The process 1900 then continues by using information either from the GUI or independently created to instantiate a Boolean Compound Query Object 350 which expresses the user query using Typed Compound Query Objects 340 and is described in more detail in FIG. 13. Annotator Objects 290 are used to express the Boolean combinations of objects both within the Typed Compound Query Objects 340 and the Boolean Compound Query Object 350. The Boolean Compound Query Object 350 encapsulates the user query in a GUI and database independent format.

To attach a different database the connection method in a base query object has to be changed. If the structured query language is different, only new methods expressing the change have to be added. A different GUJI may entail no changes, or some changes in process 1900 which maps new graphical user interface components into Typed Elementary Query Objects 260. The core of an how an application parses a complex query and executes it would remain unchanged.

An application using the architecture described in this disclosure would be written in the following fashion. Each application has a user interface, most likely a graphical user interface (GUI). Each database which is part of the application has tables which have names and each of the tables has columns which are named in turn. The names used by the database may be not suitable for the application. An application builder can create a file which maps the database names into more user friendly names.

In the first step the GUI is mapped into Typed Elementary Query Objects 260. The names of these query objects suggest that they are the basic building blocks which can be used to express more complex user queries. For example, a Text Atom Query Object 230, encapsulates a single text string. In the next step, other aspects of the user interface are taken into account to create Typed Compound Query Objects 340, Annotator Objects 290 and a Boolean Compound Query Object 350 which ultimately describes the whole user query. The aspects of the user interface taken into account are which combinations of the basic query elements the user chose for the query. For example, besides specifying a text string, the user may specify also the resulting video for instance was aired after Aug. 14th, 1953 and was produced by either an American or Canadian company. A user interface may allow the user to specify all possible combinations of the building blocks or have default values on how they should be combined.

The Query Objects (220, 360) and their methods are some of the novel features of the disclosure. They have several characteristics in common. They provide for a user interface and database independent representation of a user query. They have methods to render them in a specific user interface, to translate them into an expression which is specific to a database and can be (either alone or in conjunction with other expressions) executed against the database. Note that the execute method is type specific. For instance, a Compound Free Text Query Object 300 has an execute method which can perform a free text query which returns ranked results. The execute method of a Compound Parametric Query Object 320 in turn returns rows which satisfy the query condition. They may contain a method to render the query into a structured query language which the user can manipulate to specify a query. They have objects to store results of a query and translate them into a user interface and database independent format which can be used for post processing if so desired. Continuing the necessary steps in an application, the query condition (e.g., the text string and the date in the above mentioned example) expressed with the above mentioned objects and captured in the Boolean Compound Query Object 350 (see description of FIG. 13 for more details) is transformed into a Boolean expression in infix notation composed of Typed Compound Query Objects 340 and Annotator Objects 290. This Boolean expression is then evaluated: each Typed Compound Query Object 340 executes the query it encapsulates and the results are then combined according to the precedence rules of the Boolean expression and the operators and parenthesis used to instantiate a result object FIG. 17) which is again a user interface and database independent object.

The architecture is expandable to include new Query Objects at all levels (Typed Elementary Query Objects 260, Annotator Objects 290 and Typed Compound Query Objects 340) as long as they follow the same structure to include type specific execute and rendering methods. A system using this architecture can be maintained and modified at a modular level. For instance, when a new user interface is desired, some new rendering methods may have to be added to the system. A system and application using this data model can add/change a graphical user interface (GUI) without impacting the database query operation. Another example of the flexibility of the system is when adding a new different database which uses a different structured query language. In that case some of the execute methods may have to be changed but the rest of the structure and the application can remain unchanged, and there is no need to change the GUI (unless new functions are added which should be exposed to the user). Details of the database layout are hidden from the GUI and hence can be changed without impacting the application.

FIG. 2 is a block diagram of the novel Query Object architecture 200 of the present invention. The architecture allows for one or more homogeneous databases and/or two or more heterogeneous databases 210. For each database, there is a base query object 220, which contains an object 311 encapsulating the connection to its database and an object 315 encapsulating a connection to a GUI in the system. All query objects mentioned in the description of this figure are described in more detail in subsequent figures.

There are many query objects which can be derived from a Base Query Object 220 using well known Object-Oriented techniques. Each of these Derived Query Objects 360 has a query type associated with it. Some preferred Derived Query Objects 360 shown in FIG. 2 are: the Typed Elementary Query Objects 260, the Annotator Objects 290, the Typed Compound Query Objects 340 and the Boolean Compound Query Objects 350. Some preferred Typed Elementary Query Objects are the Text Atom Query Objects 230, the Parametric Attribute Query Objects 240 and the Feature Atom Query Objects 260. Some preferred Annotator Objects are the Operator Query Objects 270 and the Parenthesis Query Object 280. Some preferred Typed Compound Query Objects are the Compound Free Text Query Object 300, the Compound Boolean Text Query Object 310, the Compound Parametric Query Object 320 and the Compound Feature Query Object 330.

The architecture is not limited to these Query Objects and can accommodate others. Each Query Object contains member objects and methods which are described in more detail in FIGS. 3–18. At least one of the methods in each of the Derived Query Objects 360 can upon execution produce a valid structured language string which in conjunction with other valid strings could be executed against the database 210 and return Results. Furthermore, each Derived Query Object 360 contains a method 390 which can render the query expression in a graphical user interface or in a user interface structured Query Language. Each Typed Compound Query Object 340 contains an object which describes a query and an object which upon execution of the query contains the results. A Boolean Compound Query Object 350 contains a query expression (a Boolean expression of Typed Compound Query Objects 340 and Annotator Objects 290), at least on linearize method which takes the query expression and transforms it into postfix notation, and at least one execute method which performs the following steps: execute the query as encapsulated in the query expression in each of the Typed Compound Query Objects 340 and then combine the results of each of these sub-queries queries according to the rules of the Operator Objects 270. The algorithms for combining are implementation specific and could also be chosen by the user.

Figure 3:
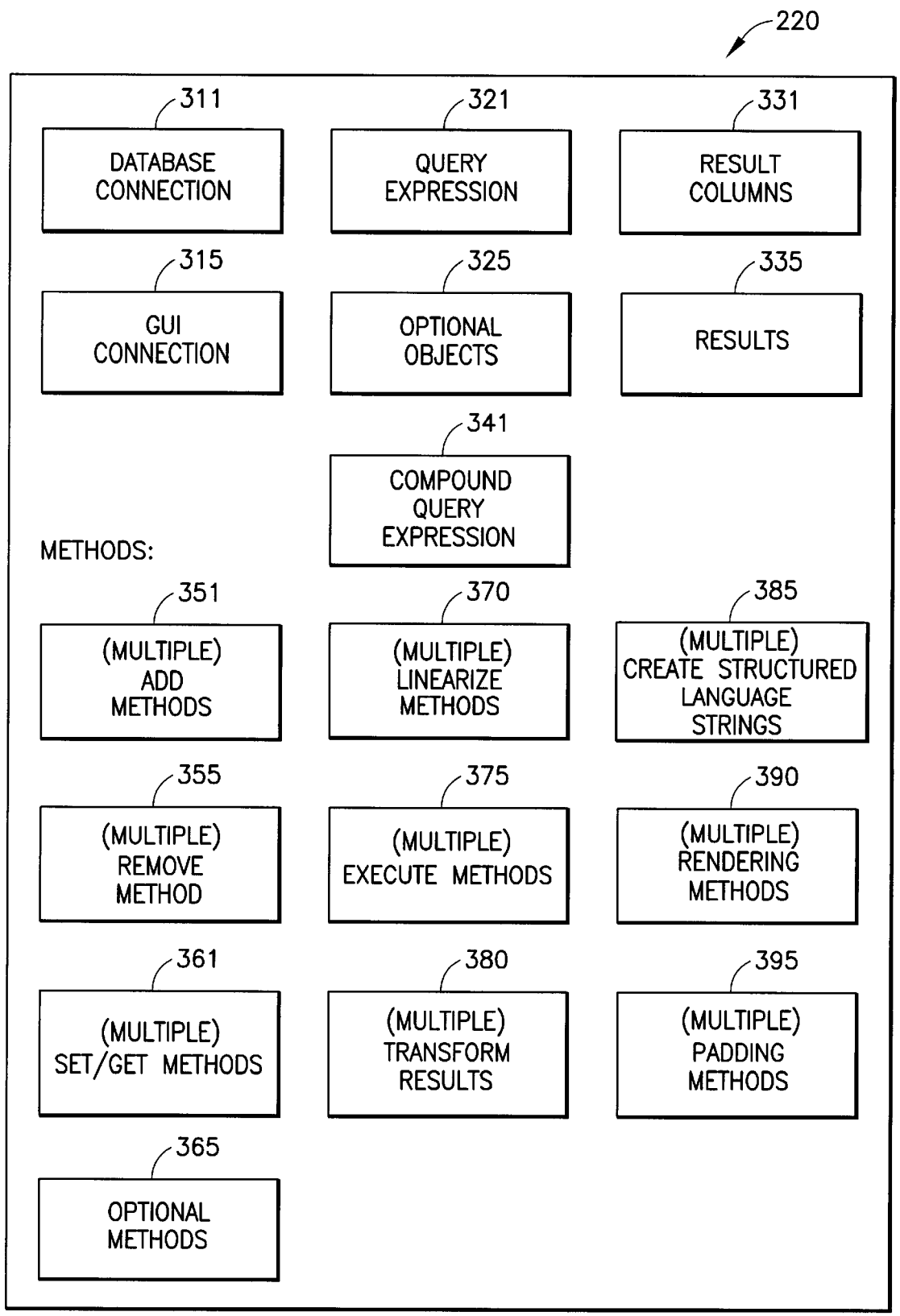
FIG. 3 is a block diagram of a Base Query Object.

FIG. 3 is a block diagram of a typical Base Query Object 220. A Base Query Object 220 contains objects (311, 315, 321, 325, 331, 335) methods (351, 355, 361, 365, 370, 375, 380, 385, 390, 395). Each database in the system has its own Base Query Object 220. Its main function is to know how to communicate with its associated database, in particular how to send a query and receive the results. Other important methods are: how to transform a query expression into a query using postfix notation (370), take results and transform them into a database independent format (380) and rendering methods (390) which can show data in the GUI.

All the objects and methods in a Base Query Object 220 are now described in more detail. Object 311 describes a connection to a database 210, in particular it contains all the information necessary to write execute methods 375 which can submit a query to its associated database and retrieve the results. In a preferred embodiment, the connection is to DB2 and object 311 contains methods which allow SQL strings to be executed and their results received. Object 315 describes the connection to the Graphical User Interface (GUI). In one preferred embodiment mappings from names known to the database to names preferred by the user are done in the GUI and have to be accessible to the Base Query Object 220. Object 321 contains a query expression and there are many different structures which accommodate such an expression. However, all structures represent a valid Boolean expression of Derived Query Objects 290 in an infix notation. Objects 325 are optional as an application or implementation sees fit. Object 331 describes which values the user requested as results for the query. Object 335 can hold the results of an executed query in a database and user interface independent structure. There are many suitable implementation of such an object. In one preferred embodiment, the results are table (a two dimensional array) with a separate linked list which contains the column headings and their types. The Base Query Object 220 is used to derive the Derived Query Objects 360 according to Oriented Programming rules.

Object 341 is a Compound Query Expression and there are many different structures which can accommodate such an expression. A Compound Query Expression 341 captures the same Boolean expression as the Query Expression 321 using a recursive representation which can express nesting without the use of Parenthesis Objects 280. The linearize method 371, which is described in more detail in FIG. 15, transforms a Compound Query Expression 341 into a Query Expression 321. It will be apparent in FIG. 19 how Compound Query Expressions are a useful way to represent an end user query as expressed in a GULI. A Query Expression 321 on the other hand is an usefull representation for executing a user query against a database in a fast manner.

A Base Query Object 220 contains many methods. The method ADD 351 can insert Typed Elementary Query Object 260, a Annotator Object 290 or a Typed Compound Query Object 340 into the query expression 321. The method REMOVE 355 can remove any of the Query Objects from the query expression. Methods 360 are "set" and "get" methods. For each Object contained in the Base Query Object 220 there is a "set" method which can set variables and constants and a "get" method to retrieve them. Methods 365 are optional as an application or a specific implementation requires. Methods 371—the linearize methods—can transform a query expression into a Boolean expression into postfix format. There can be multiple linearize methods, at least one per structure which holds the query expression and there could be multiple ones depending on an actual implementation. Methods 375 are execute methods which execute a query against the database and retrieve results. These methods use the connection object 311 described above.

Method 380 transforms results returned from the database into a database independent format which can be used by other query objects including the GUI. In particular, method 380 knows the database specific format in which the typed results are returned from the database. In general the results can have different types like integers, floating point numbers, strings to point out a few non limiting examples. In one preferred embodiment, there are different functions to extract each of these types from the result object (FIG. 17) as returned from the database and put it into a database independent array. The types of the results (integer, floating point, string etc.) are preserved in that operation. The array has a header which for each column associates the column name, the database table it belongs to and the type. Hence enough information is retained to know from where the results came, however, the array itself (or any other equivalent representation) is database independent. As a consequence, two such arrays could each contain results from queries executed from different databases. Some of the aspects of this methodology are covered in U.S. Pat. No. 5,873,080, entitled "Using Multiple Search Engines to Search Multimedia Data" issued to Anni R. Coden et al. on Feb. 16, 1999 which is herein incorporated by reference in its entirety. Methods 385 create strings in the structured query language which is used by the database specified in the connection 311. Such strings (either by themselves or in conjunction with other strings) can then be executed against the database (using an execute method 375) to produce results. In a preferred embodiment, methods 385 create SQL strings. A common SQL statement has the following format:

SELECT<column1, column2 . . . >FROM<table1>WHERE<query condition>

The keywords SELECT, FROM and WEE are fixed SQL keywords. The columns<column1, column2, etc>are the columns which the user specifies in a query. They can be specified in any form the GUI builder finds convenient and method 385 translates GUI specifications into column names as known by the database. In the same fashion, the user may have specified which table to search. Such specification could be directly by specifying a name or indirectly by specifying what type of query is performed. In the later case for example, the user could have specified that it is looking for an author of a book and the system knows which table is associated with such a search. The query condition is again specified by the user in different ways. For example, the user could have specified to search for authors of books which have been published in the year 1998 and whose subject is parenting. In this example the query condition specified in SQL would be SUBJECT='Parenting' and could be specified in the GUI in many different ways.

Another method 385 creates a string which translates the query condition into structured language as defined by the user interface. Methods 390—the render method—use elements of the graphical user interface to display the query expression. Method 395 is a non listing example of a method which can be applied to results to suit a particular application. In one preferred embodiment, method 395 is a padding method. For this method to be applied, the results contain columns which describe a start and end point of a time interval. A resulting time interval could be too small for the application to use. In this case "too" small intervals would be extended by either a fixed value or by a calculated amount as specified by the application.

The above mentioned objects and methods use standard object oriented programming technology. However, the type of objects and methods which comprise a Base Query Object 220 are novel and are necessary to implement the overall architecture of an object oriented query model. Each implementation of this architecture could very slightly.

They Typed Elementary Query Objects 260 and the Annotator Objects 290 can be considered building blocks of the Query Object Architecture and are described in FIGS. 4–8 in more detail. They contain the simplest forms of query expressions, like a text string or a parametric attribute (e.g., PRODUCER='HITCHCOCK') to name two. Such query expressions can then be composed into more complex queries using the annotator objects which then are used to instantiate Typed Compound Query Objects 340. A Typed Elementary Query Object 260 can be used to form query expressions in different Typed Compound Query Objects 340. For instance, a query expression in a Compound Free text Query Object 300 and in a Compound Boolean Text Query Object 310 use Text Atom Query Objects 230 in them.

Figure 4:
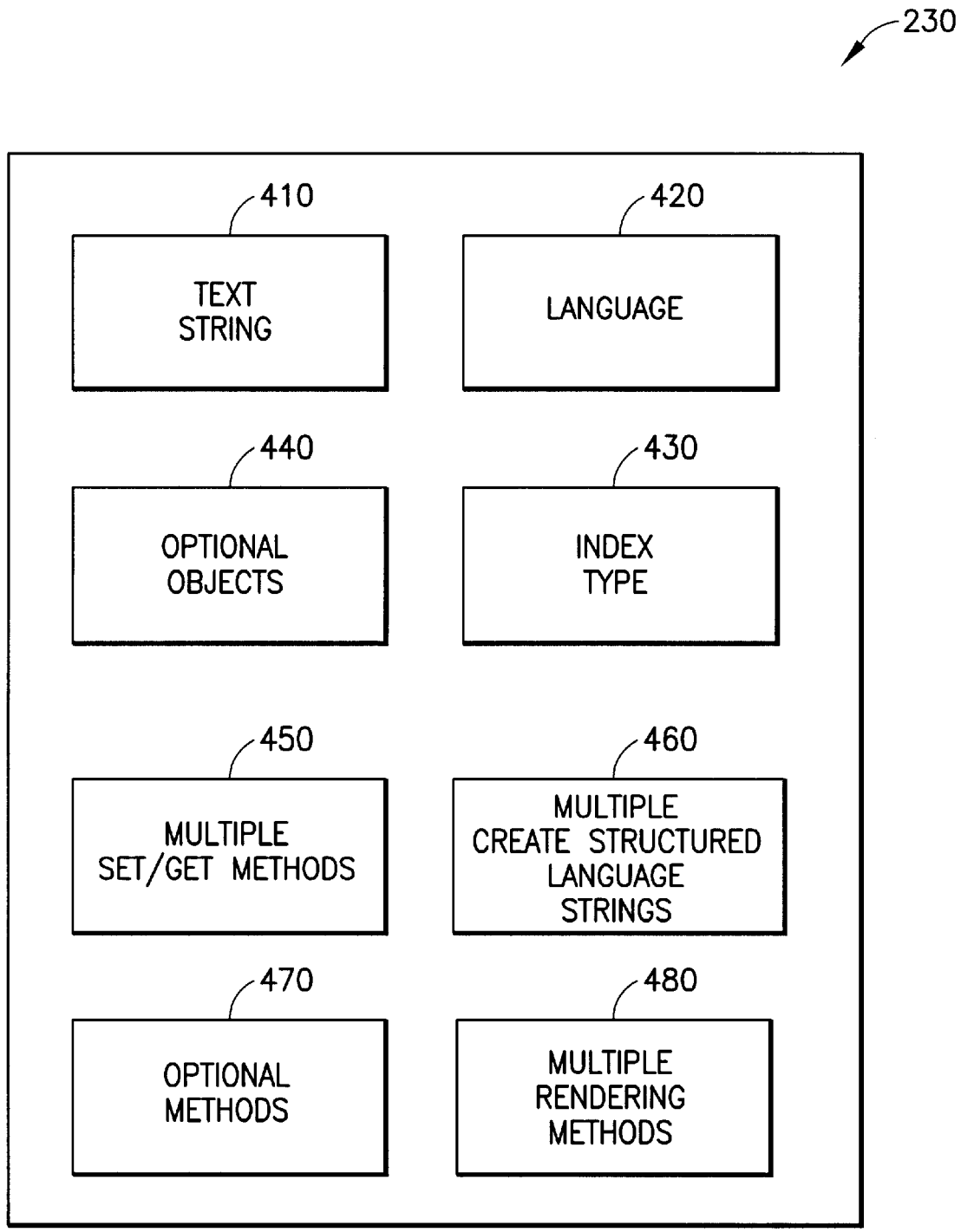
FIG. 4 is a block diagram of a Text Atom Query Object

FIG. 4 is a block diagram of a Text Atom Query Object 230. Object 410 holds a basic text string which can be specified in the user interface. Such a text string can be used to form more complex queries which are captured in Typed Compound Query Objects 340. This Query Object is a building block, has methods for translating the string into a structured query language (e.g., adding the correct punctuation) and methods for rendering it in a GUI.

Object 420 and 430 are optional and their necessity depends on the sophistication of the Text Search Engine within the database. In one preferred embodiment, the database is DB2 and DB2 TextExtender is used to perform a text search. Within DB2 TextExtender, the language of the text string can be specified using Object 420 and DB2 TextExtender supports three types of indices (linguistic, precise and dual). Object 430 is used to specify the type of index desired. The Text Atom Query Object 230 can contain additional optional objects 440 as deemed necessary by the application or the implementation.

Methods 450 are multiple "set and get" methods for the variables, constants and objects within the Text Atom Query Object 230. Methods 460 translate the text string into structured language strings as required by either the database 210 or the user interface structured language. Methods 480 are multiple rendering methods which use user interface elements to show the text string 410.

Figure 5:
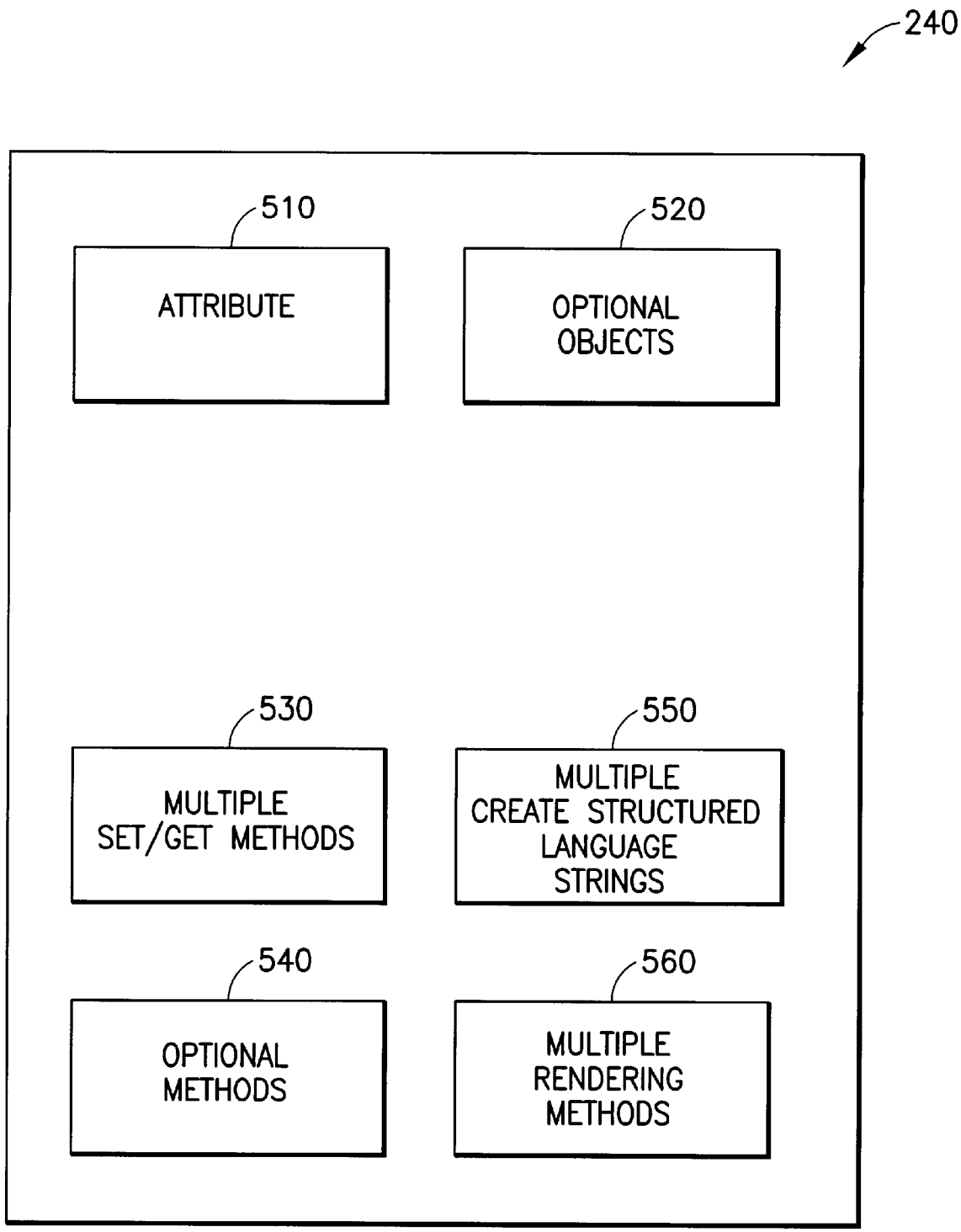
FIG. 5 is a block diagram of an Parametric Attribute Query Object.

FIG. 5 is a block diagram of a Parametric Attribute Query Object 240. This query object is a building block in forming more complex expressions which are captured in Typed Compound Query Objects 340. The information captured in a Parametric Query Object 240 is the relation as requested by a user between a particular column and a user specified value. Although a Parametric Attribute Query Object 240 does not contain explicit methods to execute a query, it contains methods on how to translate the user specification into a structured query language and methods to render them in a GUI.

Object 510 holds an attribute which is of the form <textstring> <operator> <value,>. The operator can be any the database 210 supports and the value can be either a text string or a numeric value. The Parametric Attribute Query Object 240 can contain additional optional objects 520 as deemed necessary by the application or the implementation.

Methods 530 are multiple "set and get" methods for the variables, constants and objects within the Parametric Attribute Query Object 240. Methods 550 translate the attribute into structured language strings as required by either the database or the user interface structured language. Methods 560 are multiple rendering methods which use user interface elements to show the attribute 510.

Figure 6:
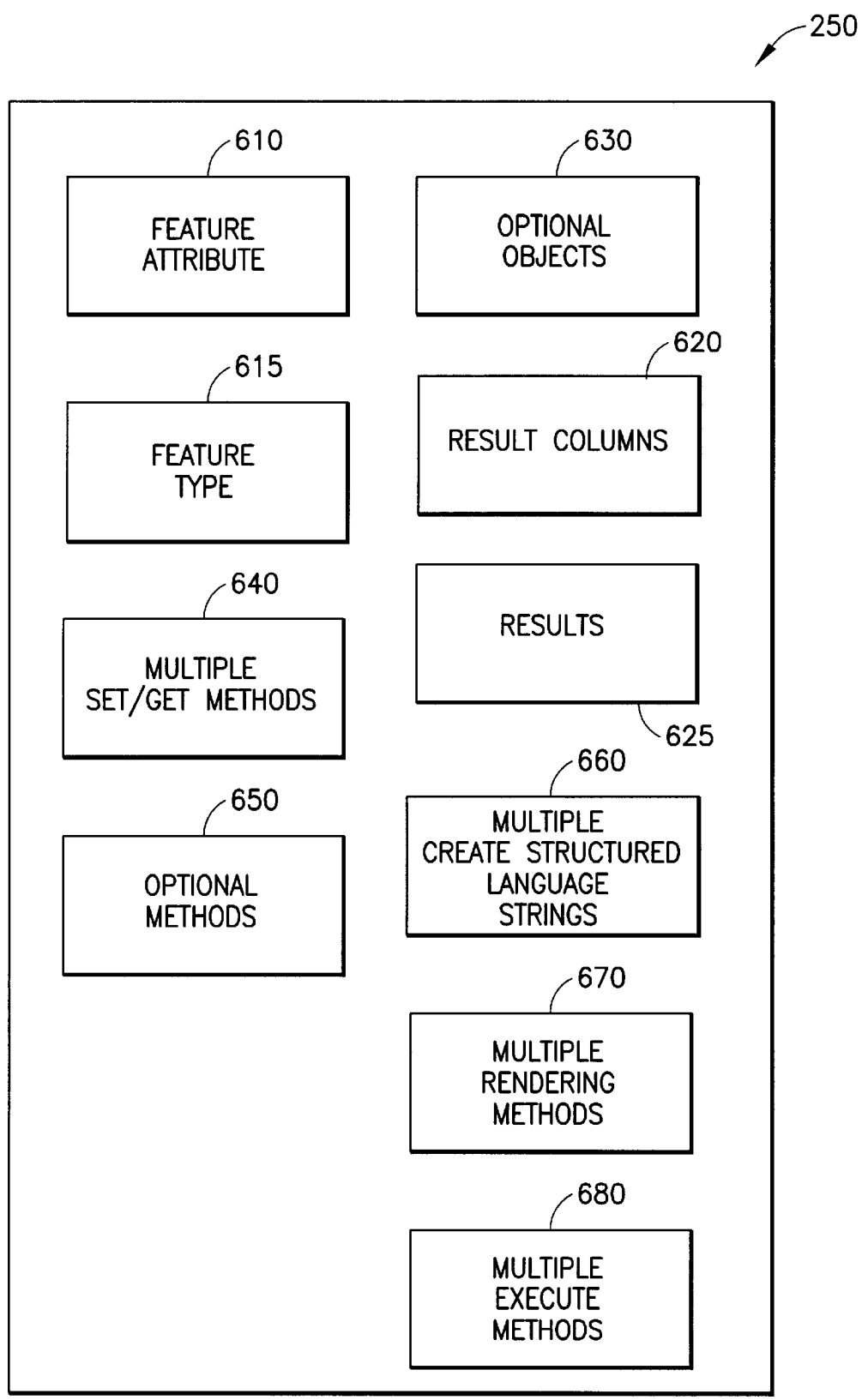
FIG. 6 is a block diagram of a Feature Atom Query Object.

FIG. 6 is a block diagram of a Feature Atom Query Object 250. This Query Object is a building block and quite similar to the Parametric Attribute Query Object 240. However, it has one additional feature: the user specifies a column, an operator and a value, but it does not specify the datatype of the column. For instance, a user may specify IMAGE= MOSTLY GREEN. This may translate to a particular region in a color palette, the meaning of the operand "=" being non standard and the formulation of a query varying from the standard approach.

Object 610 holds an attribute which is of the form <textstring> <operator> <value>. The operator can be any the database supports and is appropriate for the data type of the value which can be of any "standard" datatype like text strings and numbers, or user defined datatypes like histograms and images to give some non limiting examples.

A feature is a column in a database table whose values are strings. For example MOTION MAGNITUDE, ZOOM, FACES are examples of features. Such features can have different values and these values can be of different type. MOTION MAGNITUDE could be described using floating numbers, ZOOM could be described using strings whose values could be IN and OUT and FACES could be described by integers like 1,2 and 3. A user searching for videos which have certain features does not want to be concerned in which format such features are described. In particular a user would for instance specify to search for videos where the MOTION MAGNITUDE=45.7.

Object 615 describes the data type of value. In one preferred embodiment the datatypes for different features as denoted in the text string in Object 610 are stored in a table in the database.

Hence the GUI designer does not need to know the type of the feature when specifying a feature atom as the information can be filled in by the application automatically. However, if the GUI needs to know the type for display purposes, it can query the system for it.

Figure 17:
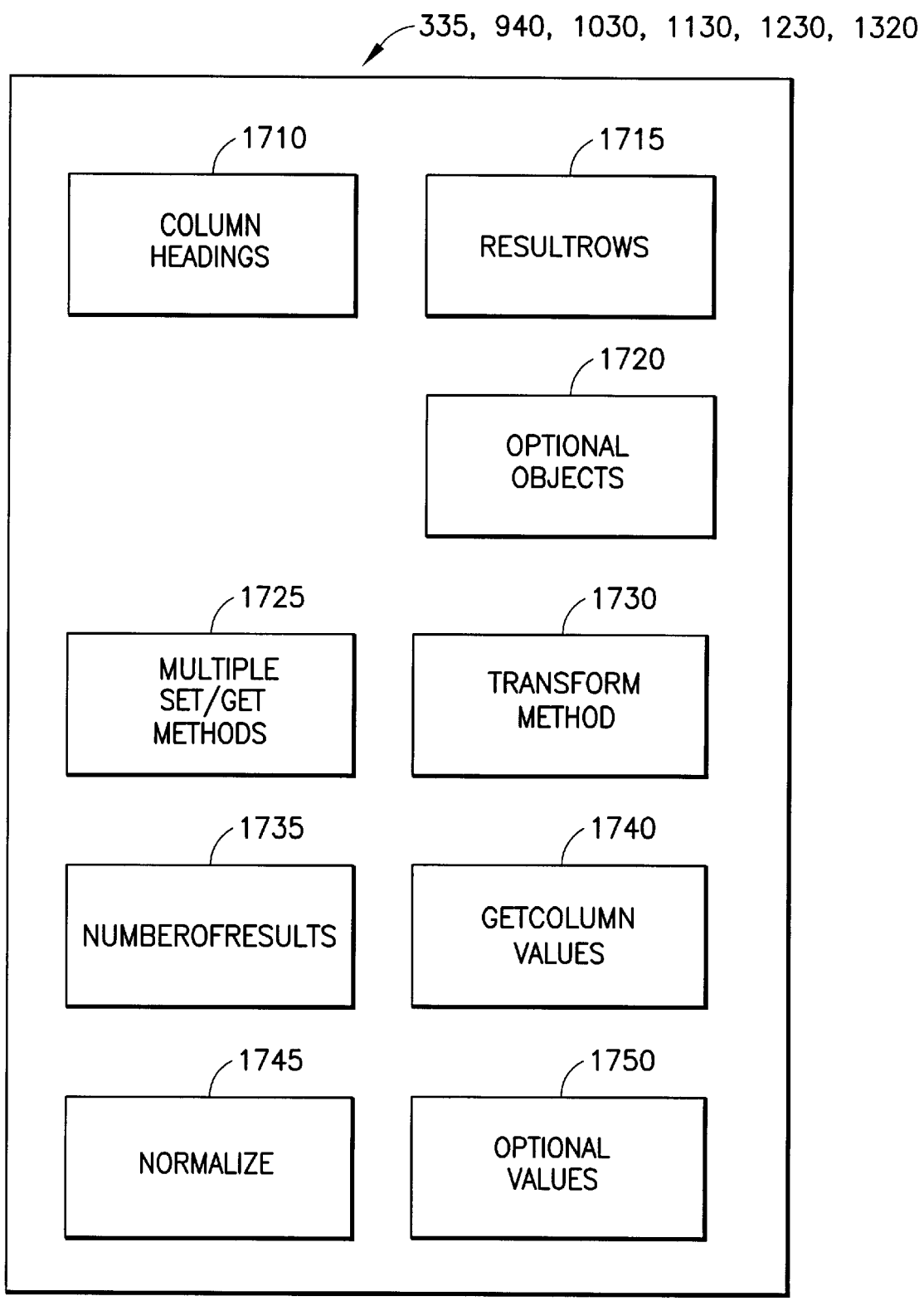
FIG. 17 is a block diagram of a Result Object.

Object 620 describes which values (i.e., which columns in which tables) the user requested as results for the query. Object 625 holds the results of executing a query. FIG. 17 describes this result object in more detail.

Figure 7:
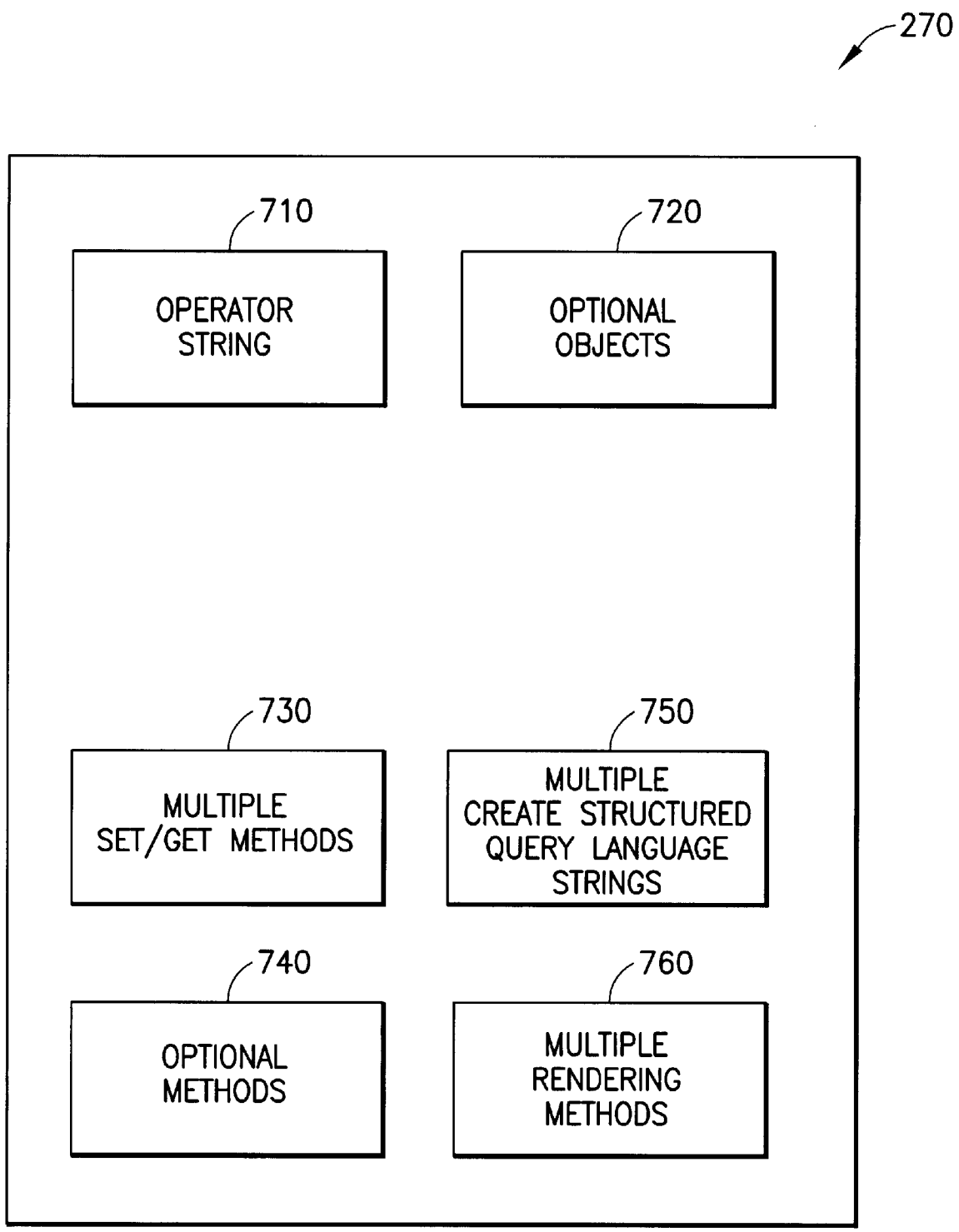
FIG. 7 is a block diagram of an Operator Query Object.

The Feature Atom Query Object 250 can contain additional optional objects 630 as deemed necessary by the application or the implementation. Methods 640 are multiple "set and get" methods for the variables, constants and objects within the Feature Atom Query Object 250. Methods 660 translate the feature attribute into structured language strings as required by either the database 210 or the user interface structured language. Methods 670 are multiple rendering methods which use user interface elements to show the feature attribute 610 and the feature type FIG. 7 is a block diagram of an Operator Query Object 270. This Query Object is a convenient implementation of operators like AND, OR, LIKE, EQUAL within this architecture. However they have the additional feature that one can use methods within an Operator Query Object 270 to overwrite the standard meaning of an operator. For instance, EQUAL may mean that two textstrings are equal if there are no differences between them or it they can be called equal when they contain the same letter independent of the punctuation and capitalization.

Object 710 is a text string describing the operator. The Operator Query Object 270 can contain additional optional objects 720 as deemed necessary by the application or the implementation.

Methods 730 are multiple "set and get" methods for the variables, constants and objects within the Operator Query Object 270. Methods 750 translate the text string 710 into structured language strings as required by either the database 210 or the user interface structured language. Methods 760 are multiple rendering methods which use user interface elements to show the operator 710.

Figure 8:
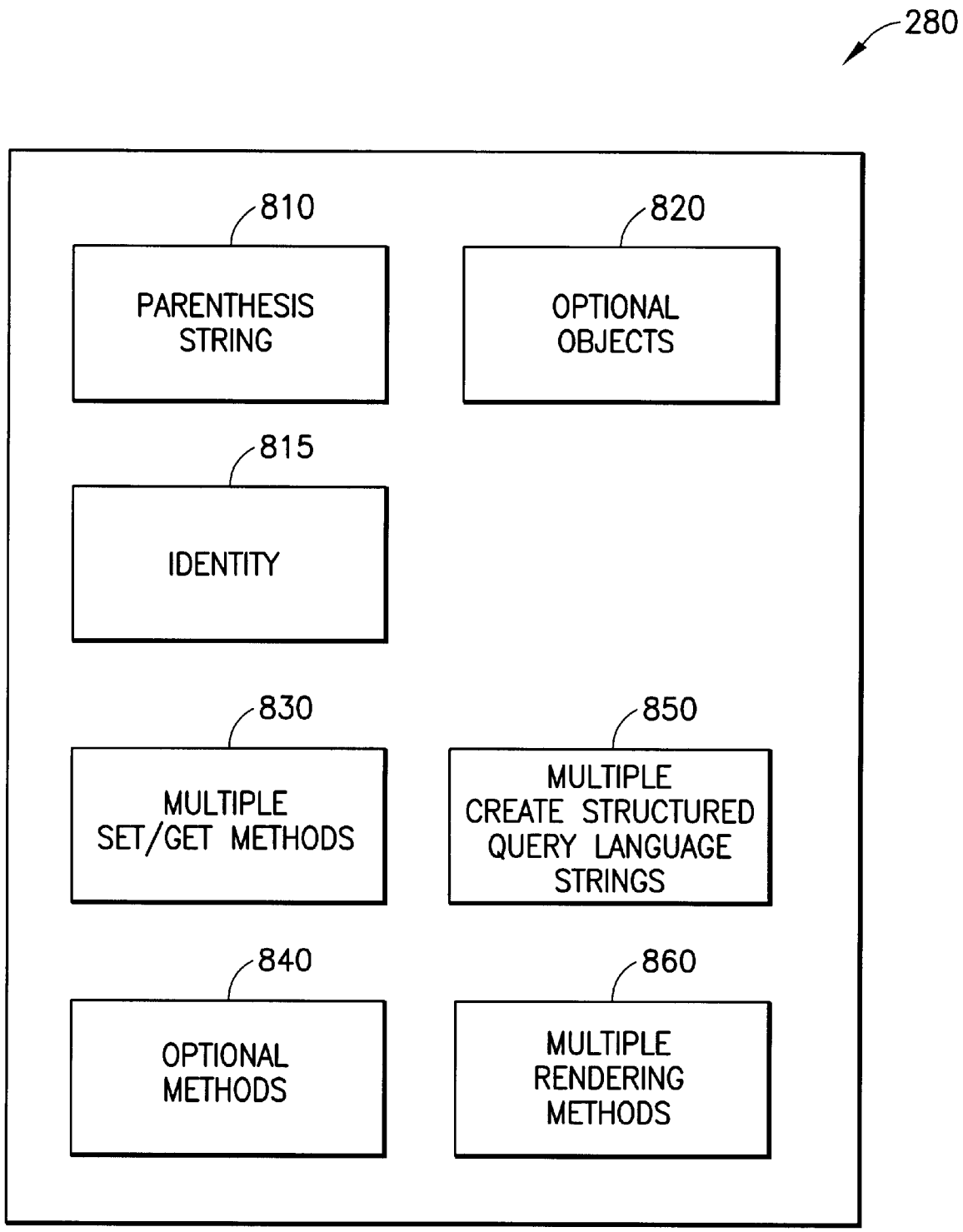
FIG. 8 is a block diagram of a Parenthesis Query Object.

FIG. 8 is a block diagram of a Parenthesis Query Object 280. This Query Object is a convenient implementation for parenthesis which establish a precedence of evaluation within a Boolean expression.

Object 810 is a text string describing the parenthesis. The Parenthesis Query Object 280 can contain additional optional objects 820 as deemed necessary by the application or the implementation. Object 815—identity—captures what type of parenthesis it is, e.g., left/right, round, curly and square to name a few non limiting examples.

Methods 830 are multiple set and get methods for the variables, constants and objects within the Parenthesis Query Object 280. Methods 850 translate the text string 810 into structured language strings as required by either the database 210 or the user interface structured language. Methods 860 are multiple rendering methods which use user interface elements to show the parenthesis 810.

The following is some pseudo code which capture the essence of Typed Elementary Query Objects 260 and Annotator Objects 290. Each of the specific objects may contain only some of the proposed code, others some additional one.

```
public class TypedElementaryQueryObject extends BaseQueryObject {
    private String name;
    private String value;
    private String type;
    private OperatorObject operator;
    private LinkedList resultcolumns;
    private ResultObject results=new ResultObject();
public TypedElementaryQueryObject(String N, String V,
    String T, OperatorObject O) {
    name=N;
    value=V;
    type=T;
    operator=O;
}
public ResultObject getResults(){
    return results;
}
public void setResults(ResultObject r) {
    results=r;
}
public void setOperator(OperatorObject op) {
    operator=op;
}
public OperatorObject getOperator() {
    return operator;
}
public void setresultcolumns(LinkedList1) {
    resultcolumns=1;
}
public void setName(String s) {
    name=s;
}
public String getName() {
    return name;
}
public void setValue(String s) {
    value=s;
}
public String getValue() {
    return value;
}
public void setType(String s) {
    type=s;
}
public String getType() {
    return type;
}
public int whoAmI() {
    return 18;
}
public String asGUIString() {
    String s="("+index+": "+value+")";
    return s;
}
public String asSql() {
    String s="";
    String temp=value;
    if (type.startsWith("TEXT"))
        temp="'"+temp+"'";
    s="FEATURE='"+name+"' AND"+column+
        operator.asSql()+temp;
    return s;
}
public ResultObject createExecute(String s) {
    results=createExecute(s, null, true);
    return results;
}
public ResultObject createExecute(String s, ColumnDefinition c, Boolean dir) {
    String sqlString=s+"WHERE"+asSql();
    super.setrcolumns(rcolums);
    results=executeStatement(sqlString, c, dir);
    return results;
}
public String createSQLexpression(String s) {
    String sqlString=s+"WHERE"+asSql();
    return sqlString
}
}
```

Figure 9:
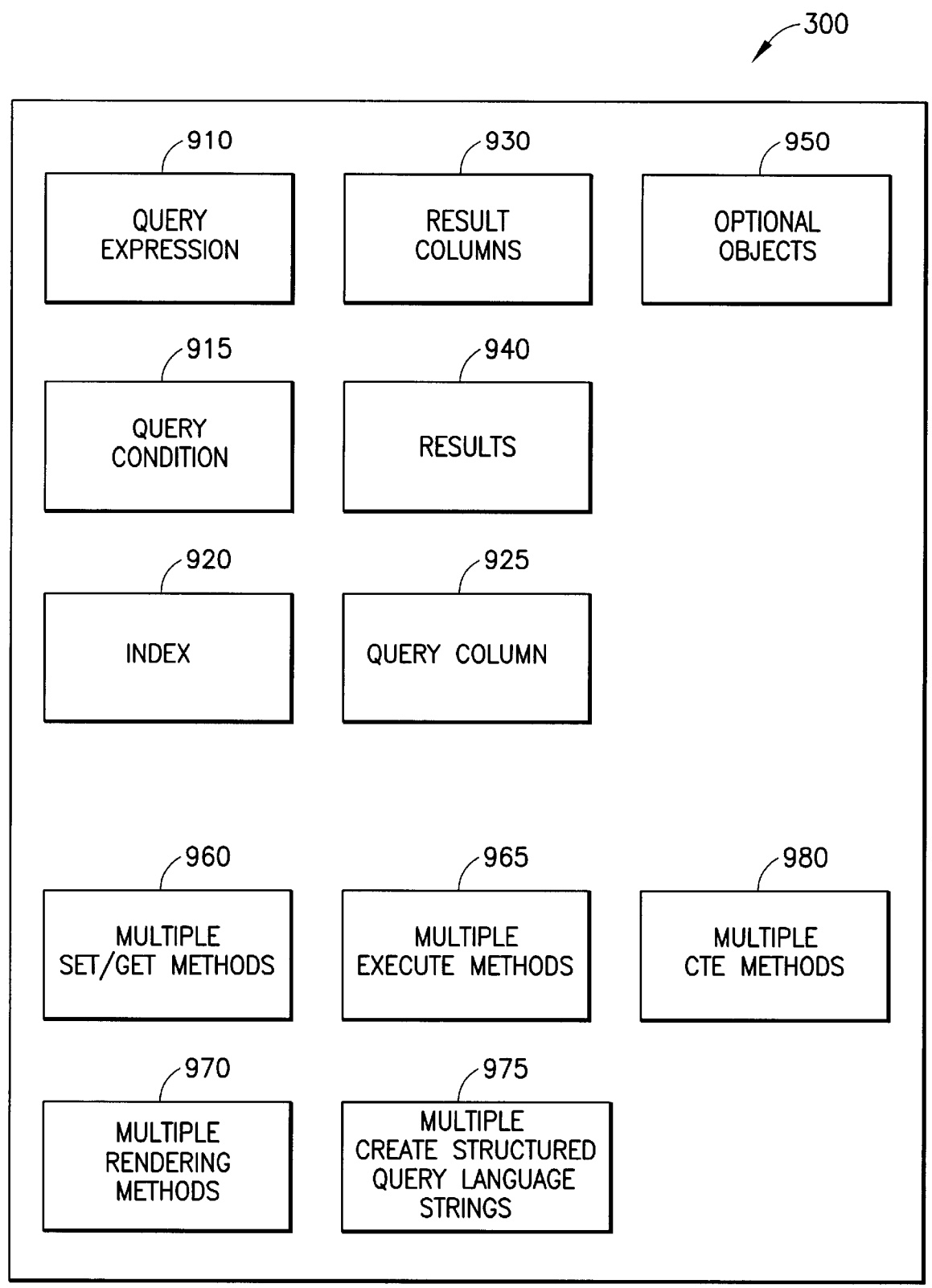
FIG. 9 is a block diagram of a Compound Free Text Query Object.

FIG. 9 is a block diagram of a Compound Free Text Query Object 300. This object is used to represent a complex free text query. A free text query searches documents for the words specified in a query in a specially build index which is part of the database. Documents containing some or all of the words are returned in a rank ordered faion, where the rank is roughly a function of the number of occurrences of the specified words in all the indexed documents in the database. (Note that different free text search engines compute the rank differently.) In one preferred embodiment, DB2 TextExtender, the free text search engine can support multiple indices (precise, linguistic and dual) as described FIG. 4 which shows the Text Atom Query Object 230. Furthermore, a user query may want to add some additional constraints which would narrow down the number of documents which should be searched for the occurrences of the words—the query condition 915 captures such constraints.

Object 910 holds the query expression, a collection of one or more Text Atom Query Objects 230. Object 915 encapsulates the query condition if the user wants to restrict the number of documents searched. For example, a query may want to find the documents which contain the word IMPEACHMENT and were written before Jan. 1st, 1998. The date condition in this example is a non limiting example of a query condition Object 920 denotes indices used to perform a free text search. One preferred embodiment of a free text search engine is DB2 Extenders (IBM™) which has special columns within DB2 which hold the information necessary to perform a free text search. Object 925 contains the specification of the column which is searched for the text specified in the query expression 910. Object 930 describes which values (i.e., which columns in which tables) the user requested as results for the query. Object 940 holds the results of executing a query. FIG. 17 describes this result object in more detail. Objects 950 represents optional objects which are system and implementation specific.

A Compound Free Text Query Object 300 has multiple "set and get" methods 960 for the constants, variables and objects within itself Methods 970 are a set of rendering methods which can write for instance the query condition or the query expression and the results to the GUI. It is up to the application what information gets explicitly exposed to the user (rendered) or which values are defaulted. Some of the rendering methods can be common to several of objects and be implemented in the Base Query Object leading to an efficient implementation of the system.

Methods 965 are multiple execute methods. These methods 965 allow for a modular and flexible system and they are type specific. The execute method in the Compound Free Text Query Object 300 knows how to assemble a structured query language string which when executed returns a set of ranked documents. One of the execute methods in the Base Query Object 220 knows how to take such a structured language string and "package" it correctly so that it can be shipped to a database. As a result, the Compound Free Text Query Object 300 does not need any knowledge about the communication between the application and the database. Conversely, the Base Query Object 220 does not need any knowledge about how to assemble a free text query and deal with multiple indexes.

Methods 975 are a set of methods to create structured query language strings, either in support of the execute method or in support of the query language as implemented by the GUI.

Another important aspect of the architecture captured in this disclosure is the ability to accommodate different methods which could enhance performance without the need to rewrite the whole application. Methods 980 are preferred embodiments of such methods. The outputs of such methods are strings in a structured query language which can be combined with strings created by similar methods in other typed query objects which then create an expression in a structured query language which captures the user query and can execute it very efficiently using Common Table Expressions. Such expressions allow for temporary tables to be constructed in a database which can be used for storing intermediate results. Such tables eliminate the need to load (potentially big) intermediate results making processing more efficient.

Figure 10:
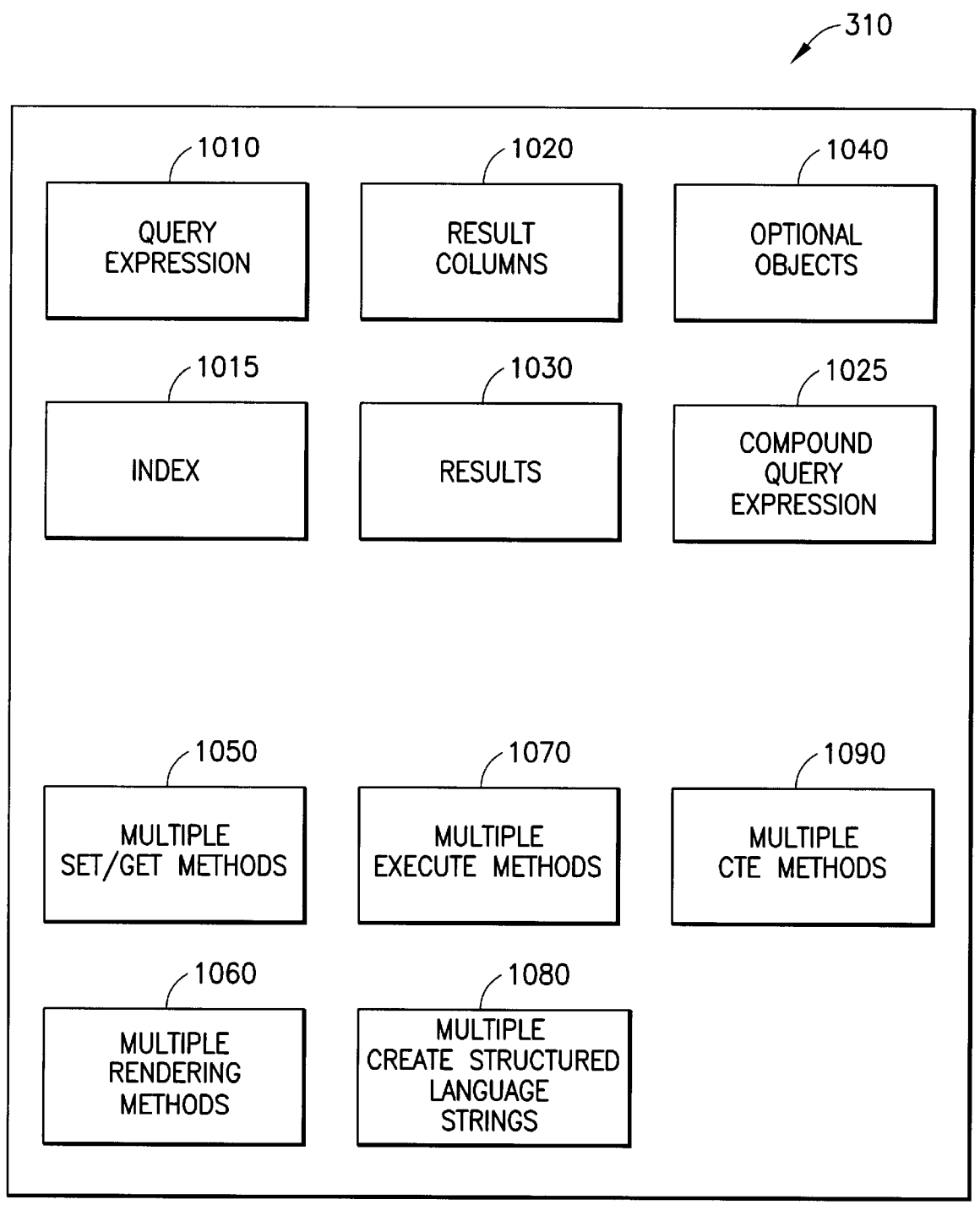
FIG. 10 is a block diagram of a Compound Boolean Text Query Object.

FIG. 10 is a block diagram of a Compound Boolean Text Query Object 310. A Compound Boolean Text Query Object is quite similar to a Compound Free Text Object 300. However, a Boolean text query returns a set of documents which satisfy a specified constraint. A document can either satisfy a certain constraint or not, hence ranking result documents does not apply to this type of queries. On the other hand, for a free text query, basically, only a set of words can be specified. In Boolean text search, the textual query condition can be quite complex: operators between the words ranging from simple and/or to 'in the same sentence as', parenthesis, synonyms etc., the complexity defined by the underlying text search engine.

Object 1010 holds the query expression, a Boolean expression of one or more text atom query objects. Object 1025 holds a Compound Query Expresssion representing the same Boolean Expression as Object 1010. In FIG. 3 in the description of Objects 321 and 341, these two Objects are explained in more detail. Object 1015 denotes indexes used to perform a Boolean text search. One preferred embodiment of a Boolean text search engine is DB2 Extenders (IBM™) which has special columns within DB2 which hold the information necessary to perform a Boolean text search Object 1020 describes which values (i.e., which columns in which tables) the user requested as results for the query. Object 1030 holds the results of executing a query. FIG. 17 describes this result object in more detail. Objects 1040 represents optional objects which are system and implementation specific.

A Compound Boolean Text Query Object 310 has multiple "set and get" methods 1050 for the constants, variables and objects within itself Methods 1060 are a set of rendering methods which can write for instance the query condition or the query expression and the results to the GUI. It is up to the application what information gets explicitly exposed to the user (rendered) or which values are defaulted. Some of the rendering methods can be common to several of objects and be implemented in the Base Query Object 220 leading to an efficient implementation of the system. Methods 1070 are multiple execute methods. These methods allow for a modular and flexible system and they are type specific. The execute method in the Compound Boolean Free Text Query Object knows how to assemble a structured query language string which when executed returns a set of documents satisfying the specified constraint. One of the execute methods in the Base Query Object knows how to take such a structured language string and "package" it correctly so that it can be shipped to a database. As a result, the Compound Boolean Text Query Object does not need any knowledge about the communication between the application and the database. Conversely, the Base Query Object does not need any knowledge about how to assemble a Boolean text query and deal with multiple indexes.

Methods 1080 are a set of methods to create structured query language strings, either in support of the execute method or in support of the query language as implemented by the GUI.

Figure 11:
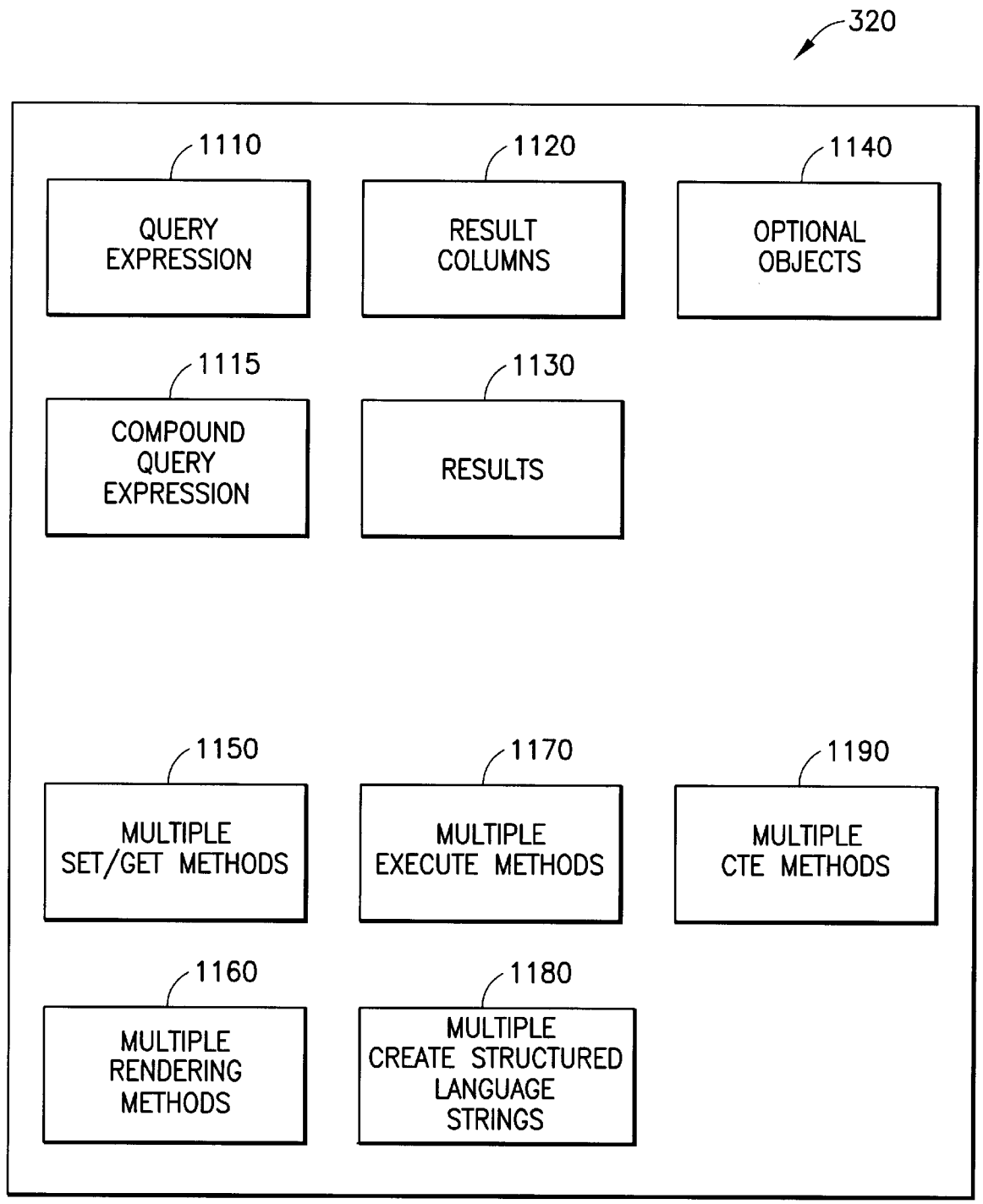
FIG. 11 is a block diagram of a Compound Parametric Query Object.

Another important aspect of the architecture captured in this disclosure is the ability to accommodate different methods which could enhance performance without the need to rewrite the whole application. Methods 1090 are preferred embodiments of such methods. The outputs of such methods are strings in a structured query language which can be combined with strings created by similar methods in other typed query objects which then create an expression in a structured query language which captures the user query and can execute it very efficiently using Common Table Expressions. Such expressions allow for temporary tables to be constructed in a database which can be used for storing intermediate results. Such tables eliminate the need to load (potentially big) intermediate results making processing more efficient FIG. 11 is a block diagram of a Compound Parametric Query Object 320. A parametric query is the most basic query against a database. In general it has the form to find all documents where specified constraints hold. A basic constraint is of the form <attribute> <operator> <value> as described in the Parametric Attribute Query Object 240 (FIG. 5). General constraints are Boolean expressions of parametric attributes.

Object 1110 holds the parametric query expression which constitutes the query. For example a parametric query expression would be: find the television programs whose SUBJECT is IAPEACHMNT AND whose NARRATOR is CRONKITE. The query expression is a Boolean expression of Parametric Attribute Query Objects 240. Object 1115 holds a Compound Query Expression representing the same Boolean Expression as Object 1110. In FIG. 3 in the description of Objects 321 and 341, these two Objects are explained in more detail Object 1120 describes which values (i.e., which columns in which tables) the user requested as results for the query. Object 1130 holds the results of executing a query. FIG. 17 describes this result object in more detail. Objects 1140 represents optional objects which are system and implementation specific.

A Compound Parametric Query Object 320 has multiple "set and get" methods 1150 for the constants, variables and objects within itself. Methods 1160 are a set of rendering methods which can write for instance the query expression and the results to the GUI. It is up to the application what information gets explicitly exposed to the user (rendered) or which values are defaulted. Some of the rendering methods can be common to several of objects and be implemented in the Base Query Object 220 leading to an efficient implementation of the system. Furthermore, a rendering method within the Compound Parametric Query Object 320 could use a rendering method in a Parametric Attribute Query Object 240. For example, the rendering method within a Parametric Attnbute Query Object knows how to draw a <attribute> <operator> <value> triplet, whereas the rendering method in the Compound Parametric Query Object 320 knows how to draw combinations and relations between such triplets. Again, each object knows how to render one thing without the need of any knowledge about the rendering of another object.

Methods 1170 are multiple execute methods. These methods allow for a modular and flexible system and they are type specific. An execute method in a Compound Parametric Query Object 320 knows how to assemble a structured query language string which when executed returns a set of documents satisfying the specified constraint. One of the execute methods in the Base Query Object 220 knows how to take such a structured language string and "package" it correctly so that it can be shipped to a database. As a result, the Compound Parametric Query Object does not need any knowledge about the communication between the application and the database. Conversely, the Base Query Object 220 does not need any knowledge about how to assemble a Boolean text query and deal with multiple indexes.

The query expression 1110 is a Boolean expression and the linearize method 370 in a Base Query Object 220 can be used to transform it into a postfix notation or any other notation which is suitable for evaluation. This is another example of the modular and streamlined architecture suggested here.

Methods 1180 are a set of methods to create structured query language strings, either in support of the execute method or in support of the query language as implemented by the GUI.

Another important aspect of the architecture captured in this disclosure is the ability to accommodate different methods which could enhance performance without the need to rewrite the whole application. Methods 1190 are preferred embodiments of such methods. The outputs of such methods are strings in a structured query language which can be combined with strings created by similar methods in other typed query objects which then create an expression in a structured query language which captures the user query and can execute it very efficiently using Common Table Expressions. Such expressions allow for temporary tables to be constructed in a database which can be used for storing intermediate results. Such tables eliminate the need to load (potentially big) intermediate results making processing more efficient.

Figure 12:
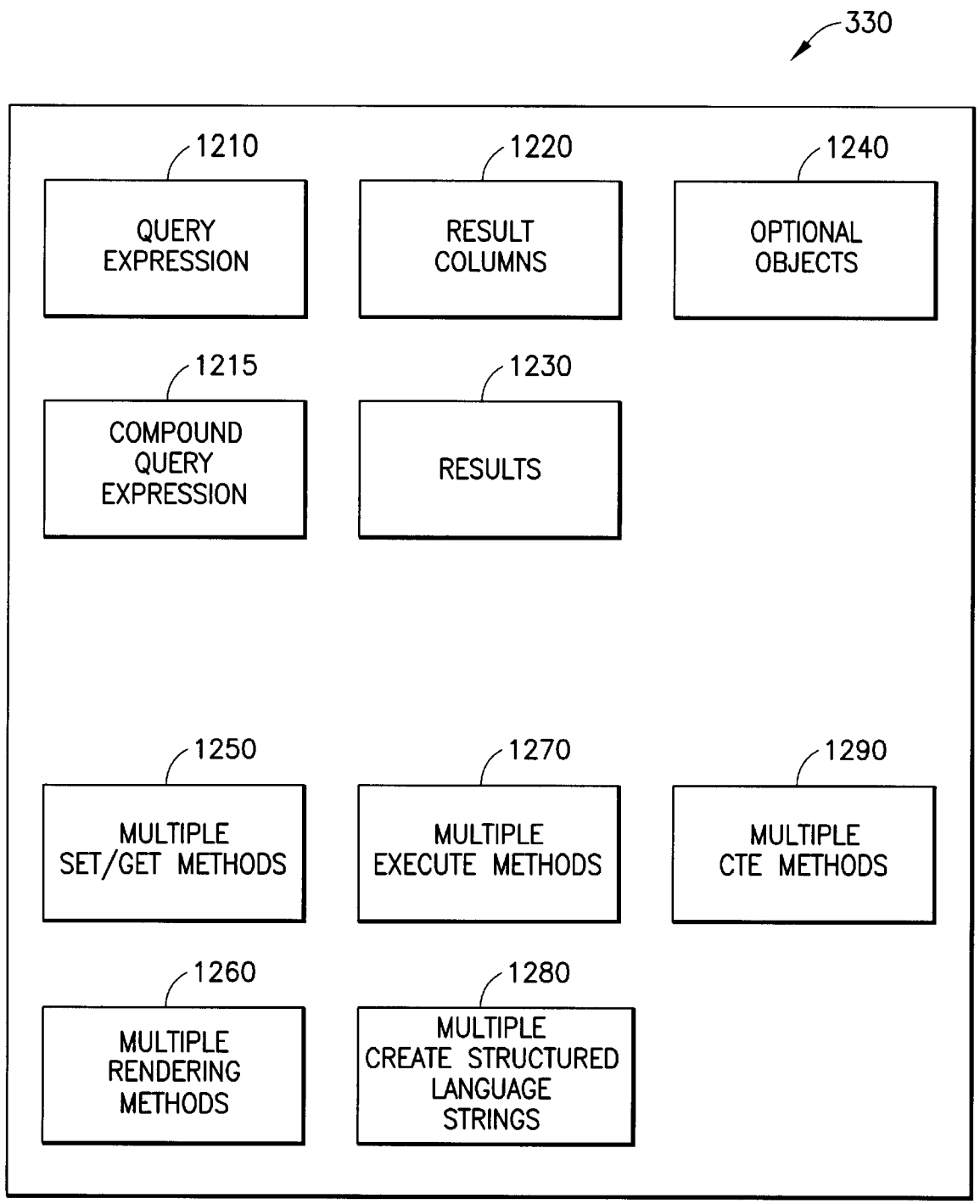
FIG. 12 is a block diagram of a Compound Feature Query Object.

FIG. 12 is a block diagram of a Compound Feature Query Object 330. In many respects a Compound Feature Query Object 330 is very similar to a Compound Parametric Query Object 320, however the differences are quite important. The query expression 1210 in a Compound Feature Query Object 330 is a Boolean expression of Feature Atom Query Objects 250 whose types are computed which implies the columns in the database to be searched. In contrast, the Parametric Attribute Query Object 240 gives a precise specification of the database search. Furthermore, in a Compound Parametric Query Object 320, the results are rows (or parts of rows) from the database are returned, which satisfy the query expression. In a Compound Feature Query 330 the results are rows (or part of rows) and some additional computed results. The following example should clarify this statement.

Assume that there is database table F1 which has the following columns: FEATURE, START, STOP, INTVALUE, STRINGVALUE. We will focus on two entries in the feature column: MOTION MAGNITUDE and ZOOM. Motion Magnitude is specified using an integer, and hence in that row an integer value will be placed in the intvalue column. ZOOM is specified with the text string IN or OUT and hence in the rows where FEATURE is ZOOM, the appropriate values will be placed in the stringvalue column START and STOP refer to the beginning and ending of a time interval and they are recorded as appropriate. A user query of the form: find all videos which have MOTION MAGNITUDE=10 and ZOOM=IN and return the time interval when both conditions are true require a computation of the time interval. Basically the intersection of all time intervals where MOTION MAGNITUDE=10 has to be taken with all intervals where ZOOM=IN. The results will return START and STOP columns, however the values in these columns are computed and not just retrieved from the database.

Object 1210 holds a query expression which is a Boolean expression of Feature Atom Query Objects. Object 1215 holds a Compound Query Expression representing the same Boolean Expression as Object 1210. In FIG. 3 in the description of Objects 321 and 341, these two Objects are explained in more detail.

Object 1220 describes which values (i.e., which columns in which tables) the user requested as results for the query. Object 1230 holds the results of executing a query. FIG. 17 describes this result object in more detail. Objects 1240 represents optional objects which are system and implementation specific.

A Compound Feature Query Object 330 has multiple set and get methods 1250 for the constants, variables and objects within itself. Methods 1260 are a set of rendering methods which can write for instance the query expression and the results to the GUI. It is up to the application what information gets explicitly exposed to the user (rendered) or which values are defaulted. Some of the rendering methods can be common to several of objects and be implemented in the Base Query Object 220 leading to an efficient implementation of the system. Furthermore, a rendering method within the Compound Feature Query Object 330 could use a rendering method in a Feature Atom Query Object 250. For example, the rendering method within a Feature Atom Query Object 250 knows how to draw a <feature> <operator> <value> triplet, whereas the rendering method in the Compound Feature Query Object 330 knows how to draw combinations and relations between such triplets. Again, each object knows how to render one thing without the need of any knowledge about the rendering of another object.

Methods 1270 are multiple execute methods. These methods allow for a modular and flexible system and they are type specific. The execute method in the Compound Feature Query Object 330 knows how to assemble a structured query language string which when executed returns a set of documents satisfying the specified constraint. One of the execute methods in the Base Query Object 220 knows how to take such a structured language string and "package" it correctly so that it can be shipped to a database. As a result, the Compound Feature Query Object 330 does not need any knowledge about the communication between the application and the database. Conversely, the Base Query Object 220 does not need any knowledge about how to compute intersections and unions or other combinations of values which are returned from the database. The query expression 1210 is a Boolean expression and the linearize method 370 in a Base Query Object 220 can be used to transform it into a postfix notation or any other notation which is suitable for evaluation. This is another example of the modular and streamlined architecture suggested here.

The execute methods in a Compound Feature Query Object 330 need to be able to evaluate a Boolean expression. There are different ways of doing so. In one preferred embodiment each Feature Atom Query is executed and the its results retained. More specific the following steps can be performed:

1) Execute the query as specified by each of the Feature Atom Query Objects 250 in the Boolean expression 1210

2) Obtain the query Result Objects 625 for each of the Feature Atom Query Objects 250 in the Boolean expression.

3) Substitute the query Result Objects 625 of step 2 in the Boolean expression for the Feature Atom Query Objects 250. The results in a Boolean expression of Result Objects where the Boolean expression is identical to the one specified in the Compound Feature Query Object 330.

4) Combine the results according to the rules of the Boolean expression and the operators involved.

Figures 16, 16A, 16B:
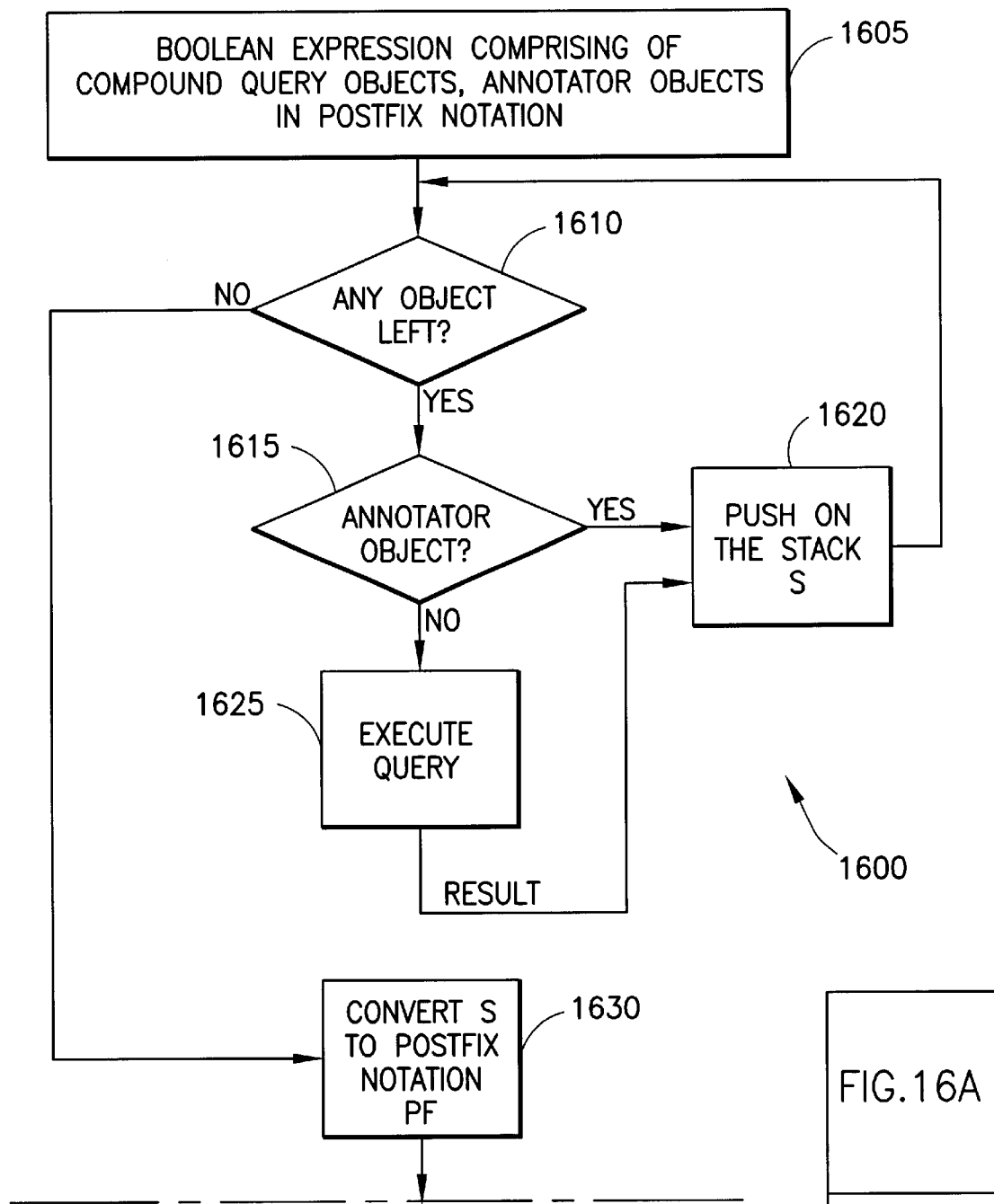
FIG. 16 is a flowchart of a typical execute method which is part of a Boolean Compound Query Object or a Compound Feature Query Object.
Figure 16B:
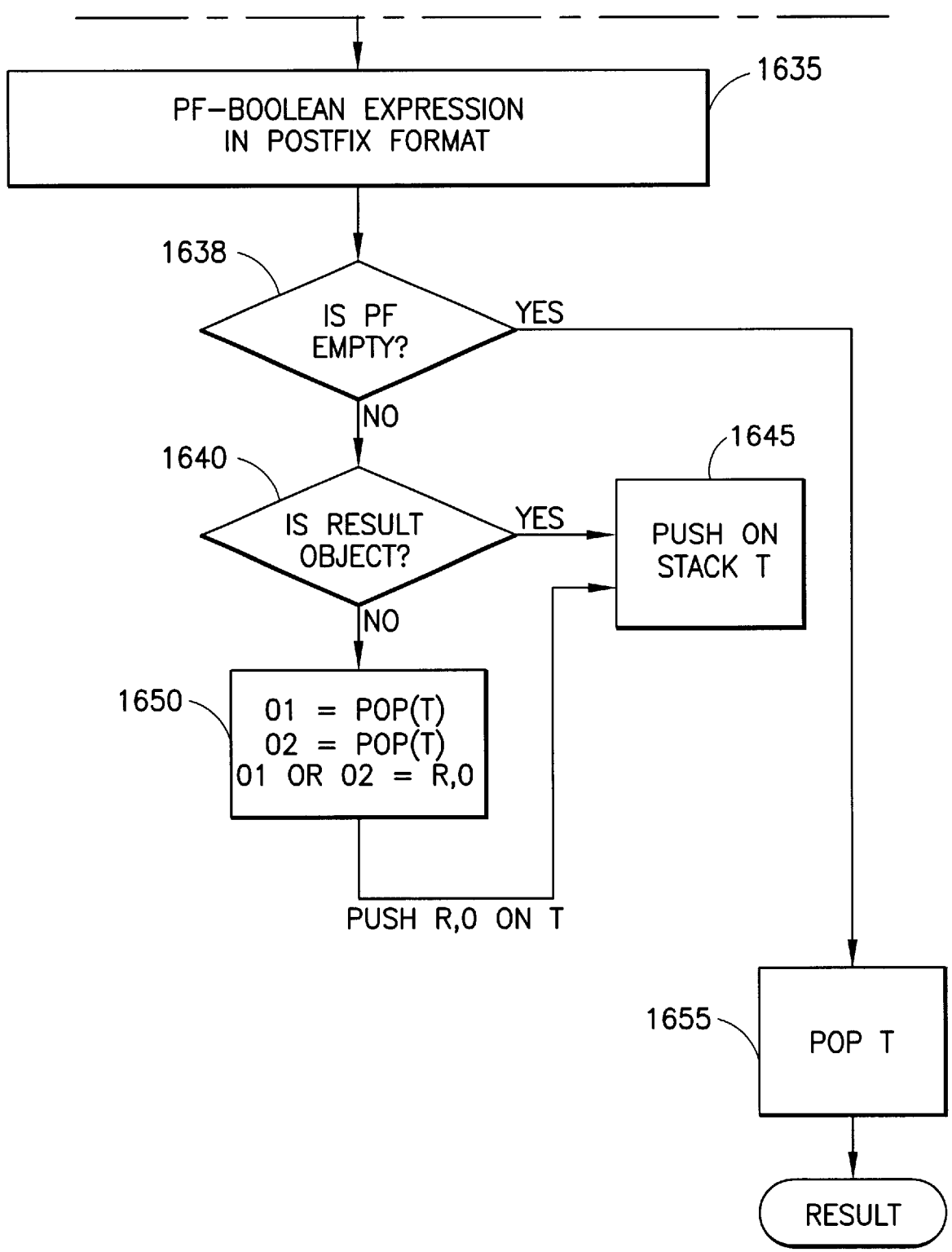

FIG. 16 shows a flowchart of a typical execute method in a Compound Feature Query Object 330.

Methods 1280 are a set of methods to create structured query language strings, either in support of the execute method or in support of the query language as implemented by the GUI.

Another important aspect of the architecture captured in this disclosure is the ability to accommodate different methods which could enhance performance without the need to rewrite the whole application. Methods 1290 are preferred embodiments of such methods. The outputs of such methods are strings in a structured query language which can be combined with strings created by similar methods in other typed query objects which then create an expression in a structured query language which captures the user query and can execute it very efficiently using Common Table Expressions. Such expressions allow for temporary tables to be constructed in a database which can be used for storing intermediate results. Such tables eliminate the need to load (potentially big) intermediate results making processing more efficient.

Figure 20B:
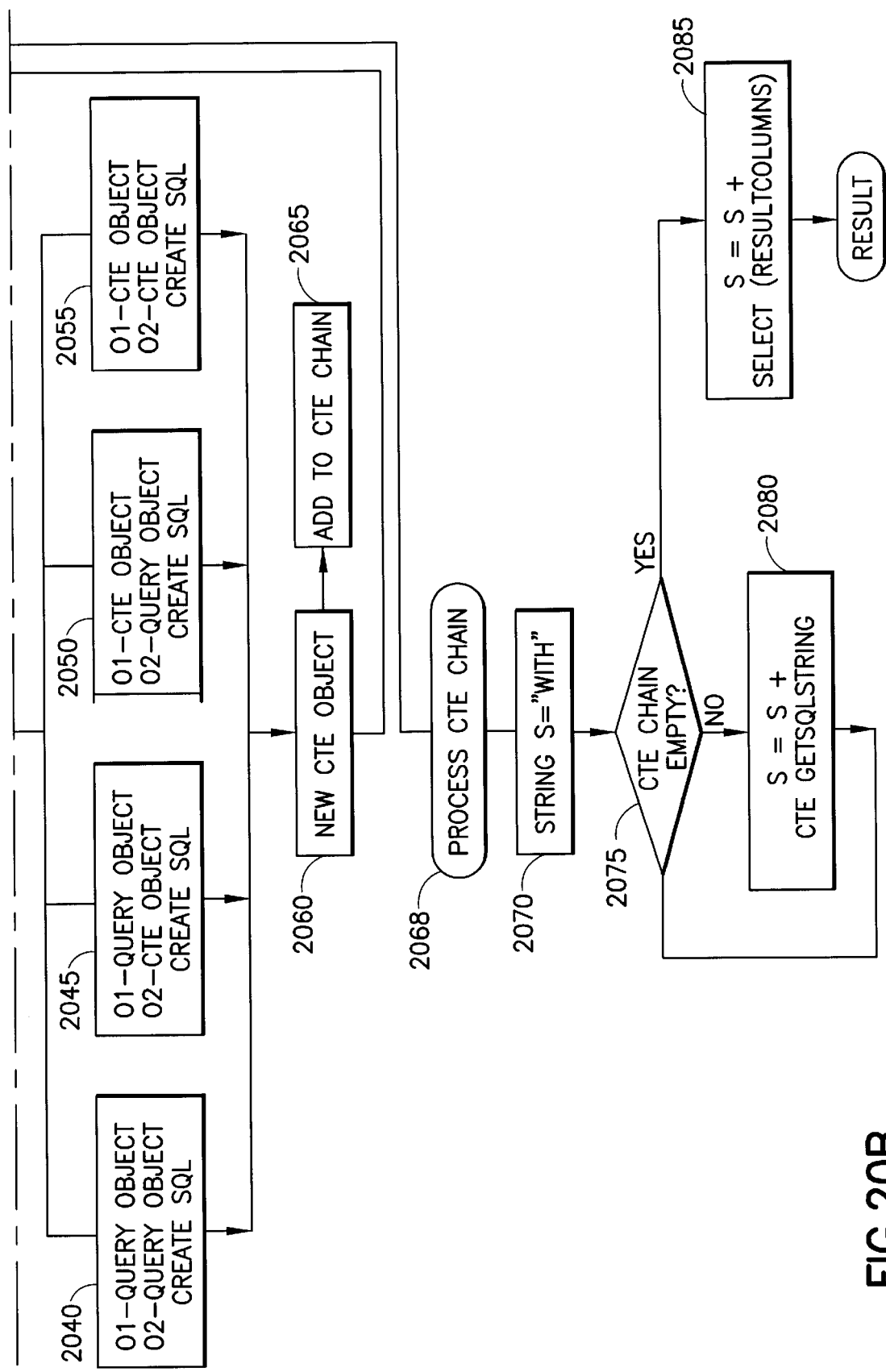
FIG. 20 is a flowchart of a high performance execute method in a Boolean Compound Query Object or a Compound Feature Query Object.

The above algorithm is just one of many possible. Another embodiment for evaluating the Boolean expression is described in part in methods 1290. FIG. 20 describes this algorithm. Methods 1290 show a different way of evaluating the Boolean expression to create a string in a structured query language which is more efficient to evaluate. In one preferred embodiment, methods 1290 are common table expression methods which create instances of Common Table Expression Objects (described later in this disclosure) which in turn contain strings which describe the user feature atom query. Such expressions are used to construct a very efficient (in terms of execution time) query string.

The following is some pseudo code for a typical Typed Compound Query Object 340. Clearly, each type has different code and may contain some different methods and objects. The pseudo code shown resembles the most a Compound FreeText Query Object 300.

```
public class TypedCompoundQueryObject extends Base-
   QueryObject {
   private LinkedList resultcolumns=new LinkedList();
   private LinkedList columnhandles;
   private LinkedList queryString;
   private String freetext;
   private ResultObject results=null;
public TypedCompoundQueryObject(LinkedList rc,
   LinkedList ch, LinkedList q) {
   rc.reset();
   ColumnDefinition c;
   while (rc.hasMoreElements()) {
      c=(DB2 ColumnDefinition)rc.nextElement();
      resultcolumns.append(c);
}
columnhandles=ch;
queryString=q;
   freetext=ta.asSql();
}
public int whoAmI() {
   return 9;
}
   public ResultObject getResults() {
      return results;
}
public ResultObject executeQuery(ColumnDefintion sort,
   Boolean dir) {
   String columns=super.determineSelectedColumns
      (resultcolumns, 0);
```

```
String tables=super.determineTables(resultcolumns);
String handles=super.createCommaString
    (columnhandles);
String sqlString="WITH TMWTABLE("+columns+",
    RANK)AS";
sqlString=sqlStrn+"(SELECT  "+columns
    +",DB2TX.RANK("+handles+, '"+freetext+'")
    FROM"+tables,
sqlString=sqlstrin+determineWhere(queryString)+")";
sqlstring=sqlString+"  SELECT*FROM
    TEM?TABLEWEE RANK>0 ORDER BY RANK
    DESC";
ColumnDefinition c=new ColumnDefinition("RANK",
    "DOUBLE", "NULL");
resultcolumns.append(c);
super.setrcolumns(resultcolumns);
results=super.executeStatement(sqlString, sort, dir);
return results;
    }
}
```

Figure 13:
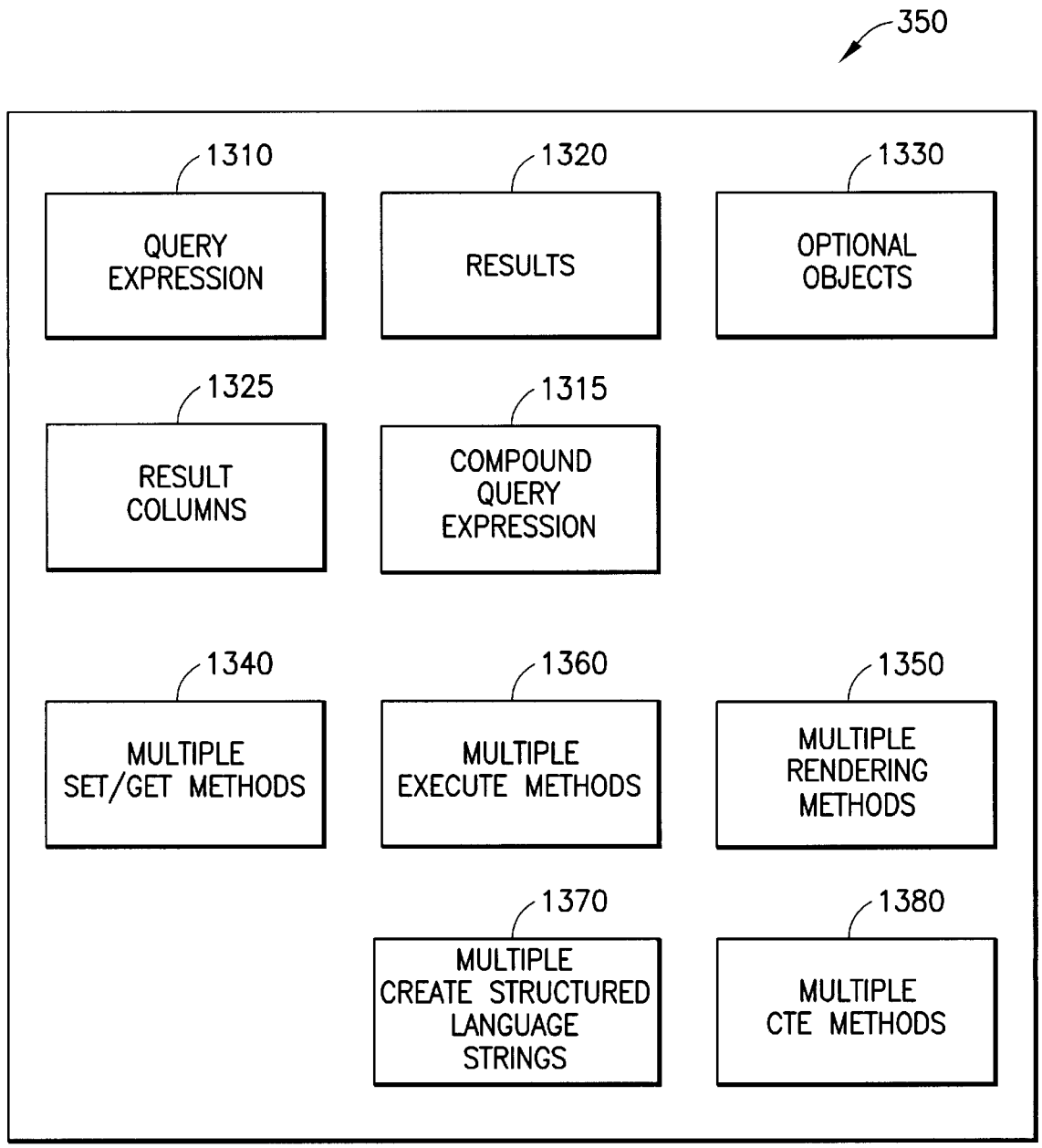
FIG. 13 is a block diagram of a Boolean Compound Query Object.

FIG. 13 is a block diagram of a Boolean Compound Query Object 350. The query expression in a Boolean Compound Query Object 350 represents the complete user query composed of Typed Compound Query Objects 340 and Annotator Objects 290. Typed Compound Query Objects 340 in turn have query expressions composed of Typed Elementary Query Objects 260 and Annotator Objects 290.

Object 1310 holds the Boolean Query Expression which constitutes the query. Object 1315 holds a second representation of the query called the Compound Query Expression. Both query expressions (1310 and 1315) express the same Boolean Expression using different representations and were shown in FIG. 3 as Objects 321 and 341. The Boolean Query Expression consists of instances of Typed Compound Query Objects 340 and Anmotator Query Objects 290. For example, a Boolean expression could be of the form "(Text Query AND Feature Query) OR Parametric Query." The Compound Query Expression 1315 is described in detail in FIGS. 15 and 19.

Object 1320 holds the results of executing a query. FIG. 17 describes this result object in more detail. Objects 1330 represents optional objects which are system and implementation specific.

A Boolean Compound Query Object 350 may contain a special set of resultcolumns 1325. These results columns are used to express the following user query which is explained in two steps:

1) Determine a set of values for which a set of query condition holds.

2) To determine the final result, add the values in the specified result columns for which the user query evaluated to true.

A Boolean Compound Query Object 350 has multiple set and get methods 1340 for the constants, variables and objects within itself Methods 1350 are a set of rendering methods which can write for instance the query expression and the results to the GUI. It is up to the application what information gets explicitly exposed to the user (rendered) or which values are defaulted. Some of the rendering methods can be common to several of objects and be implemented in the Base Query Object 220 leading to an efficient implementation of the system. Furthermore, a rendering method within the Boolean Compound Query Object 350 could use rendering methods in Typed Compound Query Objects 340.

Methods 1360 are multiple execute methods. These methods allow for a modular and flexible system. However this method is not really type specific: it knows how to traverse the query expression, invoke the execute methods in the Typed Compound Query Objects and assemble the results. One of the execute methods in the Base Query Object 220 knows how to take such a structured language string and "package" it correctly so that it can be shipped to a database. As a result, the Boolean Compound Query Object 350 does not need any knowledge about the communication between the application and the database. Conversely, the Base Query Object 220 does not need any knowledge about how to assemble a Boolean text query and deal with multiple indexes. This method is described in more detail in FIG. 16. A consequence of this type of a execute method is, that execute methods in the Typed Compound Query Objects could be changed without the need of changing the execute method in the Boolean Compound Query Object 350.

The query expression 1310 is a Boolean expression and the linearize method 370 in a Base Query Object 320 can be used to transform it into a postfix notation or any other notation which is suitable for evaluation. This is another example of the modular and streamlined architecture suggested here.

Methods 1370 are a set of methods to create structured query language strings, either in support of the execute method or in support of the query language as implemented by the GUI.

Figure 14:
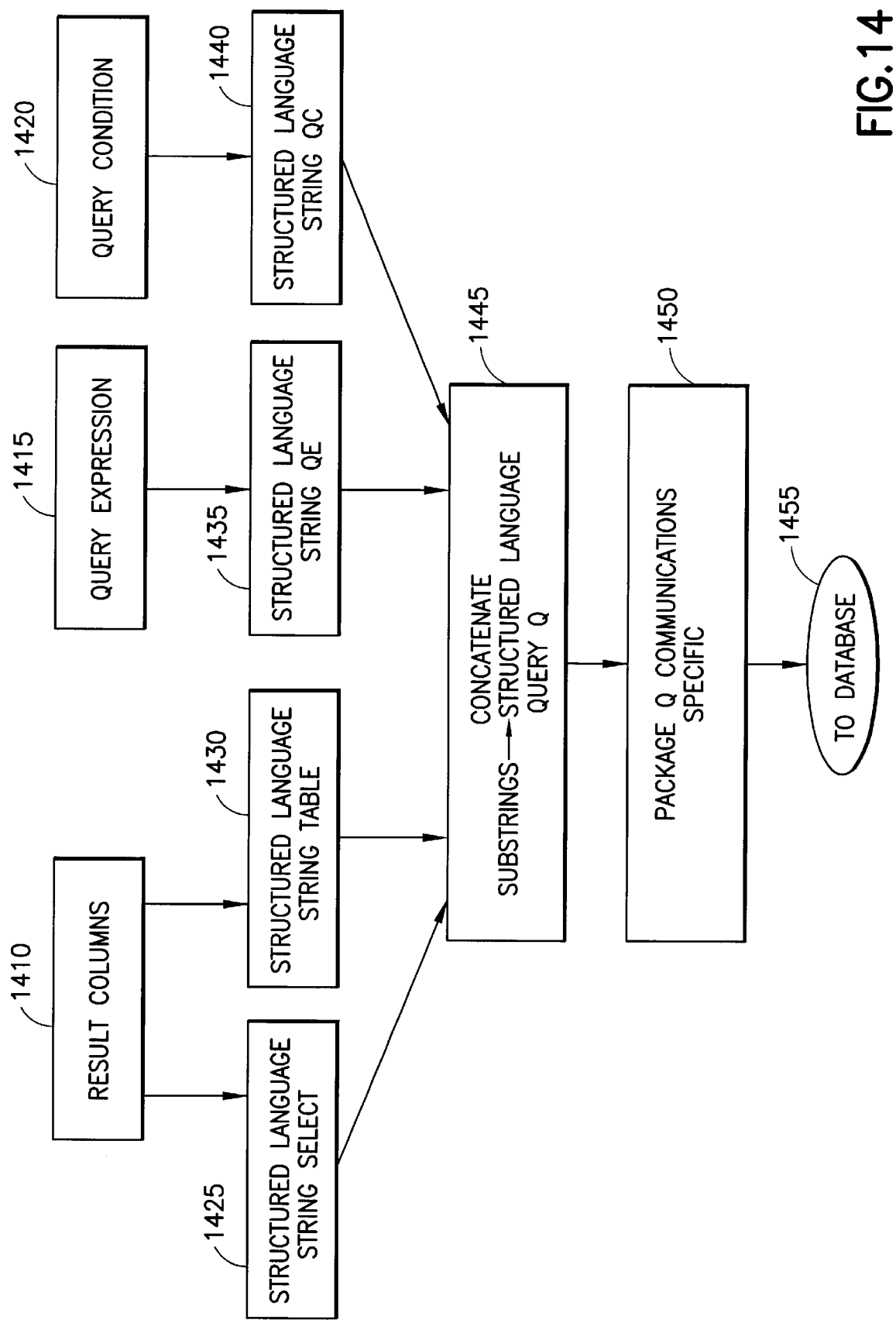
FIG. 14 is a flowchart of a typical execute method which is a part of Typed Compound Query Object.

FIG. 14 is a flowchart of a typical execute method which is a part of Typed Compound Query Object 340. Clearly, the specific execute methods are different in each type of Typed Compound Query Object 340. It is one of the key features of this architecture, that each Query Object can create appropriate transformations from itself to either a form suitable for the GUI or a form suitable for communication with the database. Hence, the specifics of the execute method(s) in each of the Typed Compound Query Object 340 are different and there could be multiple ones, as different implementations are possible. However there is a certain commonality to these methods which is described in this FIG. 14.

Basically, the method takes two or three inputs as appropriate: the resultcolumns 1410, the query expression 1415 and the query condition 1420. Each of these inputs gets transformed in an appropriate structured query language string 1425, 1430, 1435, 1440. These strings are concatenated (with the structured language specific punctuation) to form a structured language string which describes the query 1445 Q. The last step is the "packaging" of Q, as different communications protocols could be used between the application and the database. In step 1450 the communications and database dependent elements are added to Q and then submitted to the database in 1455. In one preferred embodiment, the last three steps 1444, 1450 and 1450 are implemented as methods in a Base Query Object 220. Hence, in case the communications protocol needs to be changed, only the method(s) in the Base Query Object 220 have to be changed, leaving the rest of the implementation of an application unchanged.

The following is some pseudo code, specific implementation may vary.

```
public void execute( ) {
    QueryList.reset( );
    LinkedList component_results = new LinkedList( );
        if (QueryList.size( ) == 3) {
            Query o = (Query)QueryList.nextElement( );
        /* its a parenthesis */
        if (o.whoAmI( ) < 6) {
            o = (Query)QueryList.nextElement( );
            combinedResults = o.executeQuery(sort, dir);
        }
        else {
            System.out.println("CompoundQuery is ill-formed");
        }
    }
    else {
        while (QueryList.hasMoreElements( )) {
            Query o = (Query)QueryList.nextElement( );
            /* its an operator or a parenthesis */
            if (o.whoAmI( ) < 6) {
                component_results.append(o);
            }
            /* its a query */
            else {
                ResultObject r = o.executeQuery(sort, dir);
                if (r == null)
                    /* creates a ResultObject which identifies
                    itself as being null */
                    r = new ResultObject(2);
                    component_results.append(r);
                }
            }
            /* component_results is a LinkedList of Annotator
            Objects and ResultObjects */
            /* mirroring QueryList with the Query Objects replaced by
            ResultObjects */
            /* convert the component_results vector from an
            inFix representation into a */
            /* postFix representation */
            LinkedList pf_results =
            Combine.asPostFix(component_results);
            /* combine the results into a single ResultObject */
            combinedResults = Combine.combine(pf_results);
        }
    }
}
```

In one preferred embodiment, the result columns 1410 contain several pieces of information: for each column, the name, its type and the table it belongs to are known. Hence they can be used to deduct both the column and table information for the query.

FIG. 15 is a flowchart of a linearize method 371 in FIG. 3 for the Base Query Object 220 applicable to all Derived Query Objects 360, or "Query Objects" for short. The method 371 transforms Compound Query Expressions (341, 1025, 1115, 1215, and 1315), for Typed Compound Query Objects and Boolean Compound Query Objects into Query Expressions (321, 910, 1010, 1110, 1210, 1310) for these Derived Query Objects 360. Compound Query Expressions (341, 1025, 1115, 1215, and 1315), are useful for the process in FIG. 19 for generating a Boolean Compound Query Object 350 from end user input to a Graphical User Interface (GUI) 127, and Query Expressions (321, 910, 1010, 1110, 1210, 1310), which are useful for the method in FIG. 20 for executing Derived Query Objects 360, as described in the method of FIG. 20.

The Compound Query Expressions 1315 (derived from a Compound Query Expression 341) for the Boolean Compound Query Object 350 in FIG. 13 is itself an instance of a Boolean Compound Query Object 350, and this instance in turn contains a Compound Query Expression 1315, comprising in turn of some Boolean combination of Derived Query Objects 360. We can describe this circumstance by saying that the Compound Query Expressions (341, 1025, 1115, 1215, and 1315), exemplify "recursion" or "recursive nesting" in that Compound Query Expressions (341, 1025, 1115, 1215, and 1315) contain Derived Query Objects 360 each of which in turn contain Compound Query Expressions 341, 1025, 1115, 1215, and 1315) which contain Derived Query Objects 360 each of which contains a Compound Query Expression 341, 1025, 1115, 1215, and 1315) and so on to any level of recursive nesting. Recursion is well known algorithmic structure in general, however this application of recursion is new.

Figures 2, 15C:
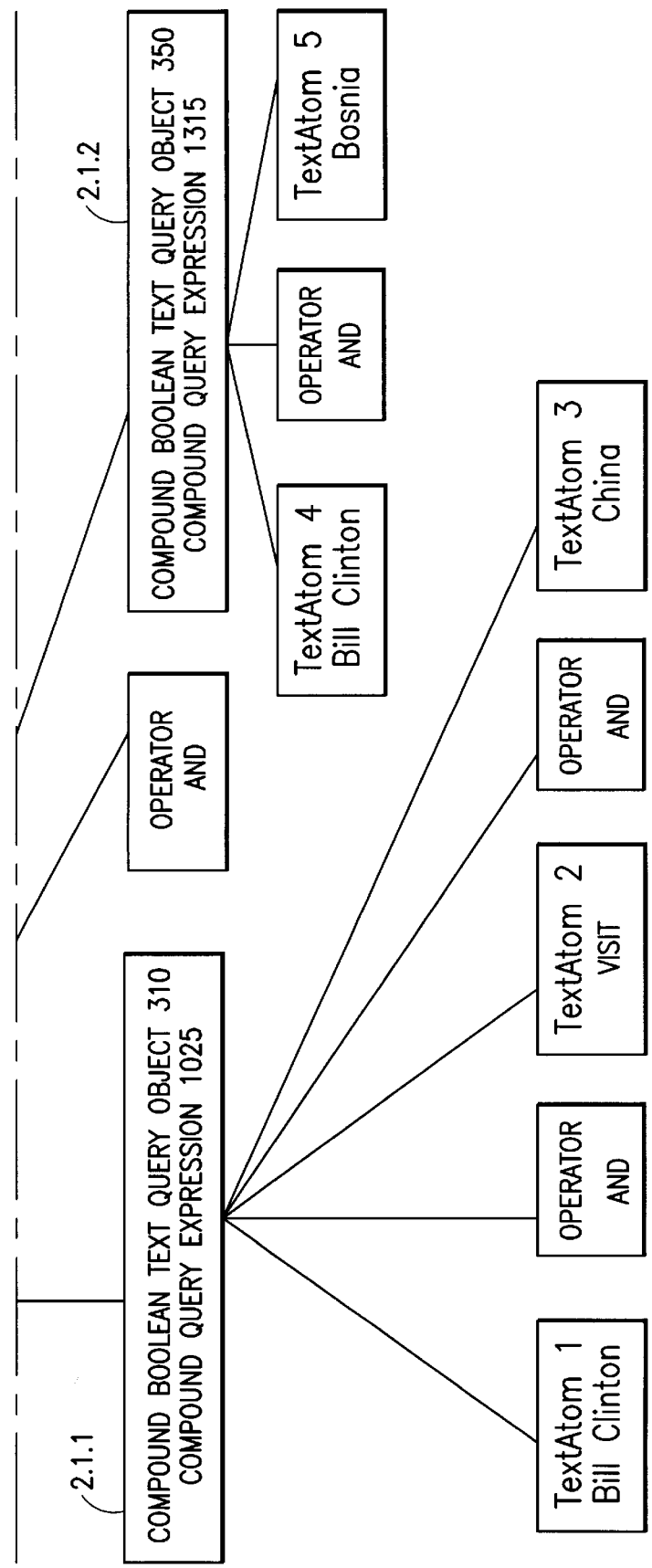

FIGS. 15A, 15B and 15C show three representations of the same Boolean query expression, exemplifying the concepts "recursive nesting," "hierarchical tree", "parent" and "child Query Objects. FIG. 15A shows an example of a Boolean query expression using a syntax of Boolean operators to connect sub-queries queries and parentheses to group sub-queries queries. An end user could type such a query expression into a GUI query element such as a Text Entry Input Field, and well known parsing algorithms (not covered in this disclosure) could parse and interpret the text characters as query elements. FIG. 15B shows the same query expression with labels such as "1", "2", "2.1", "2.2" etc. FIG. 15C shows this same query expression as a hierarchical tree of Derived Query Objects 360, using the same labels as in FIG. 15B. Typed Compound Query Objects 340 contain "child" Derived Query Objects 360: e.g., the Compound Boolean Text Query Object 310 labeled "2.1" in FIG. 15C contains the "child" Query Object labeled "2.1.1", and Operator Object with identity "and", and Query Object "2.1.2". Such a parent/child hierarchy is well known in Object Oriented Programming, however its application here is novel.

More generally, a Derived Query Object 360, or Q can be defined as the "parent" of the Derived Query Objects contained in Compound Query Expression Objects (341, 1025, 1115, 1215, and 1315) of Q. Conversely, the Derived Query Objects 360 contained in the Compound Query Expression (341, 1025, 1115, 1215, and 1315) of Q can be called the "children" of the "parent" Query Object Q. In FIG. 15C, the Boolean Query Object 350 numbered "2" is the "parent" of the Compound Boolean Text Query Object 310 numbered "2.1", the Operator Object 270 labeled at the same level of the hierarchical tree, and the Compound Parametric Query Object 240 labeled "2.2". The latter three Query Objects in turn are the "children" of the Query Object labeled "2" in the Figure. We also define the "root" Boolean Compound Query Object 350 as that Query Object that is not contained in any other Boolean Compound Query Object 350 or any other Derived Query Object 360 within this Compound Query Expression 1315. In FIG. 15C this "root" Boolean Compound Query Object 350 is the topmost Query Object in the hierarchical tree of Query Objects, labeled with the number "1".

The preferred implementation of Compound Query Expressions Objects (341, 1025, 1115, 1215, and 1315) is a Linked List (standard program construct) of query objects, where each object can be a Typed Compound Query Object 340 or Typed Elementary Query Object 260 or an Operator Object 270. Each of the Typed Compound Query Objects 340 in turn has a Compound Query Expression (341, 1025, 1115, 1215, and 1315) comprising of Linked Lists of Derived Query Objects 360. The Compound Query Expressions (341) for Typed Elementary Query Objects 260 and Operator Objects 270 are null or "empty" in common programming terms, and we can also say these Query Objects have no "child" Query Objects. (The Compound Query Expressions (341) for Typed Elementary Query Objects 260 and Operator Objects 270 are inherited by the Base Query Object 220, in standard Object-Oriented programming terms).

We can now define the linearize method 371 with flowchart in FIG. 15 as a method that applies to all Derived Query Objects 360, including Operator Objects 270, beginning with the "root" Boolean Compound Query Object 350 or Q. The method does two things:

(1) The method 371 transforms the Compound Query Expression 1315 of this "root" Boolean Compound Query Object 350 or Q into a Query Expression 1310. The Query Expression 1310 for Q will comprise of Typed Compound Query Objects 340, Operator Objects 350 connecting pairs of Typed Compound Query Objects 340, and Parenthesis Objects 280 that may group one or more Typed Compound Query Objects 340. In effect, the method 371 turns the "hierarchical tree" exemplified in FIG. 15C into a linear expression exemplified in FIG. 15A (2) The method 371 is applied to the Typed Compound Query Objects 340 in the Compound Query Expression (341, 1025, 1115, 1215, and 1315) for Q and transforms the Compound Query Expression (341, 1025, 1115, 1215, and 1315) in each of these "child" Typed Compound Query Objects 340 into a Query Expression 1315 that in turn can comprise of combinations of "child" Typed Compound Query Objects 340, and/or Typed Elementary Query Objects 260, Operator Objects 270 connecting pairs of Typed Compound Query Objects 340 and/or Typed Elementary Query Objects 260, and Parenthesis Objects 280 that may group one or more Typed Compound 340 or Typed Elementary Query Objects 260, such that resulting Query Expression 1315 represents a well-formed and executable Boolean Compound Query Expression 350.

In contrast to the recursive Compound Query Expressions (341, 1025, 1115, 1215, and 1315), the Query Expression 1315 is a non-recursive structure, where the order of Derived Query Objects 360 and Annotator Objects 290 is determined by the linearize method to match the order of Derived Query Objects 360 and Annotator Objects 290 in the Compound Query Expressions (341, 1025, 1115, 1215, and 1315).

Referring again to FIG. 15, any Query Object Q, Step 1520 determines if the Compound Query Expression (341, 1025, 1115, 1215, and 1315) for Q is empty. The Compound Query Expression (341) would be empty for Typed Elementary Query Objects 260 and Operator Objects 270 because these Query Objects are elementary, and have no "cbild" Query Objects, only values (e.g., text terms for a Text Atom Query Object 230, or an identity "left" or "right" for a Parenthesis Query Object 280).

If the Compound Query Expression (341, 1025, 1115, 1215, and 1315) is not empty the Steps beginning with 1530 are executed. Step 1530 determines whether there are any Query Objects left. Step 1544 determines whether a Derived Query Object 260, or q in the Compound Query Expression is Typed Elementary Query Object 260 or an Operator Object 270. If "yes" to either case, then Step 1546 adds q to the Query Expression (341, 1025, 1115, 1215, and 1315) for Q. If the Query Object q is a Typed Compound Query Object 340, then the Steps beginning with 1552 are executed: Step 1552 sets the parent value of q' to the Query Object Q using set methods 361 in FIG. 3 for the Base Query Object 220. (This information will be used in Step 1562 below.) Step 1555 applies the linearize method 371 in FIG. 3 to each Derived Query Object 360 q' in the Compound Query Expression (341, 1025, 1115, 1215, and 1315) which results from applying the linearize method to the Derived Query Object 360, or q in the Compound Query Expression (341, 1025, 1115, 1215, and 1315) for the "parent" Derived Query Object 360 Q. Step 1558 adds the Query Object q' to the Query Expression 1315 for Q: using the "parent" and "child" terminology above we can say that the "parent" Query Object Q adds to its Query Expression 1315 all the "children" in each of it's "child" Query Objects q.

When the steps beginning with 1552 are completed for all the "child" Derived Query Objects 360 q in the Compound Query Expression (341, 1025, 1115, 1215, and 1315) for the "parent" Q, the steps beginning with Step 1565 determine the content of the Query Expression 1315 for the "parent" Derived Query Object 360 Q. Step 1565 determines whether the "parent" Q is a Boolean Compound Query Object 350. If "yes" Step 1570 inserts a Parenthesis Object 280 with the identity 815 "left" into the Query Expression 1315, and Step 1574 adds a Parenthesis Object 280 with the identity 815 "right" into the Query Expression 1315, and Step 1580 exits the linearize method.

If Step 1565 determines whether the "parent" Query Object Q is a Boolean Compound Query Object 350, and the Step 1562 determines whether the "parent" of the "parent" Query Object Q is itself a Boolean Compound Query Object 350, using the get methods 361 in FIG. 3 for the Base Query Object 220. If yes, then Step 1528 sets the Query Expression 1315 for the Query Object Q to Q itsel rather than the "child" Derived Query Objects 360 of Q from Steps beginning in 1530. Step 1570 inserts a Parenthesis Object 280 with the identity "left" into the Query Expression 1315, and Step 1574 adds a Parenthesis Object 280 with the identity "right" into the Query Expression 1315, and Step 1580 exits the linearize method.

The Steps 1562 and 1528 ensure that the Query Expression 1315 for the "root" Boolean Compound Query Object 350, defined as the Boolean Compound Query Object 350 with no parent itself, only contains Typed Compound Query Objects 340, Annotator Objects 290, and no Typed Elementary Query Objects 260.

If Step 1562 determines that the "parent" Query Object Q is not itself a Boolean Compound Query Object 350, then the Query Expression 1315 for Q is used as derived from the Steps beginning 1530 through 1558, and Step 1570 inserts a Parenthesis Object 280 with the identity 815 "left" into the Query Expression 1315, and Step 1574 adds a Parenthesis Object 280 with the identity 815 "right" into the Query Expression 1315, and Step 1580 exits the linearize method 371.

These Steps ensure that the Compound Query Expressions (341, 1025, 1115, 1215, and 1315) for all the Typed Compound Query Objects 340 (where the latter objects are contained in the Compound Query Expressions (341, 1025, 1115, 1215, and 1315) for the "root" Boolean Compound Query Object (350) contain all the "child" Derived Query Objects 360 developed as a result of the Steps beginning 1530.

When Step 1520 is applied to any Operator Query Object 270, or to a Typed Elementary Query Object 260, the Compound Query Expression for that Query Object is empty, in which case Step 1525 adds the Query Object itself to its Query Expression 1315, and Step 1580 exits the linearize method 371.

FIG. 16 is a flowchart of a typical execute method which is part of a Boolean Compound Query Object 350 or a Compound Feature Query Object 330. It applies to any Query Object where the query expression is a Boolean expression of query objects, each of which having its own execute method.

Figures 1, 19:
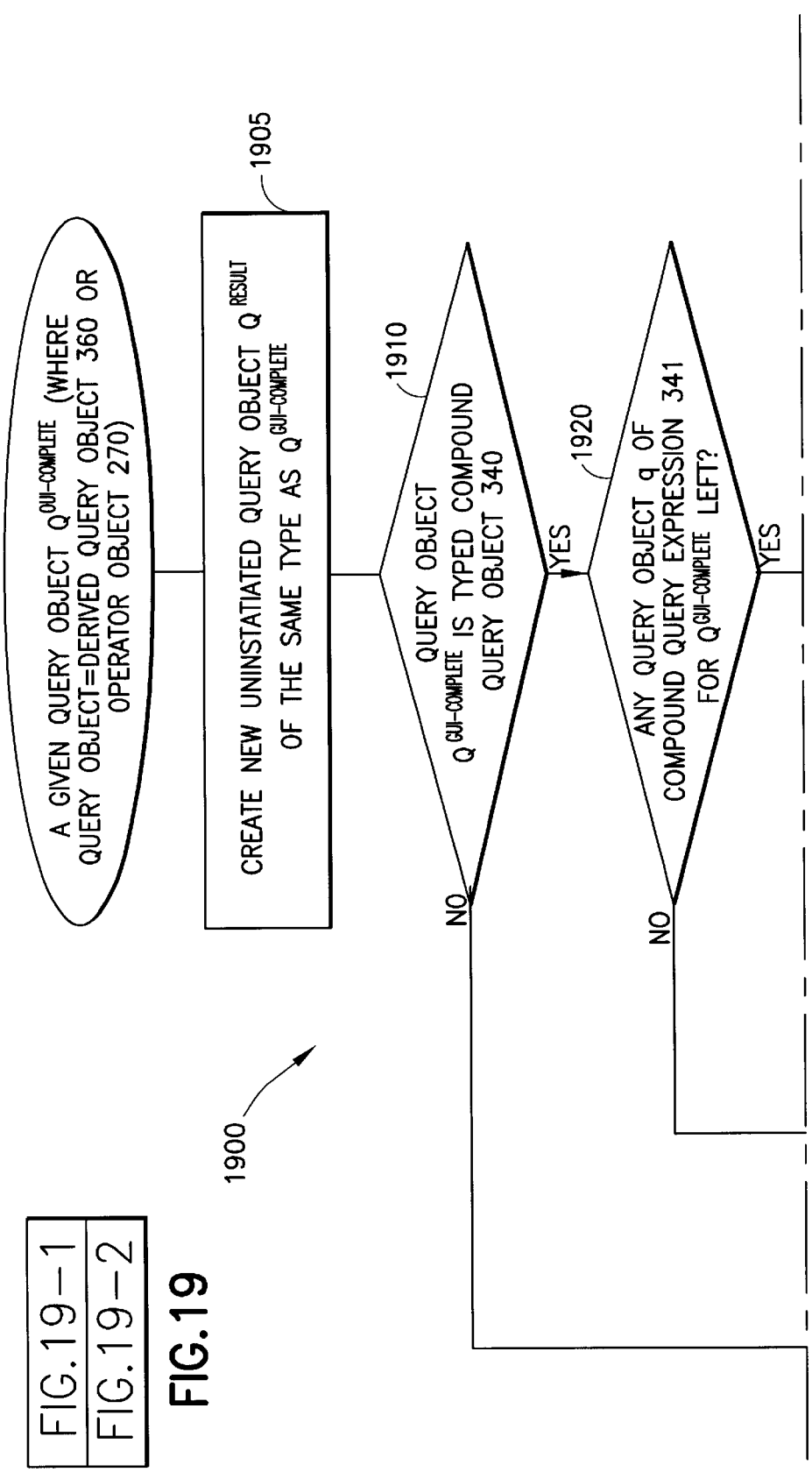
FIG. 19 is a flow chart of a Compound Query Instantiation process that creates the necessary instances of Typed Elementary Query Objects, Typed Compound Query Objects, Annotator Objects and Boolean Compound Query Objects containing a query expression formulated with the previously mentioned Derived Query Objects which encapsulate a user query from input from a Graphical User Interface.
Figures 2, 19:
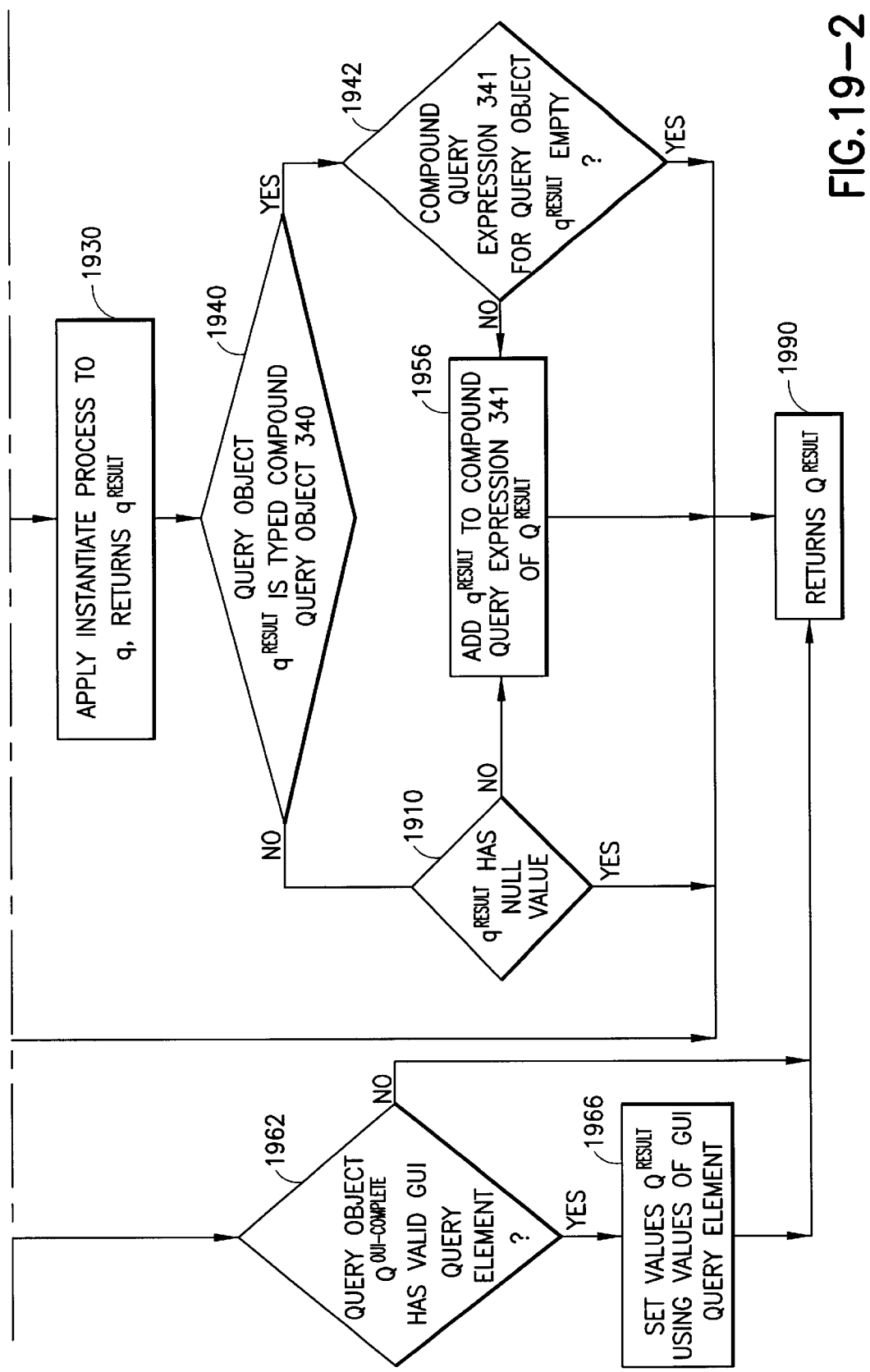

The input to an execute method 1360 of a Boolean Compound Query Object 350 is a Boolean Expression comprising of Typed Compound Query Objects 340 and Annotator Objects 290. The process of arriving at such a Boolean Expression is shown in FIG. 19.

In one preferred embodiment, each Typed Compound Query Object 340 is executed separately and its Result Object (FIG. 17) substituted in the Boolean Expression for the Typed Compound Query Object 340, resulting in a Boolean Expression of Result Objects. These Result Objects are then combined according to the rules of the Boolean Expression. There are different ways of implementing the above described steps and one preferred embodiment is now outlined.

The input 1605 to an execute method is a Boolean Expression of Typed Compound Query Objects 340 and Annotator Objects 290. The next step 1610 tests whether there are any components left in the expression. In the affirmative case the next object in the Boolean Expression is checked 1615 to determine whether it is an Annotator Object 290. An Annotator Object is pushed on the stack S in 1620. A Typed Compound Query Object 340 is evaluated in 1625 by calling its execute method and the resulting Result Object (FIG. 17) is pushed on the stack S. Then the Boolean Expression 1605 is tested again to see whether there are any objects left to be evaluated. When there are no more objects left, the content of the stack S—which form a Boolean expression in prefix format are converted to a Boolean Expression PF in postfix format in box 1630. This step is done with one of many well known algorithms. The result of this step is shown in box 1635—PF—the Boolean expression in postfix format.

The execute method continues by examining each object in the Boolean Expression PF in turn. In case there are objects left in PF, which is checked in 1638, the next object is checked whether it is a result object (FIG. 17) in 1640. Result Objects are pushed onto a stack T 1645. In case the next object is an operator object, some computation is performed in 1650: The last two objects are popped from the stack T 1645, and the operator object is applied between these two just popped result object (FIG. 17). Applying the operator then results in a new result object which is pushed onto stack T. When no more objects are encountered in 1635, there is only one object remaining on the stack T, which is popped from the stack and returned as the result of the execute method in 1655.

FIG. 17 is a block diagram of a Result Object. One key feature of this Query Object architecture is that all appropriate Query Objects have the same type of result object. The result object is database and GUI independent and has a rich set of access functions to it. It also contains methods to transform into an application specific representation. For instance, it could be advantageous to change the names of the columns or add a column to make all the result objects be of the form which is necessary for the execute method in a Boolean Compound Query as described in FIG. 16.

Object 1710 holds the result column headings. Each heading contains the name of the column, the table it belongs to and its type. All the headings can then be arranged either in an array or a linked list or another ordered structure. The ResultRows 1715 are a two dimensional array containing the values of the results. There are a multitude of implementations for such an array and depend on the language the application is written. Objects 1720 are optional and implementation specific.

There are set and get methods 1725 for all the contained objects, variables and constants in the Result Object.

Method 1730 is a transform method which is application specific. This method can for instance change the names in the columns, change values if appropriate (e.g., change all negative values to zero) or any other application specific transformation. Invoking method 1735—NumberOfResults returns the number of rows in a particular Result Object. Another quite useful method is GetColumnValues 1740 which returns all the values for a specific column.

The Normalize method 1745 is invoked mainly to accommodate the execute method 1360 in a Boolean Compound Query Object 350 described in FIG. 13. All the result objects which are input to such an execute method are of the same structure—they have the same number of columns which all have the same headings. To achieve that, one or more columns and their values may have to be added to a result object which is done in the Normalize method 1745. There can be some optional methods 1750.

Figure 18:
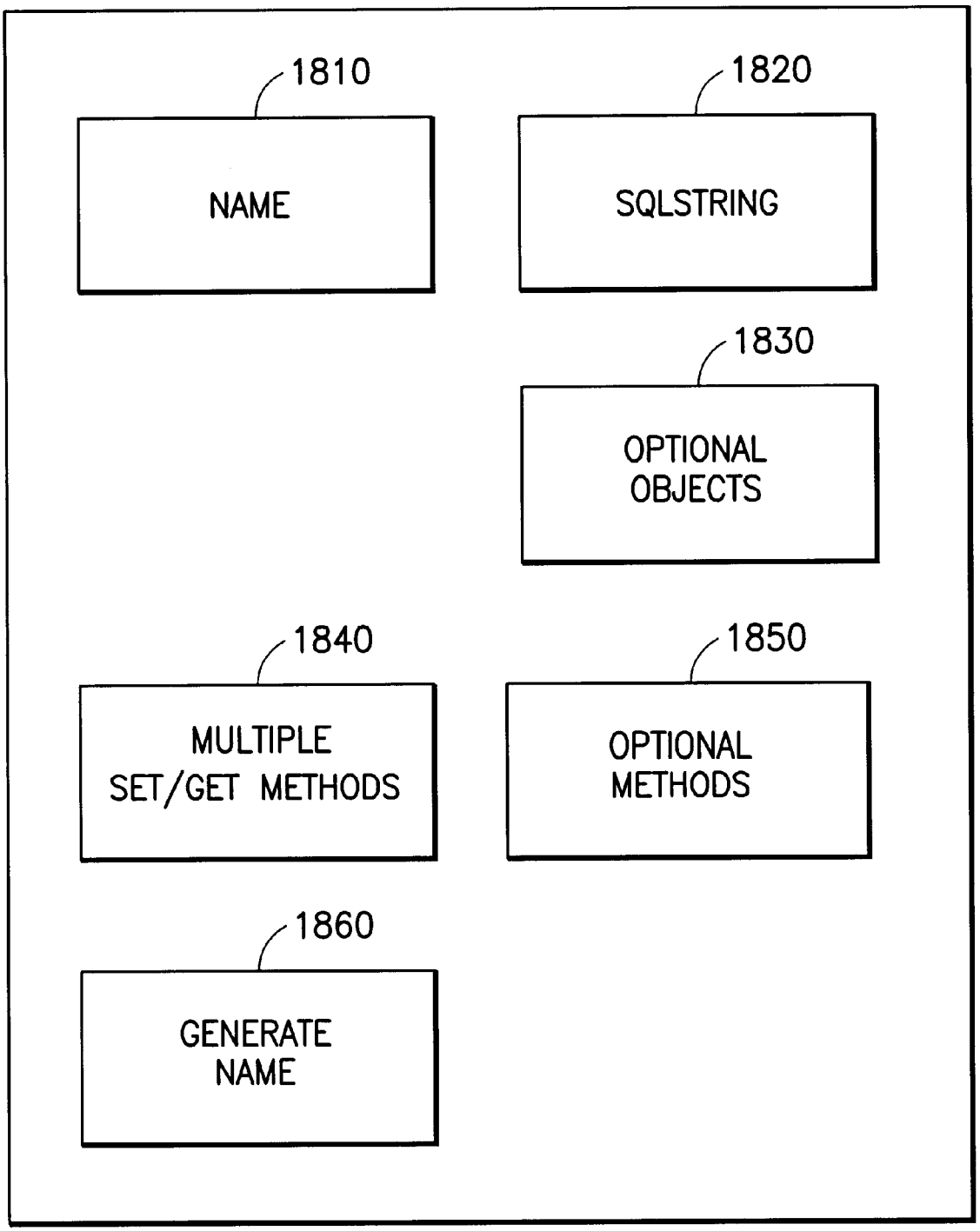
FIG. 18 is a block diagram of a Common Table Expression Query Object.

The query object architecture is a flexible and expandable one. At times, it is appropriate to introduce new query objects due to the type of data and/or application at hand. Introducing new query objects allows for instance for the Compound Query Instantiation process to stay unchanged or for some execute methods to be reused. The Common Table Expression Query Object as described in FIG. 18 is a query object introduced to facilitate query expression evaluation. It enables the algorithm for traversing a Boolean expression and taking into account precedence of operators to stay unchanged and at the same time create a structured language string which is much faster to evaluate.

FIG. 18 is a block diagram of a Common Table Expression Query Object. This object is a good example of the flexibility and expandability of our architecture. Two basic concepts are: a Boolean expression which represents a user query is composed of Query Objects. In turn, each Query Objects has a method to translate the query it represents into a database specific query language.

The Common Table Expression Query Object is a Query Object which contains a specific translation of a query or sub-query query into SQL which is optimized for performance.

The Common Table Expression Query Object contains at least two objects: the name object 1810 and the SqlString object 1820. The name is generated using method 1860. One preferred embodiment of the name generation is to use a fixed textstring and append a number to it. The application keeps track of the numbers used so far. The SqlString in general is created during an execute method of a different object which uses a Common Table Expression Object to store intermediate results.

Methods 1840 are set/get methods for the objects, variables and constants used in the Common Table Expression Object.

Objects 1830 are optional objects which are implementation and application specific as are the optional methods 1860.

The following examples are written in SQL and show examples of strings as they may appear in Object 1820.
1) T1 (VIDEO, DATE) AS (SELECT VIDEO, DATE FROM TABLE1 WHERE
 TOPIC='HAPPINESS' AND LOCATION='NEW YORK')

The above expression augmented with the keyword WITH creates a temporary table T1 which has two columns VIDEO and DATE. These two columns have values taken from TABLE1 which contains the columns TOPIC and LOCATION and satisfy the two constraints TOPIC='HAPPINESS' and LOCATION='NEW YORK'

2) T2 (VIDEO, DATE) AS (SELECT VIDEO, DATE
   FROM TABLE2 WHERE
   ANCHOR='DAN RATHER')

The above expression augmented with the keyword WITH creates a temporary table T2 which has two columns VIDEO and DATE. These two columns have values taken from TABLE2 which contains the columns ANCHOR and which satisfy the constraint ANCHOR='DAN RATHER'.

3) T3 (VIDEO, DATE) AS (SELECT VIDEO, DATE
   FROM T1, T2)

The above expression creates a temporary table T3 which contains data which is either in T1 or T2 (i.e., logical OR)—the common table expressions constructed in 1) and 2).

4) T4 (VIEO, DATE) AS (SELECT VIDEO, DATE
   FROM TABLE3 WHERE
   RELEASE<1995 UNION ALL
   SELECT VIDEO, DATE FROM T2

The above expression creates a temporary table T4 which contains data which is either in TABLE3 and satisfies the constraint RELEASE<1995 or in T2 (i.e., logical AND)

The above examples are quite simple and in some cases may be written more simply. However their importance will be apparent in the discussion of FIG. 20 where an execute method of a Boolean Compound Query Object is discussed.

FIG. 19 is a flow chart of a Compound Query Instantiation process that transforms inputs like text strings originating as elements of a Graphical User Interface (GUI) into an instance of a Compound Query Expression 1315 for a Boolean Compound Query Object 350. This Compound Query Expression (341, 1025, 1115, 1215, and 1315) in turn contains one instance of a "root" Boolean Compound Query Object 350, and this Query Object contains a Compound Query Expression 1315, which contains a collection of Derived Query Objects 360 comprising of Typed Elementary Query Objects 260, Typed Compound Query Objects 340, and Operator Query Objects 270 in combinations that represent a well-formed Query Expression 1310 when the method of FIG. 15 is applied to the "root" Boolean Compound Query Object 350.

Typed Compound Query Objects 340 contained in Compound Query Expression (341, 1025, 11 15, 1215, and 1315) can be termed for convenience "child" Query Objects of the Query Object whose Compound Query Expression (341, 1025, 1115, 1215, and 1315) contains them. For convenience, we can also define the Query Object Q whose Compound Query Expression contains these "child" Query Objects, as the "parent" of those Query Objects contained in the Compound Query Expression (341, 1025, 1115, 1215, and 1315) of Q. The definitions are the same as those defined for the linearize process of FIG. 15, and FIG. 15C shows an example of a Compound Boolean Query Object 350 with "child" Query Objects displayed in a hierarchical tree, where the "child" Query Objects are in turn "parents" of lower level "child" Query Objects.

The Compound Query Instantiation process in FIG. 19 is initiated by some kind of Graphical User Interface (GUI) event, e.g.,a preferred implementation corresponds to the end user pressing a "Search" button in the GUI. The process comprises writing code that includes the following the steps (1) through (4), embodied in program code:

(1) Program code is written in such a way that each GUI query element and program code unit can be associated with one Derived Query Object 360 in the Boolean Compound Query Object 350 expressed by the GUI query elements taken as a whole.

(2) Program code is written in such a way that each GUI query element can be evaluated as a "valid" query element that expresses an end user's intention to use that GUI query element to represent a particular type of Query Object.

(3) Program code is written in such a way that it produces valid Compound Query Expressions (341, 1025, 1115, 1215, and 1315), adding "child" f Query Objects to "parent" Typed Compound Query Objects 340 in a way that expresses a well-formed Boolean query expression, including Operator Query Objects 270 connecting pairs of Query Objects.

(4) Program code is written in such a way that the GUI query elements and program code units which use and operate on these GUI query elements, resulting from these process steps (1), (2), (3) and (4) taken in their totality, and executed as a program (with end user input to the GUI query elements) will instantiate a Boolean Compound Query Object 350 that comprises of Boolean combinations of Derived Query Objects 360 including Typed Elementary Query Objects 260, Typed Compound Query Objects 340, and Operator Query Objects 270 connecting pairs of these Query Objects. The process of instantiation is described by the flowchart in FIG. 19.

In assumption (1) a GUI query element and/or program code unit can be associated specifically with an Typed Elementary Query Object 260 (e.g., a Text Atom Query Object 230, an Parametric Attribute Query Object 240, or a Feature Atom Query Object 250), an Operator Query Object 270, or a Typed Compound Query Object 340 (e.g., a Compound Boolean Text Query Object 310, a Compound Parametric Query Object 220, or a Compound Feature Query Object 330). GUI query elements and program code units can relate to Query Objects of any type.

Figure 19A:
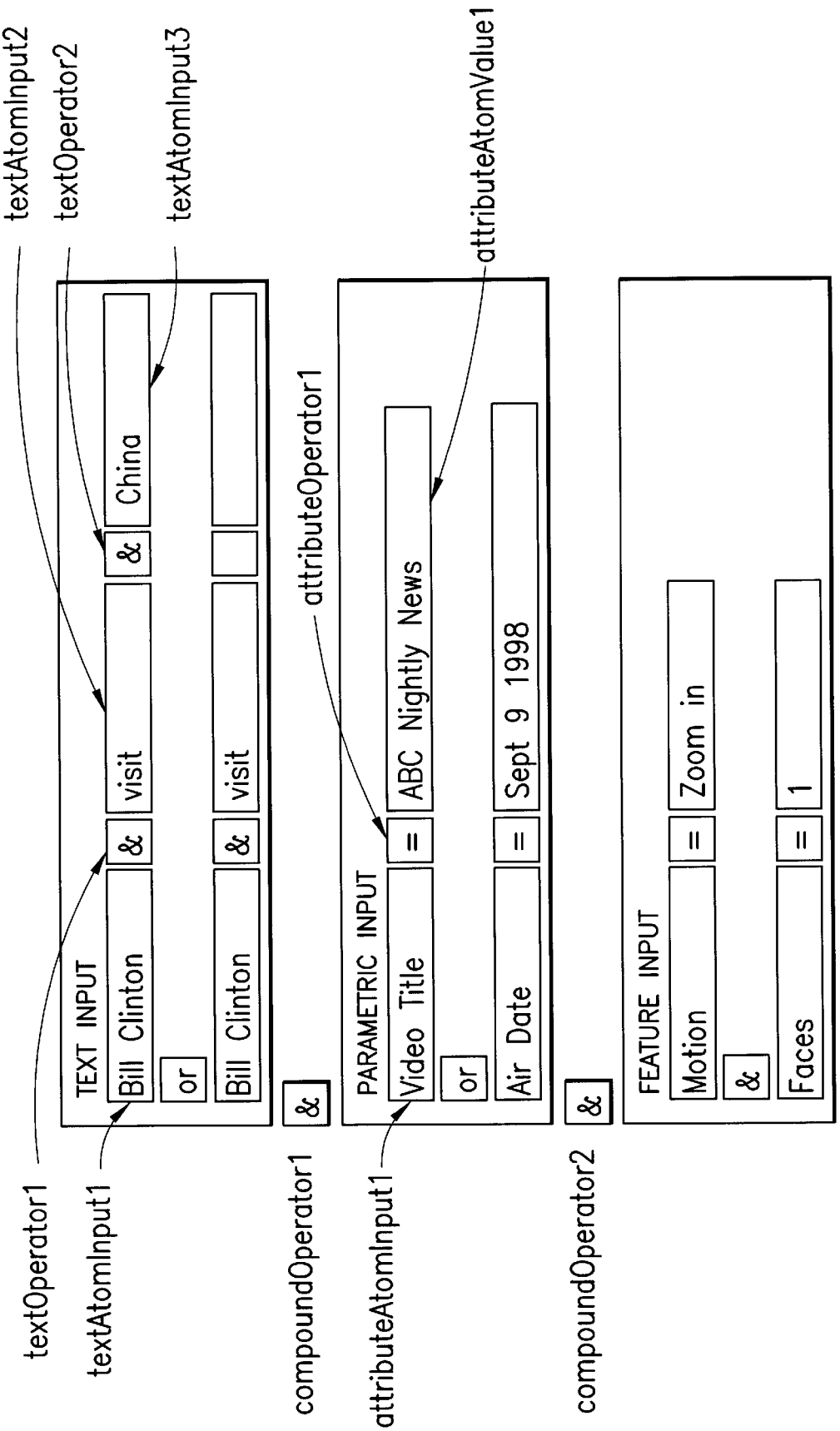

FIGS. 19A and 19B show examples of GUI query elements, with user input, and the descriptors with arrows pointing to the GUI query elements label these elements in conjunction with pseudocode described below. FIG. 19A shows a form with GUI query elements representing text query criteria, parametric criteria, and feature criteria (see labels in figure). Select GUI query elements are also labeled with program names used in the pseudo-code below: e.g., the "textAtomInput1" GUI query element is a standard GUI text entry field into which a user has type "Bill Clinton" as a text query term. These text terms "Bill" and "Clinton" are extracted by program code, and used to set the value of a single Text Atom Query Object 230 ("Bill Clinton"). There may be multiple of these GUJ query elements expressing Text Atom Query Objects 230 of a Boolean Text Query Object 31, as FIG. 19A shows. Additional GUI query elements allow end users to specify the value of Operator Query Objects 270 expressing Boolean operators connecting these Text Atom Query Objects 230. Hence GUI query elements can express groupings that correspond to various types of Typed Compound Query Objects 340.

Alternatively, FIG. 19B shows a single GUI text entry field may contains a complex Boolean query expression multiple component query criteria connected by Boolean operators, in which case this single GUI query element actually resolves into a Boolean Compound Query Object 350 of any complexity as implied in the end user's typed query expression. FIG. 19B in particular shows a GUI query element into which an end user types a Boolean query expression which is parsed by program code (this parsing process is not covered by this disclosure) to create the Boolean Compound Query Object 350 that was also shown in FIG. 15A Finally, there may not be a GUI query element for a Query Object, but a program code unit that creates a Query Object by programmer stipulation: e.g., there may be no explicit GUI query element for specifying a Boolean operator, but there is a program code unit that creates an Operator Query Object 270 with a stipulated value (also called a "default" value in programming terms). These methods are illustrated with pseudo-code below.

In assumption (2), a "valid" GUI query element is simply one that an end user has acted on and in so doing has specified a value (e.g., typed in text terms representing keywords for a text query), and thereby expressed the intention to include the Query Object associated with GUI query element an a component of an overall Boolean Compound Query Object 350. A GUI query element may also be valid by virtue of program logic that relates two or more GUI query elements. For example, a user may specify the value of an GUI query element representing an Operator Query Object 270, but this action only makes the query element a valid representation or the Operator Query Object 270 if the user also specifies (makes "valid") values for GUI query elements that are associated with Query Objects which would be connected by the Operator Object 270 in question. Standard programming practices can readily implement such program relations among GUI query elements.

In assumption (3), program logic is written such that "valid" GUI query elements are used to set values of Derived Query Objects 360 in FIG. 2, using set methods 361 in the Base Query Object 220, and program logic uses add methods 351 in the Base Query Object 220, to create combinations of Derived Query Objects 360 connected by Operator Objects, and contained in the Compound Query Expressions (341, 1025, 1115, 1215, and 1315) of Typed Compound Query Objects 340, which in turn may be connected by Operator Query Objects 270, and which make up the content of a "root" Boolean Compound Query Object 350.

The GUI query elements can be defined and/or how program code can be written in any general way to satisfy assumptions (1), (2), (3), or (4). However, the GUI allows end users to specify a valid Boolean Compound Query Object 350 composed of Derived Query Objects 360 connected by Operator Query Objects 270 and must satisfy the five assumptions in the prior paragraph. The programming process fulfills the assumptions (1) through (4), and results in the generation of a "root" Boolean Compound Query Object 350, and all the Derived Query Objects 360 contained in its Compound Query Expression (341, 1025, 1115, 1215, and 1315).

Once GUI query elements and program code are written to satisfy these assumptions (1)–(5), the process in FIG. 19 will "instantiate" a Boolean Compound Query Object 350, and all the Derived Query Objects 360 that are contained in its Compound Query Expression (341, 1025, 1115, 1215, and 1315), as intended by the end user.

In the preferred implementation, standard programming methods are used to associate GUI query elements and program code units with instances of Derived Query Objects 360. The end user expresses his or her intentions by interacting with the GUI query elements to specify values of the Query Objects associated with the GUI query elements. Instantiating for Typed Elementary Query Objects 260 means GUI query element values are used to set Query Object values using set methods 361 in the Base Query Object 220. Instantiation for Typed Compound Query Objects 340 means that "child" Derived Query Objects 360 are added to the Compound Query Expressions (341, 1025, 1115, 1215, and 1315) for these Typed Compound Query Objects 360, using add methods 351 in the Base Query Object 220. The result Boolean Compound Query Object 350 provides the Compound Query Expression (341, 1025, 1115, 1215, and 1315) needed for the other methods and processes covered by this disclosure. The following pseudo-code illustrates this process of instantiation and adding of Derived Query Objects 360 to Typed Compound Query Objects 340. The pseudo-code immediately below provides an example of how GUI query elements are related to instantiation of Derived Query Objects 360:

```
1)  textAtomInput1 = new TextEntryField();
2)  textOperator1 = new TextEntryField();
3)  textAtomInput2 = new TextEntryField();
4)  textOperator2 = new TextEntryField();
5)  textAtomInput3 = new TextEntryField();
6)
7)  textOperator3 = new TextEntryField();
8)
9)  textAtomInput4 = new TextEntryField();
10) textOperator4 = new TextEntryField();
11) textAtomInput5 = new TextEntryField();
12) textOperator5 = new TextEntryField();
13) textAtomInput6 = new TextEntryField();
14)
15) compoundOperator1 = new TextEntryField()
16)
17) attributeAtomNameInput1 = new TextEntryField();
18) attributeOperator1 = new TextEntryField();
19) attributeAtomValueInput1 = new TextEntryField();
20)
21) attributeOperator2 = new TextEntryField();
22)
23) attributeAtomNameInput2 = new TextEntryField();
24) attributeOperator3 = new TextEntryField();
25) attributeAtomValueInput2=new TextEntryField();
26)
27) compoundOperator2= new TextEntryField();
28)
29) featureAtomNameInput1 = new TextEntryField();
30) featureOperator1 = new TextEntryField()
31) featureAtomValueInput1 = new TextEntryField();
32)
33) featureOperator2=new TextEntryField()
34)
35) featureAtomNameInput2 = new TextEntryField();
36) featureOperator3 = new TextEntryField()
37) featureAtomValueInput2 = new TextEntryField();
38)
39)     if (textAtomInput1.is Valid() & textAtomInput2.is Valid()) {
40)         textAtom1=new TextAtom(textAtomInput1.getTerms());
41)         textAtom2=new TextAtom(textAtomInput2.getTerms());
42)         textOperator1=new Operator(textOperator1.getIdentity());
43)         booleanTextCompound1=new BooleanTextCompound();
44)         booleanTextCompound1.add(textAtom1);
45)         booleanTextCompound1.add(textOperator1);
46)         booleanTextCompound1.add(textAtom2);
47)         if (textAtomInput3.is Valid()) {
48)             textAtom3=new
                    TextAtom(textAtomInput3.getTerms());
49)             textOperator3=new
                    Operator(textOperator3.getIdentity());
50)             booleanTextCompound1.add(textOperator2);
51)             booleanTextCompound1.add(textAtom3);
52)         }
53)     }
54)     if (textAtomInput4.is Valid() & textAtomInput5.is Valid()) {
55)         textAtom4=newTextAtom(textAtomInput1.getTerms());
56)         textAtom5=new TextAtom(textAtomInput2.getTerms());
57)         textOperator3=new Operator(textOperator1.getIdentity());
58)         booleanTextCompound2=new BooleanTextCompound();
59)         booleanTextCompound2.add(textAtom4);
60)         booleanTextCompound2.add(textOperator5)
61)         booleanTextCompound2.add(textAtom5);
62)         if (tyextAtomInput6.is Valid()) {
63)             textAtom6=new
                    TextAtom(textAtomInput6.getTerms());
64)             textOperator4=new
                    Operator(textOperator3.getIdentity());
65)             booleanTextCompound1.add(textOperator4);
```

-continued

```
66)         booleanTextCompound1.add(textAtom6);
67)       }
68)    }
69)    if (booleanTextCompound1.hasContents() &
       booleanTextCompound2.hasContents()) {
70)       booleanTextCompound3=new BooleanTextCompound();
71)       booleanCompound=new BooleanCompound();
72)       booleanCompound.add(booleanTextCompound3);
73)       booleanCompound.add(new Operator("AND"));
74)       booleanCompound.add(parametricCompound1);
75)    }
76)
77)    etc. for Parametric attributes, Features, etc.
```

In the pseudo-code example, a set of GUI query elements are defined in lines 1–38 and given names identifying the type of Query Object created from the query element. This is standard programming practice. These lines of code can also be viewed in relation to the GUI example in FIG. 19A: e.g., the GUI query element labeled "textAtomInput1" in line 1 of the pseudo-code above is shown in FIG. 19A Lines 1, 3and 5 of the pseudo-code corresponds to the GUI query input elements in FIG. 19A containing the name "Bill Clinton", "visit" and "China". Note the not all the GUI query elements listed in the pseudo-code are labeled in FIG. 19A, but just a few to suggest the correspondence. The lines 39–77 define blocks of code that test if the GUI query elements related to the Text Atom Query Objects 230 are "valid" and creates Derived Query Objects 360, including Compound Boolean Text Query Objects 310. "Valid" means the user has typed terms in the input fields, e.g., "Bill Clinton", vs leaving the text entry field blank. Lines 39–53 for example test if three text entry fields named "textAtomInput1" and "textAtomInput2" and textAtomInput3 are "valid." In FIG. 19A, this means the end user has entered text terms "Bill Clinton", "visit" and "China". The end user may or may not have specified the "&" operators connected these terms. If the two input fields are "valid" than the block of code is executed: the code in lines 40–42 create two Text Atom Query Objects 230, and an Operator Object 270, and the lines 43–46 create a Compound Boolean Text Query Object 310, and adds the Text Atom Query Objects 230 and Operator Object 270 to the this Query Object, using the "add" method 351 in the Base Query Object 220. The "add" method adds the "child" Query Objects to the Compound Query Expression 1025 of the Compound Boolean Text Query Object.

The lines of code 69–75 create another Compound Boolean Text Query Object 310. If the Compound Boolean Text Query Objects resulting from lines of code 39–53 and 54–68 have contents, the lines 69–75 create yet a third Compound Boolean Text Query Object 310, and adds the Compound Boolean Text Query Objects 310 from lines of code 39–53 and 54–68 as "child" Query Objects, connected by an Operator Object. Additional lines of code of similar form could be written for Parametric Attribute Query Objects 240 and Feature Atom Query Objects 250, and their corresponding Compound Parametric Query Objects 320 and Compound Feature Query Objects 230.

The pseudo-code illustrates all the steps (1)–(4) above: how GUI query elements are used to instantiate Derived Query Objects 360, how Operator Objects 270 can become "valid" by virtue of the "validity" of other Query Objects, and can have "default" values stipulated by program code, and not necessarily end user input, and how one Derived Query Object 270 can be added to a Typed Compound Query Object 340.

We define a special case of the Boolean Compound Query Object 350 resulting from program execution, called a "GUI-Complete" Boolean Compound Query Object 350: The "GUI-Complete" Boolean Compound Query Object 350 is the Query Object that would result if an end user interacted with the GUI to make every GUI query element "valid". It is therefore the most complete theoretically possible Boolean Compound Query Object 350 that could result from executing the program code according to the steps (1), (2) and (3).

We can now preview the process in FIG. 19 as one that "instantiates" an actual Boolean Compound Query 350, starting from this ideal "GUI-Complete" Boolean Compound Query Object 350. The process instantiates a set of Derived Query Objects 360 that correspond to "valid" GUI query elements, and/or program code that combines Query Objects into Typed Compound Query Objects 340. All these Query Objects are ultimately contained in a Compound Query Expression (341, 1025, 1115, 1215, and 1315) of a "parent" Boolean Compound Query Object 350. Another way to describe this is to say that the "GUI-complete" Boolean Compound Query Object 350 is used as a template or skeleton, to guide the process of Compound Query Instantiation depicted in FIG. 19, in the sense that process depicted in FIG. 19 examines each Query Object in the GUI-Complete Boolean Compound Query Object 351, and if the GUI query element associated with it is "valid", a new Query Object $Q^{Result}$ of the same type is created, its values set using set methods 361 for the Base Query Object 220, and using the data contained in the "valid" GUI query element, and $Q^{Result}$ is added to the Compound Query Expression 341, 1025, 1115, 1215, and 1315) of the "parent" Query Object for $Q^{Result}$ using add methods 351 for the Base Query Object 220. The result of the process in FIG. 19 therefore is a new Boolean Query Object 350 built out of Query Objects selected from, and instantiated (values set) from the corresponding Query Objects of the GUI-Complete Boolean Compound Query Object 3500. The order and grouping of "child" Query Objects in this final resulting Boolean Compound Query Object 350 is strictly parallel to order and grouping of the GUI-Complete Boolean Compound Query Object 3500, except for Query Objects that do appear in the resulting Boolean Compound Query Object 350 because the GUI query elements associated with them were not "valid".

The process applied to any given Query Object $Q^{GUI-Complete}$ at any level in this recursive nested structure begins with Step 1905 which creates a new but uninstantiated Query Object $Q^{result}$ of exactly the same type. Uninstantiated means that if $Q^{result}$ is a Typed Elementary Query Object 260 it has no value (get method of 351 returns "null" or "empty" in common programming terms), or if $Q^{result}$ is a Typed Compound Query Object 340 its Compound Query Expression (341, 1025, 1115, 1215, and 1315) is empty (has no "child" Query Objects). Step 1910 determines whether the Query Object $Q^{GUI-Complete}$ is a Typed Elementary Query Object 260 or a Typed Compound Query Object 340. If the Query Object $Q^{GUI-Complete}$ is either an Typed Elementary Query Object 260 or an Operator Query Object 270, Step 1962 determines whether the Query Object has a "valid" GUI query element associated with it. If the GUI Query Element is "valid" (i.e., an end user has specified a value for it), Step 1966 sets the value of $Q^{result}$ using set methods 361 in the Base Query Object 220, and Step 1990 returns the $Q^{result}$. For example a GUI query element such as a text entry field would be "valid" if an end user typed text keywords such as "Bill Clinton", and the typed text "Bill Clinton" would be used to set the value of a Text Atom Query Object 230. Conversely, if the GUI query element is not "valid", the Query Object $Q^{result}$ is still returned in Step 1990 but it is has no value or is "empty".

Returning to Step 1910, if Step 1910 determines that the Compound Query Expression (341, 1025, 1115, 1215, and 1315) of the Query Object$^{GUI\text{-}Complete}$ is a Typed Compound Query Object 340, Step 1920 determines if there are any Query Objects in its Compound Query Expression (341, 1025, 1115, 1215, and 1315) left to process. If there is a Query Object q to process, Step 1930 applies the Compound Query Instantiation process to q, and returns the result $q^{Result}$ to Step 1940. Step 1940 determines whether the Query is an Typed Elementary Query Object 260, or an Operator Query Object 270. If "yes" then Step 1950 determines whether the Query Object $q^{Result}$ has a value or not, using the get methods 361 in the Base Query Object 220. If the GUI Query Element has a value, Step 1956 adds the $q^{Result}$ to the Compound Query Expression (341, 1025, 1115, 1215, and 1315) of $Q^{Result}$.

If Step 1940 determines that a Query Object $q^{Result}$ It in the Compound Query Expression (341, 1025, 1115, 1215, and 1315) of the "parent" Query Object Q is a Typed Compound Query Object 360, Step 1942 determines whether the Compound Query Expression (341, 1025, 1115, 1215, and 1315) for $q^{Result}$ has "child" Query Objects in its Compound Query Expresssion (341, 1025, 1115, 1215, and 1315). If "yes", $q^{Result}$ is added to the Compound Query Expression (341, 1025, 1115, 1215, and 1315) for $Q^{Result}$, which is the "parent" for $q^{Result}$, using the add methods 351 in the Base Query Object 220. $Q^{Result}$ is then returned in step 1990.

When the process in FIG. 19 is completed there exists a new result "root" Boolean Compound Query Object 350, which contains a Compound Query Expression (341, 1025, 1115, 1215, and 1315) containing Typed Compound Query Objects 340, which in turn contain Compound Query Expressions (341, 1025, 1115, 1215, and 1315) which contain Derived Query Objects 360, which themselves contain Compound Query Expressions 360, and so on in a "recursive nested" manner, the totality of which expresses a well-formed Boolean Compound Query Object 350 where "well-formed" means the Query Object can be linearized using the method 371, corresponding to the flowchart in FIG. 15, and executed using methods defined in 375 of the Base Query Object 220, and derived execute methods for each of the Derived Query Objects 360.

The algorithm described in FIG. 20 is related to the disclosure of U.S. patent application Ser. No. 09/106,968 (attorney docket number CT9-98-002) by Brereton, Coden and Schwartz, filed Jun. 30, 1998 and entitled "Method and System for Translating an Ad-Hoc Query to Structured Query Language Using Common Table Expressions" which is hereby incorporated by reference in its entirety.

FIG. 20 is a flowchart describing a high performance execute method, preferably used with this invention, that is described in more detail and claimed in U.S. patent application entitled SYSTEM AND METHOD FOR PERFORMING COMPLEX HETEROGENEOUS DATABASE QUERIES USING A SINGLE SQL EXPRESSION, to Brereton et al, (docket number YO998-475, claiming priority to provisional patent application number 60/108,754) which is filed on the same day as this application and is herein incorporated by reference in its entirety.

FIG. 20 is a flowchart illustrating a high performance execute method in a Boolean Compound Query Object 350 or a Compound Feature Query Object 330. It applies to any Query Object where the query expression is a Boolean expression of query objects each of which having its own execute method.

The same type of execute method could be also used in other Query Objects like a Feature Query Object 330 where the Query Expression 1210 is a Boolean Expression of Feature Atom Query Objects 250 and Annotator Query Objects 290.

In general, a Query Expression 1310 in a Boolean Compound Query Object 350 is an expression of Typed Compound Query Objects 340 and Annotator Objects 290 written in infix notation. The input is a Query Expression 1310 written in infix notation as shown in 2005. The first step is to convert this expression into one written in postfix notation denoted as PF__ as shown in 2010. This step is well documented in the literature.

The next few steps are repeated for as long as there are any elements left in the query expression as will be detailed now. In 2015 it is checked whether there are any objects left in the expression PF__Q. If there are any objects, the top TOP__O is popped in 2020. In 2025 TOP__O is examined and it is put on stack lEMP in 2030 if it is a Derived Query Object 360. In case TOP__O is an Operator Object step 2035 is executed: the two top objects O1 and O2 are popped from the stack TEMP. Depending on the type of O1 and O2 the algorithm proceeds to one of the four boxes: 2040, 2045, 2050, 2055. The decision to which of the four branches to take is based on whether O1 and O2 are either both Query Objects or CTE Objects, or one of each (there are two boxes for this case depending on which type of object was popped first. All the boxes 2040, 2045, 2050 and 2055 perform the same type of operation: they create an structured query language string representing the query expressed in objects O1 and O2 and the operator object TOP__O. The string is put into a newly created CTE Object—CTE#—in 2060 which is added to a chain of already created CTE objects in 2065. Furthermore CTE is pushed on the stack TEMP 2030. Then the algorithm proceeds to 2015 to check whether there are any more objects left in the Boolean expression PF__Q. When the last object was encountered, the CTE chain as created in 2065 is processed. First a string is instantiated with the keyword "WmT" (in SQL or a comparable word in another similar structured query language). In the next step it is tested whether the CTE chain is empty. If it is not empty, the sqlsting which is part of the next CTE Object in the CTE chain is appended to the string s with the appropriate (for the structured query language) punctuation in step 2080. When the last CTE Object is evaluated, the algorithm proceeds to 2085.

A Boolean Compound Query Object 350 may contain a special set of resultcolumns 1325. These results columns are used to express the following user query which is explained in two steps:
1) Determine a set of values for which a set of query condition holds.
2) To determine the final result, add the values in the specified result columns for which the user query evaluated to true.

In step 2085 the appropriate SELECT statement is created which expresses which additional resultcolumns the user wants to see in the final result.

EXAMPLES

FIGS. 3–18 described the various non-limiting examples of the Object Query Architecture and its implementation of Base Query Objects 220, Typed Elementary Query Objects 260, Annotator Objects 290, Typed Compound Query Objects 340 and Boolean Compound Query Objects 350.

All these objects with the exception of the Base Query Objects are Derived Query Objects 360 which have a certain commonality being:
1) Each of the Derived Query Objects 360 may describe a part (or all) of a user query.
2) Each of the Derived Query Objects 360 may contain one or more methods to translate a query or sub-query into a Structured Query Language like SQL.
3) A Boolean Compound Query Object 350 describes the entire user query in form of a Boolean expression of instances of Derived Query Objects 360.
4) A Boolean Compound Query Object 350 may contain one or more methods on how to translate the sub-queries 1310 as describe by the instances of the Derived Query Objects 360 into a singe query which upon execution returns the result 1320 for the origin user query.
5) A Boolean Compound Query Object 350 may contain one or more methods on how to translate the sub-queries 1310 into sub-queries which upon execution return results which can be combined with results returned from the execution of other sub-queries 1310.
6) A Boolean Compound Query Object 350 may contain a set of resultcolumns 1325 which represents additional information required for the final user query.

The key points are now elaborated and examples are given to illustrate the methods and points but not limit the application of the key points. For the examples, it is assumed that the database has several tables T1, T2 through Tn. Each table contains several columns. Each table contains three columns named ID, START and STOP.
1) A Derived Query Object 360 describes a part (or all) of a user query.

Example: The user query is: return the ID, START and STOP of all records for which the film producer is HITCHCOCK. For this example it is assumed that there is a table which has also a column named PRODUCER The Query Object comprises of a list of result columns: ID, START, STOP which are fully qualified to uniquely identify the table(s) from which the records are to be chosen, a list of conditions which are to be satisfied (e.g. PRODUCER=HITCHCOCK) and a method createSQL which translates the user query into a SQL statement. A Query Object contains also other methods which are helpful in writing applications using them, e.g. a method to execute this query against a database and methods which transform the results into a form convenient for the user interface. There could be many different implementations of a query object, however this is the preferred method.
2) A Derived Query Object 360 contains one or more methods to translate a query into SQL Example: For the Query Object described in key point 1 a method createSQL would return the following SQL statement:

select ID, START, STOP from T1 where PRODUCER= 'HITCHCOCK'.

Second (more complex) Example: If the user query is: return the ID, START, STOP from T1 where TITLE= 'SKYDIVE', and TITLE is flagged to be a text extender field with handle "titlehandle" where the Text Extender High Performance Query is to be used, the following can be generated by the translate function. Note that there are "internal" common table expressions used. The entire sequence is tagged with a unique instance identifier (in this case, the "4" after REPHANDLE, ROWRESULTLIST, and MATCHTABLE) to distinguish the Common Table Expressions from others that may have been generated.

```
WITH REPHANDLE4(MYDOCHANDLE) AS
(
  SELECT DB2TX.DB2TEXfli(prototypehandle)
  FROM DB2TX.TEXTCOLUMNS
  WHERE TABLESCEHMA=instanceName AND
  TABLENAME='T1' AND
  COLUMNNAME='TITLE'
)
,
ROWRESULTLIST4(RESULTDOCLIST) AS
(
  SELECT DB2TX.HANDLE_USToMYDOCHANDLE,
    '"SKYDIVE"')
FROM REPHANDLE4
)
,
MATCHTABLE4(handle, RESULTDOCLIST, cardinality,
  number) AS
  (SELECT db2tK.handle(tESULTDOCLIST,1),
    RESULTDOCLIST,
    db2t.no_of_documents(RESULTDOCLIST),
    1
  FROM ROWRESULTLIST4
  WHERE db2tx.no_o_f documents(RESULTDOCLIST)
  >0
  UNION ALL
  SELECT db2tx.handle(RESULTDOCLIST,number+1),
    RESULTDOCLIST,
    cardinality,
    number+1
  FROM MATCHTABLE4
  WHERE number<cardinality
)
,
Q0(ID, START, STOP) AS
(SELECT id, start, stop
FROMT1
,MATCHTABLE4
WHERE HANDLE=titlehandle
)
```

3) A Boolean Compound Query Object 350 describes the entire user query

Example: The user query is: return the ID, START and STOP of all records for which the film producer is HITCHCOCK and in which the word MURDER is spoken. Return the records rank ordered. In this example table T2 as a column in which the text is recorded and which can be searched by a text search engine (e.g., DB2 TextExtenders). The Boolean Compound Query Object 350 contains a list of Typed Compound Query Objects 340 and Operator Objects 270: Q1 (Query Object 1), OP (Operator Object), Q2 (Query Object 2). Q1 encapsulates the first sub-query (see example under key point 1), OP denotes and AND operator, Q2 encapsulates the second query which contains a method to translate it into the following SQL statement:

select ID, START, STOP, DB2TX.RANK(handle, '"MURDER"') from T2

In the above example, handle is the name of the column used for storing the index for the text search engine. In key point 4 it is shown on how to interpret the AND operator and in key point 5 it is shown how to normalize the result sets of Q1 and Q2 to be able to apply the AND operator.
4) A Boolean Compound Query Object 350 contains one or more methods on how to translate the sub-queries into a singe query which upon execution returns the result set for the original user query.

Example: The AND operator is defined in this step. A Boolean Compound Query Object 350 could have many methods each of which interpret the AND operator differently. One possible definition of an AND operator is that it applies to the time intervals as defined by START and STOP in the tables: let R1 be the result set of sub-query Q1 and R2 be the result set of sub-query Q2. Then a record is in R, the result set of the Compound Query, if for an ID which is in R1 and in R2 there is a non empty time interval which is the intersection of a time interval in R1 and in R2. The resulting SQL expression is formulated as follows:
SELECT ID, MAX(S1.START, S2.START), MIN(S1.STOP, S2.STOP) FROM
  S1, S2 WHERE
  S1.ID=S2.ID AND (S1.START<S2.STOP) AND (S2.STOP<S1.STOP)
  MAX function is implemented as
  CASE START
    WHEN S1.START>=S2.START THEN S1.START
    ELSE S2.START END
  MIN function is implemented as
  CASE STOP
    WHEN S1.STOP>=S2.STOP THEN S2.STOP
    ELSE S2.STOP END The tables S1 and S2 are determined as DB2 Common Table Expressions and then combined with the above expression
  WITH S1 (ID, START, STOP) AS
    (SELECT (ID, START, STOP) FROM T1 WHERE PRODUCER=HITCHCOCK),
  S2 (ID, START, STOP) AS
    (SELECT (ID), START, STOP, DB2TX.RANK (handle, '"MURDER"')) FROM T2
  SELECT ID, MAX(S1.START, S2.START), MEN (S1.STOP, S2.STOP)
    FROM S1, S2 WHERE S1.ID=S2.ID AND
      (S1.START<S2.STOP) AND (S2.START<S1.STOP)

However the above expression is not quite correct as the Common Table Expressions S1 and S2 contain different number of columns. In key point 5 it is illustrated on how to normalize the result sets of the two sub-queries to make the above expression a correct SQL statements.

The above examples illustrates on how an Operator Object could be interpreted. Now the general method for creating a single SQL statement from a Compound Query is illustrated The Compound Query contains a list of Query Objects, Operator Objects and Parenthesis Objects which form a Boolean expression in infix notation. The first step is to translate the Boolean expression from infix notation to post fix notation, an algorithm which is extensively described in the literature. An important part of such an algorithm is to define the precedence between operators (the order in which operators are evaluated). The algorithm used here, takes a precedence function as an input, in other words the application can define it, as the meaning of AND, OR (for example) are overloaded. After translating the Boolean expression into post fix notation, the Operator Objects and Query Objects are in a list, ready for evaluation.
  Do while there are Objects in the list:
  If the object is a Query Object->push it onto the stack
  Else {
    current object is Operator
    pop the stack->Object 1
    pop the stack->Object 2
    CTE Object=createOperatorExpression(Object1, Object2, Operator)
    push CTE Object onto stack
    add CTE object to Vector v
    }
  }

Each CTE object contains a SQL string which denotes the common table expression describing the query as defined between Object1, Object2 and the Operator. The above example showed one implementation of such an expression and there will be more examples later on.

To create the final single SQL statement the following algorithm has to be performed:
  String sqlstring="WITH";
  int first=0;
  for (i=0; i<size(v); i++) {
    sqlString=sqlString+v[i].getSqlString();
    (if first=1)
      sqlString=sqlstring+",";
    else
      first=1;
  }
  sqlString=sqlString+"SELECT DISTINCT"+<columns>FROM v[n].getName();

The <columns> are the final result columns as defined in the original user query. The DISTINCT feature of SQL is used to eliminate duplicate rows which could have been computed in the intermediate common table expression. This is due to an SQL requirements that if a UNION needs to be performed, a UNION ALL needs to be done. Note that the method createOperatorExpression(Object1, Object2, Operator) encapsulates the meaning of the Operator as defined by the application. Furthermore this method should have multiple signatures, as both Objects (1 and 2) could be Query Objects or CTE Objects, or one of them a Query Object and the other a CTE Object.

Here are a few examples of methods createOperatorExpression. They all create a new CTE Object which contains the appropriate SQL string as shown here:

First the OR operator is examined having a standard definition
  createOperatorExpressioon(Query Object1, Query Object2, OR):
  S1 (ID, START, STOP) AS (
    SELECT ID, START, STOP FROM T1, T2 WHERE PRODUCER=HITCHCOCK OR ACTOR=°'Cary Grant')

Note that the application uses an optimization technique in this case to avoid a UNION ALL in the final SQL query.
  createOperatorExpressioon(Query Object1, CTE Object, OR):
  S1 (ID, START, STOP) AS (
    SELECT ID, START, STOP FROM T1 WHERE
    PRODUCER=HITCHCOCK
    UNION ALL
    SELECT ID, START, STOP FROM Object)

Note that the "select" string is obtained by calling a method on Object1 and on Object
  createOperatorExpression(CTE cte1, CTE cte2, OR)
  S1 (ID, START, STOP) AS (
    SELECT ID, START, STOP FROM cte1
    UNION ALL
    SELECT ID, START, STOP FROM cte2

Now the AND expression is shown. Here the AND expression has the same meaning as in the previous example and hence some computation needs to be performed
  createOperatorExpression(Query Object1, Query Object2, AND)

MAX function is implemented as
CASE START
  WHEN S1.START>=S2.START THEN S1.START
  ELSE S2.START
MIN function is implemented as
CASE STOP
  WHEN S1.STOP>=S2.STOP THEN S2.STOP
  ELSE S2.STOP
Need to define how S1 and S2 are determined
S1 (ID, START, STOP) AS
  (SELECT (ID, START, STOP) FROM T1 WHERE
    PRODUCER='HITCHCOCK'),
S2 (ID, START, STOP) AS
  (SELECT (ID, START, STOP) FROM T2 WHERE
    ACTOR=°'Cary Grant'),
S3 (ID, START, STOP) AS
  (SELECT ID, MAX(S1.START, S2.START), MIN
    (S1.STOP, S2.STOP)
    FROM S1, S2 WHERE S1.ID=S2.ID AND
      (S1.START<S2.STOP) AND
      (S2.START<S1.STOP))
createOperatorExpression(Query Object1, CTE S1, AND)
S2 (ID, STARTSTOP)AS
  (SELECT (ID, START, STOP) FROM T1 WHERE
    PRODUCER=HITCHCOCK),
S3 (ID, START, STOP) AS
  SELECT ID, MAX(S1.START, S2.START), MIN
    (S1.STOP, S2.STOP)
    FROM S1, S2 WHERE S1.ID=S2.ID AND
      (S1.START<S2.STOP) AND
      (S2.START<S1.STOP))
createOperatorExpression(CTE S1, CTE S2, AND)
S3 (ID, START, STOP) AS (
  SELECT ID, MAX(S1.START, S2.START), MIN
    (S1.STOP, S2.STOP)
    FROM S1, S2
    WHERE S1.ID=S2.ID AND
      (S1.START<S2.STOP) AND
      (S2.START<S1.STOP))

5) A Boolean Compound Query Object 350 contains one or more methods on how translate the sub-queries into sub-queries which upon execution return result sets which can be combined with result sets returned from the execution of other sub-queries.

An example in the section of key point 4 showed two sub-queries, one of which returns the columns ID, START, STOP, whereas the other returns the columns ID, START, STOP, RANK To combine these the two result sets from the sub-queries, both should have the same result columns. Hence it is advisable to normalize the result set of the first sub-query and add a column RANK and put a zero value in there (or any other distinct value). This can be easily achieved by adding a RANK column in the SQL query for query objects other than query objects which go against DB2 Extenders:

The SQL created to add a column of value 0 (or any other value) is like:
  SELECT ID, START, STOP, CASE WHEN START>0
    THEN 0 END AS RANK Note that when normalizing sub-queries other conditions need to be added on how to apply an operator between two rows which both have a RANK column. Again this can be done using a case statement. For example, for an AND operator the case could specify that the value of the RANK column should be 0 if both RANK columns have 0 value in them, otherwise the bigger value. Any function on combining RANK can be implemented here.

6) A Boolean Compound Query Object 350 may contain a set of resultcolumns which specify which additional columns are required for the final user query.

In key point 1–6, it was shown how to construct a single SQL query, where the query specifications are expressed in an arbitrary Boolean expression. The constraint is that the result columns of all the sub-queries have to be the same—a fact that can be achieved using the "normalization" technique as shown in key point 5. However, another query can be appended which determines an arbitrary set of columns from another set of tables (in other words another full select in DB2 terms).

The normalization method is based on U.S. Pat. No. (60/033,025; Y09-96-250): Using Multiple Search Engines to Search Multimedia Data by Anni R Coden, Sue-Wen Mak and Ed C. So.

Example: Building on the examples given throughout, the set of common table expression returns ID, START, STOP, RANK in its columns. Suppose the user query requires a set of columns TITLE, NAME, ADDRESS which are stored in T1 and PHONE which is stored in T2 for each row which has been determined by using the common table expressions. Hence, tables T1 and T2 also contain columns ID, START, STOP in them and the additional information is required for rows whose iD matches an ID in the last computed common table expression Tn and whose START and STOP times have a relation to the START and STOP time in Tn (e.g., contains, same). Such relations are denoted as function f<#>of the appropriate arguments.

In that case the final SELECT of the expression would be
  SELECT TITLE, NAME, ADDRESS, PHONE from T1,
    T2 where
    ID.T1=ID.T2 AND ID.T1=ID.Tn AND f1(T1.START,
      T2.START, Tn.START) AND
      f2(T1.STOP, T2.STOP, Tn.STOP)

Figure 21:
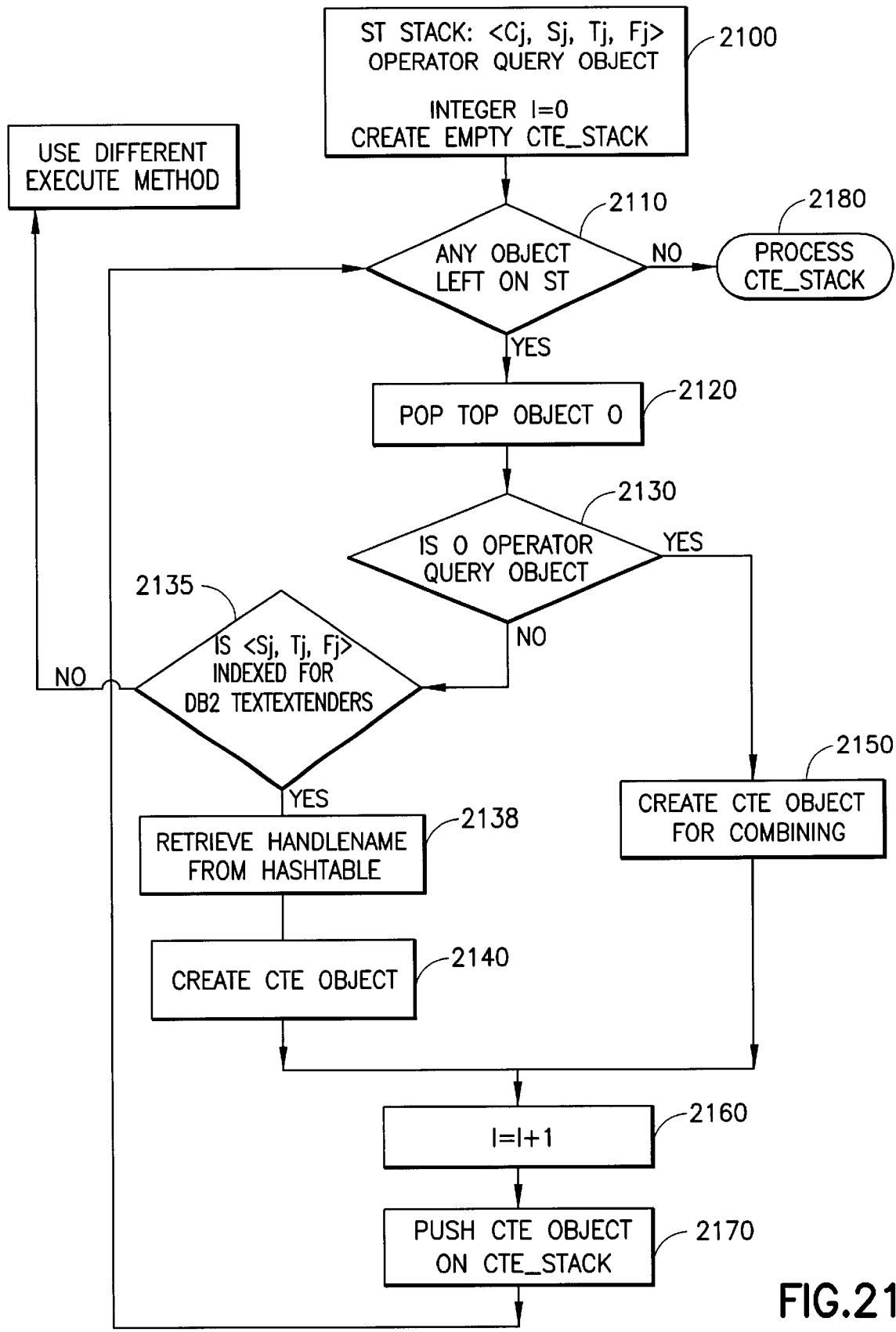
FIG. 21 is a flowchart of a high performance execute method in a Compound Free Text Query Object.

FIG. 21 is a flowchart and detail illustrating a high performance execute method 965 to perform a free text query. In this preferred embodiment, IBM's DB2 is the underlying database, DB2's TextExtender is used to index the data and its primitives are used to perform execute method 965.

An example of such a query is: Find all documents which contain the word IMPEACHMENT in the column TITLE and for these documents return the values which are in the DATE and PRODUCER columns. The word IMPEACHMENT is the query expression 910, the column TITLE is specified in the query column 925 and the DATE and PRODUCER columns are the resultcolumns 930.

More specifically the query column 925 is specified by a triplet <S1, T1, F1>where S1 specifies the schema, T1 specifies the table name, and F1 the column name. (The terms schema, table name and column name are well define within IBM's DB2.) The system however needs to know whether any given column specified by <S1, T1, F1>had been indexed by DB2 TextExtender, such that a free text query can be performed against it. If it has been indexed, access to the index can be obtained through a variable which represents such index. The following query returns such a variable if it exists and is performed against DB2 for every column <S1, T1, F1>.
SELECT handlename
FROM DB2TX.TEXTCOLUMNS
WHERE TABLESCHEMA='S1' AND
TABLENAME='T1' AND
COLUMNNAME='F1'

If the above specified query returns no rows, then no free text indexing has been performed and another execute method must be used. If a row is returned, the value in that row is the assigned handlename 920 representing the index for the column. If more than one row is returned, an error condition exists in the database.

The process for determining handlenames 920 is expensive to perform during ad-hoc user sessions and thus the following performance enhancement is performed. The application has a hash table HT which is seeded prior to the execution of any user ad-hoc queries since generally the set up for DB2's TextExtender indexing is performed only once during the database creation and the handlenames do not change once they are set up. The keys to the hashtables are the column names within the underlying DB2 database which have been enabled for DB2 TextExtender indexing (as determined by the system administrator). The value recorded in hash table HT is a string representing the handlename 920 for that column. If a value exists for a particular key column, then that column is considered by the system to be enabled for text indexing using the handlename value. If no value exists for a column name, then no such indexing is presumed.

Figure 22:
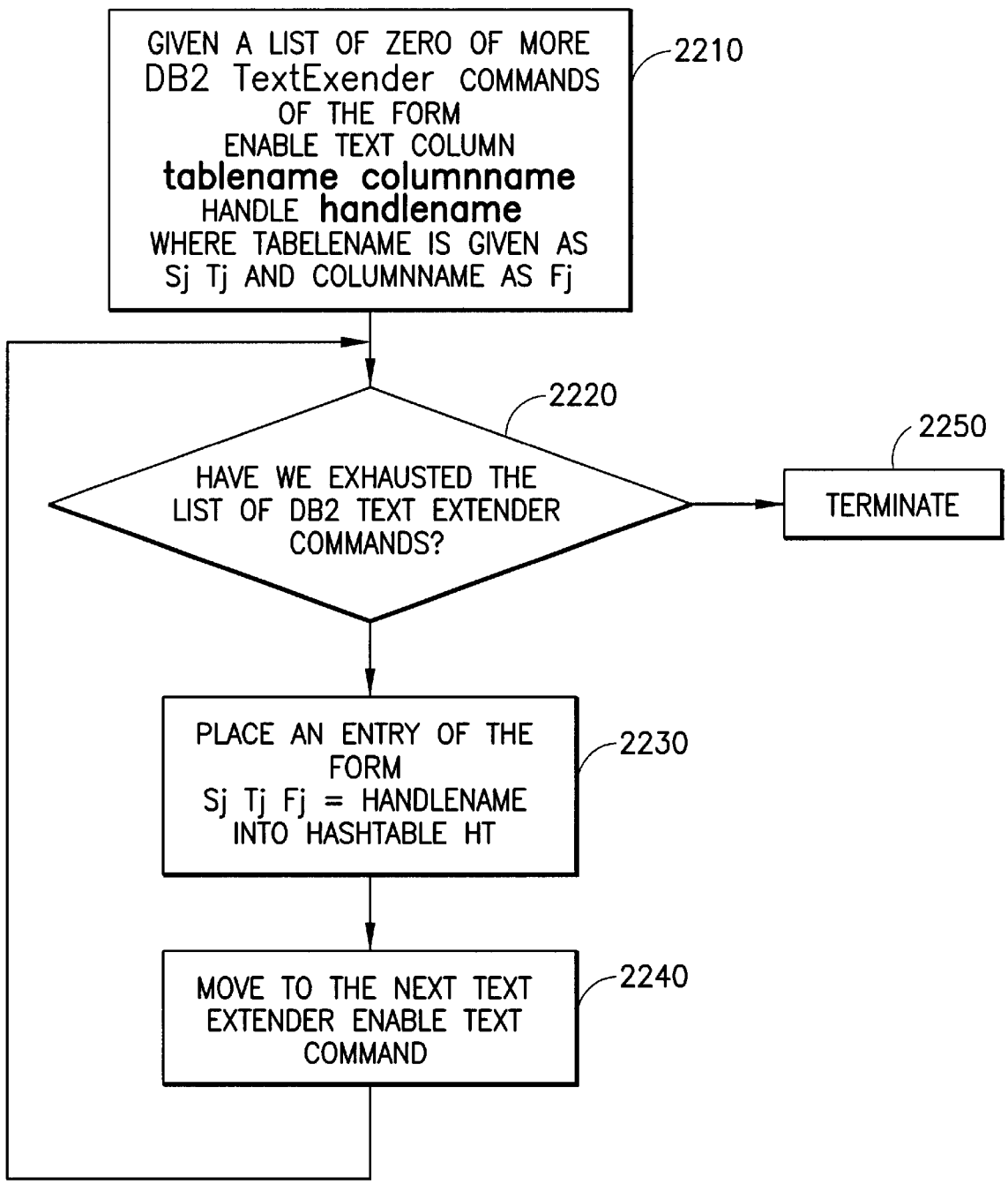
FIG. 22 is a flowchart describing the process of entering data into a hash table as used in the high performance execute method as using in FIG. 21.
Figure 23:
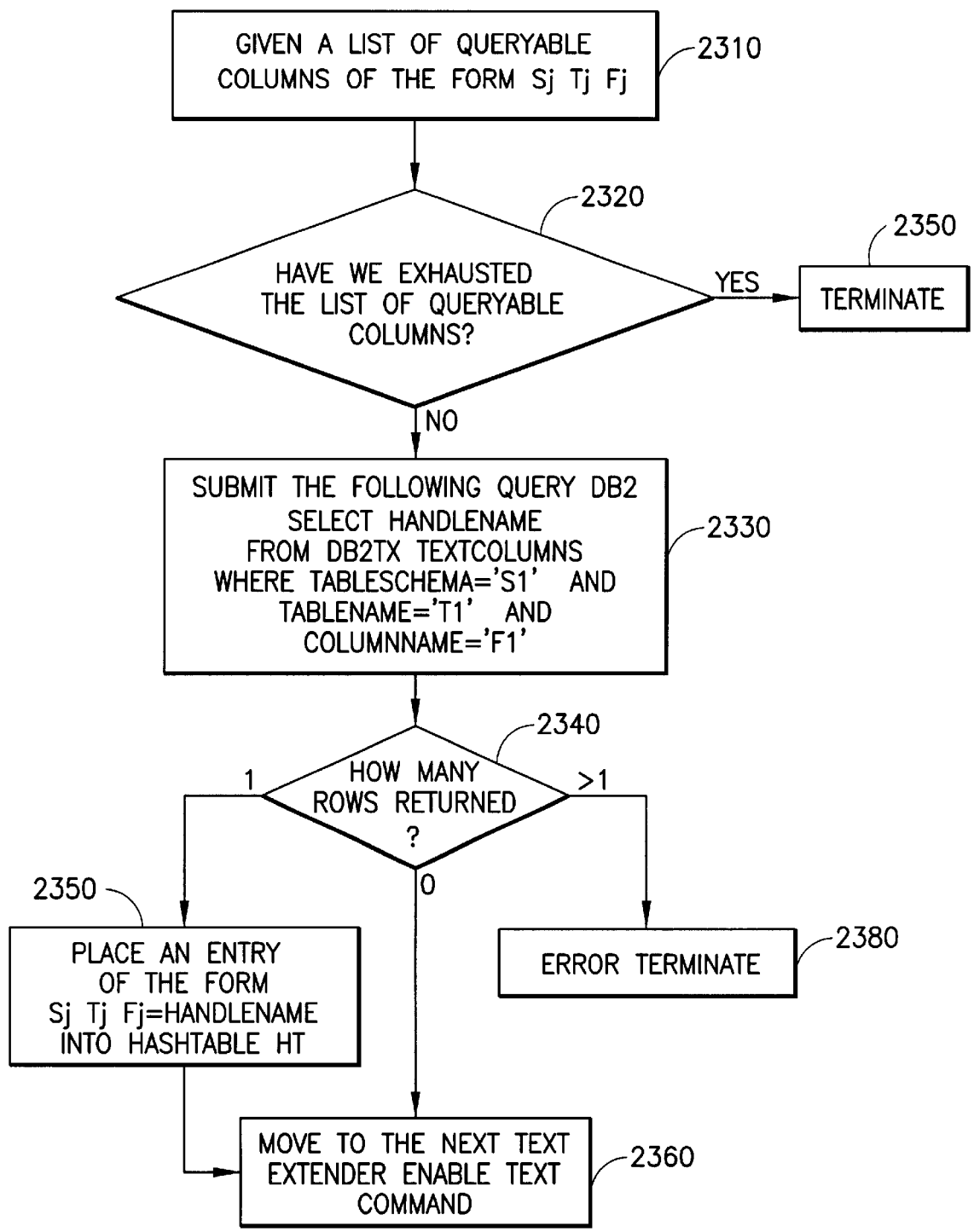
FIG. 23 is a flowchart describing an alternative process of entering data into a hash table as used in the high performance execute method as using in FIG. 21.

FIGS. 22 and 23 show two different methods for creating this hash table HT. This hash table HT is introduced for performance reasons because it is generally much quicker to perform a hash table lookup than a database query to determine the same information multiple times. The form or algorithm of the hash table itself is not germaine to the discussion of this disclosure but it is assumed to be a well performing hash table.

The input to the execute method 965 is a set of query expressions and query objects. Details about the preparation of the input parameters can be found in U.S. Patent application by Brereton, Coden and Schwartz: Method and System for Translating an Ad-Hoc Query to Structured Query Language Using Common Table Expressions which is incorporated above.

In summary, the input to this execute method is a stack. An element on the stack ST is either a fourtuplet <Cj, Sj, Tj, Fj>where Cj is a query expression 910 and Sj, Tj and Fj represent a query column 925 or an Operator Query Object 270 and is shown in box 2100 of FIGURE 2100. Furthermore, there is a counter (integer) I which is initialized to 0 and an empty stack CTE_STACK.

In box 2110 it is checked whether there are any elements left on the stack ST. If ST is empty, the process continues to box 2180 where the CTE_STACK is processed. This process is described in FIG. 20 starting with box 2068.

In case there are objects left on ST, the top object O is popped in 2120. In 2130 it is examined whether O is an operator query object. In case it is not, the process proceeds to 2135 where the values Sj, Tj, Fj are examined to determine whether the query column 925 was indexed for DB2 TextExtenders by a lookup into the hash table HT. If the column had not been indexed this execute method terminates and a different execute method needs to be invoked. Otherwise, in box 2138 it is determined which handlename 920 is associated with the query column 925. Towards this end the hash table entry retrieved from step 2135 is examined. The string denoting the index is stored into a variable handename 920. The process then continues to box 2140 which is described in more detail in a subsequent paragraph. However, in this box a new Common Table Expression Query Object FIG. 18) is created which contains a sophisticated string sqlString 1820 which is described in more detail in a subsequent paragraph.

In case the Object 0 in box 2130 is an Operator Query Object, the process proceeds to box 2150, where also a new Common Table Expression Query Object (FIG. 18) is created. Again it contains a sophisticated sqlString 1820 which is described in more detail in a subsequent paragraph The process then proceeds to box 2160 where the counter I is incremented by one and then to box 2170 where the CTE Object created in either box 2140 or 2150 is pushed onto the CTE_STACK.

The sqlstring created for the CTE Object in box 2138 will now be described. It is based on a template derived from the following example provided in the IBM manual, DB2 Tea Extend Administration and Programing Guide which is repeated here for completeness In this example, a column with the name TITLE is searched for the word "IMPEACHMENT". The specification for the column contains the tableschema DB2 TX and the tablename SAMPLE. The query is further constrained by the query condition 915 that the resulting documents are from the year 1995.

```
WITH REPHANDLE(NYDOCHANDLE) AS
(SELECT DB2TX.DB2TEXTH(prototypehandle)
    FROM DB2TX.TEXTCOLUMNS           (1)
    WHERE TABLESCHEMA = 'DB2TX' AND
        TABLENAME = 'SAMPLE' AND
        COLUMNNAME = 'TITLE'
),
ROWRESULTS(RESULTDOCLIST) AS
(SELECT DB2TX.HANDLE_LIST(MYDOCHANDLE,
'"IMPEACHMENT"')          (2)
    FROM REPHANDLE
),
MATCHTABLE(handle, RESULTDOCLIST, cardinality, number) AS
(SELECT db2tx.handle(RESULTDOCLIST),1),       (3)
    RESULTDOCLIST,
    db2tx.no_of_documents(RESULTDOCLIST),
    1
    FROM RWORESULTLIST
    WHERE db2tx.no_of_documents(RESULTDOCLIST) > 0
UNION ALL
SELECT db2tx.handle(RESULTDOCLIST, number + 1),      (4)
    RESULTDOCLIST,
    cardinality,
    number + 1
    FROM MATCHTABLE
    WHERE number < cardinality
)
SELECT comment
    FROM db2tx.sample, MATCHTABLE          (5)
    WHERE year(date) = 1995 AND
        commenthandle = HANDLE;
```

The query above is a very specific example of how one can use a recursive query, a specific handle name and the handle lists provided by DB2 TextExtender to quickly query an index.

In particular (1) creates a temporary table REPHANDLE which has a single column MYDOCHIANDLE. The value in this column is prototypehandle which specifies the DB2 handle for the TITLE column which is further defined by the TABLSCHEMA and TABLANAME.

In (2) a temporary table ROWRESULTLIST is created which has a single column RESULTDOCLIST. The value in this column is a pointer to the result list of documents which contain the word compress in the TITLE column. The result list is in the form of a pointer to a list of handles which point to the documents themselves.

Sections (3) and (4) are the recursive part to process the handlelist. In particular (3) is the initial sub-query query which returns the first relevant handle. The RESULT- DOCLIST column and the number of documents in the handle list is the same in all the rows but are used to assure that the recursion stops. The second part (4) is called the recursive sub-query query that adds more rows to the temporary table MATCHTABLE based on the rows which are already there. Note that each time the recursive sub-query query (4) is executed it sees only the rows that were added by the previous iteration.

In (5) the final result is obtained which contains the TRITE column for all the documents from 1995 and which contains the word IMPEACHMENT.

This method has proven to work quite quickly and effectively for specific queries on a single DB2 TextExtender index. However, it does not describe how to query multiple indeces (using multiple handlenames). The process described in FIG. 21 shows how to generalize the above template to accommodate simultaneous searches for multiple handlenames 920 representing multiple query columns 925.

An example of a query involving multiple indices would be of the form: Find all documents which have the word IMPEACHMENT in the TITLE column or the word NIXON in the COWMMNT column and for these documents return the values which are in the DATE and PRODUCER columns. The words IMPEACMN and NIXON are the query expression 910, the column TITLE and COMMN are specified in the query column 925 and the DATE and PRODUCER columns are the resultcolumns 930.

The sqlstring 1820 created in 2140 is of the following form. Note that I is the value of the counter transformed into a string. It assures that all the sqlstrings in all the CTE Objects created in box 2140 have unique table names.
REPHANDLEI(MYDOCHANDLE) AS
(SELECT DB2TX.DB2TEXTH(pototypehandle)
   FROM DB2TX.TEXTCOLUMNS
   WHERE TABLESCHEMA='Sj' AND
     TABLENAME='Tj' AND
     COLUMNNAW='Fj'
),
ROWRESULTLISTI(RSULTDOCLIST) AS
(SELECT DB2TX.HANDLE_LIST(MYDOCHANDLE, "'Q'")
   FROM REPHANDLEI
),
MATCHTABLEI(handle, RESULTDOCLIST, cardinality, number) AS
(SELECT db2tx.handle(RESULTDOCLIST,1),
   RESULTDOCLIST,
   db2tx.no_of_documents(RESULTDOCLIST),
   1
   FROM ROWRESULTLISTI
   WHERE db2tx.no_of_documents(RESULTDOCLIST)
     >0
UNION ALL
SELECT db2tx.handle(RESULTDOCLIST,number+1),
   RESULIDOCLIST,
   cardinality,
   number+1
   FROM MATCHTABLEI
   WHERE number<cardinality
)

The sqlString created in box 2150 is described now. In particular, the strings are shown for the operators AND and OR, however, other operators can be easily accommodated here.

First the sqlString 1820 for the AND operator is described. Note that the value I is the last counter value as determined in box 2160. The columns K1 through Kn are one set of query conditions 915.
QI (K1, . . . Kn) AS
   (SELECT K1, . . . Kn) FROM Q(I-1), Q(I-2)
     WHERE Q(I-1).K1=Q(I-2).K1
       AND Q(I-1).K2=Q(I-2).K2
     . . .
       AND Q(I-1).Kn=Q(I-2).Kn First the sqlString 1820 for the OR operator is described. Note that the value I is the last counter value as determined in box 2160.
QI(K1, . . . Kn) AS
   (SELECT K1, . . . Kn) FROM Q(I-1), Q(I-2)
     WHERE Q(I-1).K1=Q(I-2).K1
UNION ALL
   (SELECT K1, . . . Kn) FROM Q(I-1), Q(I-2)
     WHERE Q(I-1).K2=Q(I-2).K2
. . .
UNION ALL
   (SELECT K1, . . . Kn) FROM Q(I-1), Q(I-2)
     WHERE Q(I-1).Kn=Q(I-2).Kn FIG. 22 The hash table HT can be loaded from a properties file (such as Java's "java.util.Properties" object class, Wmdows 95/98 registry or other form of data initialization) which the system administrator prepares at the time he or she performs the necessary "enable text column" commands for DB2 TextExtender indices. For each "enable text tablename column columnname title handle handlename" command executed (where a table is represented as S1.T1 and colnmname is represented as F1), an entry is made into a properties file that contains the fully qualified column name and the handlename assigned from the command. Only DB2 TextExtender enabled columns would receive an entry. Columns without a corresponding hash table entry would be presumed disabled for DB2 TextExtender indexing. The properties file is then loaded into the hash table HT using the prescribed means (e.g. java.util.Properties.load() function or regedit in Windows 95/98).

This method for the hash table creation is more formerly described in FIG. 22 which begins in box 2210 with the list of "enable text" commands. The method then proceeds to box 2220 where it is determined if there are any more "enable text" commands to process. If there are no more to process, the method terminates (box 2250). If there are more, the method proceeds to box 2230. In 2230, an entry of the form Sj.Tj.Fj=handlename is placed into hash table HT. The method proceeds to box 2240 where we move on to the next "enable text" command. The method returns to box 2220.

FIG. 23 An alternative method for hash table creation is described in this figure. This method is useful if there are a large or unknown number of DB2 TextExtender indexed columns. It begins in box 2310 with a list of columns of the form Sj.Tj.Fj which the system administrator has determined to be "queryable". That is, columns on which the users are allowed to form queries. The method then proceeds to box 2320 where it is determined if there are any more "query" columns to process. If there are no more to process, the method terminates (box 2350). If there are more, the method proceeds to box 2330. In 2330, the following query is submitted to DB2:
   SELECT handlename
   FROM DB2TX.TEXTCOLUMNS
   WHERE TABLESCHEMA='Sj' AND TABLENAME='Tj' AND
COLMNNAME='Fj'

In box 2340, if the query returns no rows, the method proceeds to box 2360. If the query returns more than one row, an error condition exists and the process terminates (box 2380). If one row is returned, then the contents of that row is the handlename and the method proceeds to box 2350 where an entry of the form Sj.Tj.Fj=handlename is placed into hash table HT. The method proceeds to box 2360. In 2360, the method moves on to the next "queryable" column. The method returns to box 2320.

We claim:

1. A computer system having one or more central processing units and one or more memories, the computer system further comprising:

an interface to one or more databases, one of the databases being a specific database;

one or more base query objects having one or more base query object methods, one or more base variables, and one or more base objects, one or more of the base query object methods being specific to the specific database and capable of querying the specific database;

one or more query objects, each of the query objects derived from one of the base objects, each of the query objects having a query type, one or more query object methods, one or more query object variables, and one or more query object objects, containing one or more query object methods capable of querying the specific database to obtain a typed result having the respective type;

one or more compound query objects, each of the compound query objects derived from one of the base objects, each of the compound query objects having one of the query types, one or more compound query object methods, one or more compound query object variables, and one or more compound query object objects, containing one or more compound query object method capable of querying the specific database to obtain a typed result having the respective type;

one or more annotator objects, derived from one of the base query objects, the annotator objects having operator objects, the annotator objects being used with the specific database;

one or more graphical user interfaces (GUI) having one or more query elements, one or more operators and one or more data, each query element being of one of the query types but being database independent, the query elements, operators, and one or more groupings of query elements being selectable;

a process that, for each GUI query element, associates one of the query objects with one or more of the GUI query elements by entering one or more of the data in one or more of the respective query object variables or query objects to create a query object instance, associates one or more of the operators with one or more of the operator objects, and defines one or more of the compound query objects by the groupings so that the associated query objects are related by the operators to create a compound query expressions according to the grouping; and a linearize process that transforms the compound query expression into a query expression that can be executed for the specific database.

2. A system, as in claim 1, where the compound query object has one or more execute methods that invoke one or more of the query object methods to obtain one or more typed results and combines two or more of the typed results according to the query expression.

3. A system, as in claim 1, where the compound query object has one or more execute methods that operates on the query expression to create a structured query language expression that is executed by one of the base query object methods to produce an overall result.

4. A computer system, as in claim 1, where each of the databases can be accessed with a query language.

5. A computed system, as in claim 4, where the query language includes any one or more of the following: SQL, oracle SQL and a structured query language.

6. A computer system, as in claim 1, where each of the query objects is any one of the following type: a Base Query object, a Text Atom Query Object, a Parametric Attribute Query Object, a Feature Atom Query Object, an Operator Object, a Parenthesis Object, a Compound Free Text Query Object, a Compound Boolean Text Query Object, a Compound Parametric Query Object, a Compound Feature Query Object and a Boolean Compound Query Object.

7. A computer system, a in claim 6, where the query object is a Compound Feature Query Object query having one or more feature atom query objects, each feature atom query object having a feature atom query method that accesses a feature table, the feature table describing a database structure of the database that is used by one or more of the feature atom query objects to access information in the database that respond to the query.

8. A computer system, as in claim 1, where the query object is a Compound Free Text Query Object having one or more methods that creates a method which can access the columns in a table in the database which were created by a special indexing mechanism to capture the data needed to perform a free text query and return a ranked result.

9. A computer system, as in claim 1, where the query object is a Compound Boolean Text Query Object having one or more methods that creates a method which can access the columns in a table in the database which were created by a special indexing mechanism to capture the data needed to perform a Boolean text query.

10. A computer system, as in claim 1, where the query is a Compound Parametric Query Object having one or more parametric attribute query objects, each parametric attribute query object having a parametric attribute query method that accesses one or more tables, each of the tables describing a database structure of the database that is used by one or more of the parametric attribute query objects to access information in the database that respond to the query.

11. A computer system, as in claim 1, where the query object is Boolean Compound Query Object having a Boolean expression of instances of the query objects, and which contains one or more execute methods that evaluate the Boolean expression such that the result corresponds to the query expression.

12. A computer system, as in claim 11, where the execute method further evaluates each sub-query and combines their results.

13. A computer system as in claim 11, where the execute method comprises the following steps:

evaluating each sub-query;

creating common table expressions (CTE);

creating a single SQL expression; and creating CTE objects where the CmE object contains a query string which expresses the query as encapsulated by a single query or by the logical expression of two or more queries.

14. A computer executed method comprising the steps of:

evaluating one or more base sub-query objects having one or more base query object methods, one or more base variables, and one or more base objects, one or more of the base query object methods being specific to a specific database and capable of querying the spec database;

deriving one or more query objects from one of the base objects, each of the query objects having a query type, one or more query object methods, one or more query object variables, and one or more query object objects, the query objects objects containing one or more query object methods capable of querying the specific database to obtain a typed result having the respective type;

deriving one or more compound query objects derived from one of the base objects, each of the compound query objects having one of the query types, one or more compound query object methods, one or more compound query object variables, and one or more compound query object objects, the compound query object objects containing one or more compound query object methods capable of querying the specific database to obtain a typed result having the respective type;

deriving one or more annotator objects from one of the base query objects, the annotator objects having operator objects, the annotator objects being used with the specific database;

providing one or more graphical use interfaces (GUI) having one or more query elements, one or more operators and one or more data, each query element being of one of the query types but being database independent, the query elements, operators, and one or more groupings of query elements being selectable;

for each GUI query element, associating one of the query objects with one or more of the GUI query elements by entering one or more of the data in one or more of the respective query object variables or query objects to create a query object instance, associating one or more of the operators with one or more of the operator objects, and defining one or more of the compound query objects by the groupings so that the associated query objects are related by the operators to create a compound query expressions according to the grouping; and transforming the compound query expression into a query expression that can be executed for the specific database.

15. A computer system comprising:

means for evaluating one or more base sub-query objects having one or more base query object methods, one or more base variables, and one or more base objects, one or more of the base query object methods being specific to a specific database and capable of querying the specific database;

means for deriving one or more query objects from one of the base objects, each of the query objects having a query type, one or more query object methods, one or more query object variables, and one or more query object objects, the query objects objects containing one or more query object methods capable of querying the specific database to obtain a typed result having the respective type;

means for deriving one or more compound query objects derived from one of the base objects, each of the compound query objects having one of the query types, one or more compound query object methods, one or more compound query object variables, and one or more compound query object objects, the compound query object objects containing one or more compound query object methods capable of querying the specific database to obtain a typed result having the respective type;

means for deriving one or more annotator objects from one of the base query objects, the annotator objects having operator objects, the annotator objects being used with the specific database;

means for providing one or more graphical user interfaces (GUI) having one or more query elements, one or more operators and one or more data, each query element being of one of the query types but being database independent, the query elements, operators, and one or more groupings of query elements being selectable;

for each GUI query element, means for associating one of the query objects with one or more of the GUI query elements by entering one or more of the data in one or more of the respective query object variables or query objects to create a query object instance, associating one or more of the operators with one or more of the operator objects, and defining one or more of the compound query objects by the groupings so that the associated query objects are related by the operators to create a compound query expressions according to the grouping; and means for transforming the compound query expression into a query expression that can be executed for the specific database.

16. A computer program product which performs the steps of:

evaluating one or more base sub-query objects having one or more base query object methods, one or more base variables, and one or more base objects, one or more of the base query object methods being specific to a specific database and capable of querying the specific database;

deriving one or more query objects from one of the base objects, each of the query objects having a query type, one or more query object methods, one or more query object variables, and one or more query object objects, the query objects objects containing one or more query object methods capable of querying the specific database to obtain a typed result having the respective type;

deriving one or more compound query objects derived from one of the base objects, each of the compound query objects having one of the query types, one or more compound query object methods, one or more compound query object variables, and one or more compound query object objects, the compound query object objects containing one or more compound query object methods capable of querying the specific database to obtain a typed result having the respective type;

deriving one or more annotator objects from one of the base query objects, the annotator objects having operator objects, the annotator objects being used with the specific database;

providing one or more graphical user interfaces (GUI) having one or more query elements, one or more operators and one or more data, each query element being of one of the query types but being database independent, the query elements, operators, and one or more groupings of query elements being selectable;

for each GUI query element, associating one of the query objects with one or more of the GUI query elements by entering one or more of the data in one or more of the respective query object variables or query objects to create a query object instance, associating one or more of the operators with one or more of the operator objects, and defining one or more of the compound query objects by the groupings so that the associated query objects are related by the operators to create a compound query expressions according to the grouping; and transforming the compound query expression into a query expression that can be executed for the specific database.

* * * * *